(12) United States Patent
Araya et al.

(10) Patent No.: US 11,347,868 B2
(45) Date of Patent: May 31, 2022

(54) SYSTEMS AND METHODS FOR SECURELY MANAGING DATA IN DISTRIBUTED SYSTEMS

(71) Applicant: DOMO, Inc., American Fork, UT (US)

(72) Inventors: Esteban Araya, Highland, UT (US); Niall Browne, American Fork, UT (US); Raka Dutta, San Francisco, CA (US); Scott Jackman, American Fork, UT (US); Daren Thayne, American Fork, UT (US); Jon Sharp, American Fork, UT (US)

(73) Assignee: DOMO, INC, American Fork, UT (US)

( * ) Notice: Subject to any disclaimer, the term of this patent is extended or adjusted under 35 U.S.C. 154(b) by 268 days.

(21) Appl. No.: 15/954,950

(22) Filed: Apr. 17, 2018

(65) Prior Publication Data

US 2019/0318102 A1    Oct. 17, 2019

(51) Int. Cl.
| | | |
|---|---|---|
| *G06F 21/60* | (2013.01) | |
| *H04L 29/08* | (2006.01) | |
| *H04L 9/14* | (2006.01) | |
| *H04L 9/08* | (2006.01) | |
| *H04L 67/10* | (2022.01) | |

(52) U.S. Cl.
CPC .......... *G06F 21/602* (2013.01); *H04L 9/0822* (2013.01); *H04L 9/0838* (2013.01); *H04L 9/0891* (2013.01); *H04L 9/14* (2013.01); *H04L 67/10* (2013.01)

(58) Field of Classification Search
CPC .......... G06F 21/602; G06F 2221/2143; H04L 9/0838; H04L 9/0891; H04L 9/0822; H04L 9/14; H04L 63/10; H04L 63/068; H04L 63/0428; H04L 9/0897; H04L 9/088

See application file for complete search history.

(56) References Cited

U.S. PATENT DOCUMENTS

| | | | |
|---|---|---|---|
| 8,892,875 B1 | 11/2014 | Baldwin et al. | |
| 8,914,632 B1 * | 12/2014 | Shankar | H04L 63/101 |
| | | | 713/167 |
| 9,124,432 B2 | 9/2015 | Nagai et al. | |
| 9,379,890 B1 * | 6/2016 | Blakely | H04L 9/0822 |
| 9,413,730 B1 * | 8/2016 | Narayan | H04L 63/0281 |
| 9,819,648 B1 * | 11/2017 | Chilakapati | H04L 63/08 |
| 2002/0126850 A1 | 9/2002 | Allen et al. | |
| 2004/0128499 A1 | 7/2004 | Peterka et al. | |

(Continued)

OTHER PUBLICATIONS

International Search Report and Written Opinion dated Aug. 6, 2109 for international application PCT/US2019/027927.

(Continued)

*Primary Examiner* — Robert B Leung

(57) ABSTRACT

A cloud-based platform encrypts data imported from an organization using respective data encryption keys (DEK). The platform prevents decrypted data of the organization, and the DEK(s) used to encrypt such data, from being persistently retained within the platform. Access to the DEK may be controlled by the organization. Accordingly, the organization may retain control over access to its data, after the data has been exported to the platform. The platform may provide a purge control by which the organization can configure the platform the purge any cached DEK and/or unencrypted data pertaining to the organization.

20 Claims, 24 Drawing Sheets

(56) References Cited

U.S. PATENT DOCUMENTS

| | | | |
|---|---|---|---|
| 2009/0034733 A1* | 2/2009 | Raman | H04L 9/083 |
| | | | 380/277 |
| 2010/0254537 A1 | 10/2010 | Buer et al. | |
| 2012/0011360 A1 | 1/2012 | Engels et al. | |
| 2012/0204032 A1 | 8/2012 | Wilkins et al. | |
| 2012/0233455 A1 | 9/2012 | Kahler et al. | |
| 2014/0047513 A1 | 2/2014 | Noordende | |
| 2014/0050317 A1 | 2/2014 | Sabin | |
| 2015/0186657 A1* | 7/2015 | Nakhjiri | H04L 9/0894 |
| | | | 713/155 |
| 2015/0222604 A1 | 8/2015 | Ylonen | |
| 2015/0281185 A1 | 10/2015 | Cooley | |
| 2015/0304315 A1* | 10/2015 | Estehghari | H04L 9/0825 |
| | | | 713/156 |
| 2015/0370725 A1* | 12/2015 | McMullen | G06F 16/162 |
| | | | 713/193 |
| 2016/0028699 A1* | 1/2016 | Ambroz | H04L 9/3242 |
| | | | 713/168 |
| 2016/0277374 A1* | 9/2016 | Reid | H04L 63/101 |
| 2017/0041296 A1 | 2/2017 | Ford et al. | |
| 2017/0264619 A1 | 9/2017 | Narayanaswamy et al. | |
| 2019/0097791 A1* | 3/2019 | Hersans | G06F 12/0875 |
| 2019/0229908 A1* | 7/2019 | Peddada | G06F 21/6209 |
| 2019/0296900 A1* | 9/2019 | Sitges Puy | G06F 21/6245 |

OTHER PUBLICATIONS

Samaha, et al., Protecting Your Data with AWS KMS and AWS CloudHSM, AWS Government, Education, and Nonprofit Symposium, Washington, DC, Jun. 25-26, 2015, 34 pages.

* cited by examiner

SYSTEMS AND METHODS FOR SECURELY MANAGING DATA IN DISTRIBUTED SYSTEMS

TECHNICAL FIELD

The present disclosure generally relates to data processing, and in particular relates to systems and methods to securely manage imported data pertaining to an entity in a distributed system, such that the entity retains control over such within the distributed system.

BACKGROUND

An enterprise may capture and maintain a large amount of data. The enterprise may wish to export the data in to external, cloud-based services. The data, however, may comprise sensitive and/or confidential information pertaining to the enterprise. Although the enterprise may require the external service to encrypt imported data, the enterprise may not retain any control over access to the data (and/or keys used to secure the data) after the data has been imported into the cloud-based service. What are needed are systems, methods, and apparatus for managing imported data within a cloud-based service, such that the enterprise is capable of retaining control over access to its data after such data is imported by the cloud-based service.

Additional aspects and advantages will be apparent from the following detailed description of preferred embodiments, which proceeds with reference to the accompanying drawings.

DETAILED DESCRIPTION OF PREFERRED EMBODIMENTS

A cloud-based platform may service a number of entities. Each entity may export data to the platform. The platform may leverage the data to provide data analytics and/or visualization services to authorized users of the entities. The data imported for the entities may comprise sensitive and/or confidential information. As such, the platform may secure the imported data by, inter alia, encrypting the imported data and/or restricting access to the imported data to designated authorized users of the entities. Conventional data security mechanisms involve encrypting data using keys managed by the platform. Such mechanisms may prevent unauthorized access to data, but may not enable entities to retain control over their data after it is exported to the platform. Since the platform retains control over the keys used to encrypt imported data, the data of an entity may remain accessible within the platform even if the entity attempts to revoke access to such data. The cloud-based platform disclosed herein may be configured to secure imported data by, inter alia, encrypting imported data using data encryption keys managed by the respective entities. The disclosed platform may prevent the data encryption keys from being persistently retained. Accessing imported data within the platform may, therefore, require obtaining the required data encryption keys from the entity (or a service controlled and/or managed by the entity, such as a key management service). The platform may, therefore, enable entities to retain control over imported data. An entity may prevent the platform from accessing its imported data by, inter alia, revoking access to master key(s) and/or key management services, corresponding to the data encryption keys required to decrypt the imported data. The platform may be further configured to purge imported data, such that data pertaining to the entity is guaranteed to be rendered inaccessible to the platform.

Figure 1:
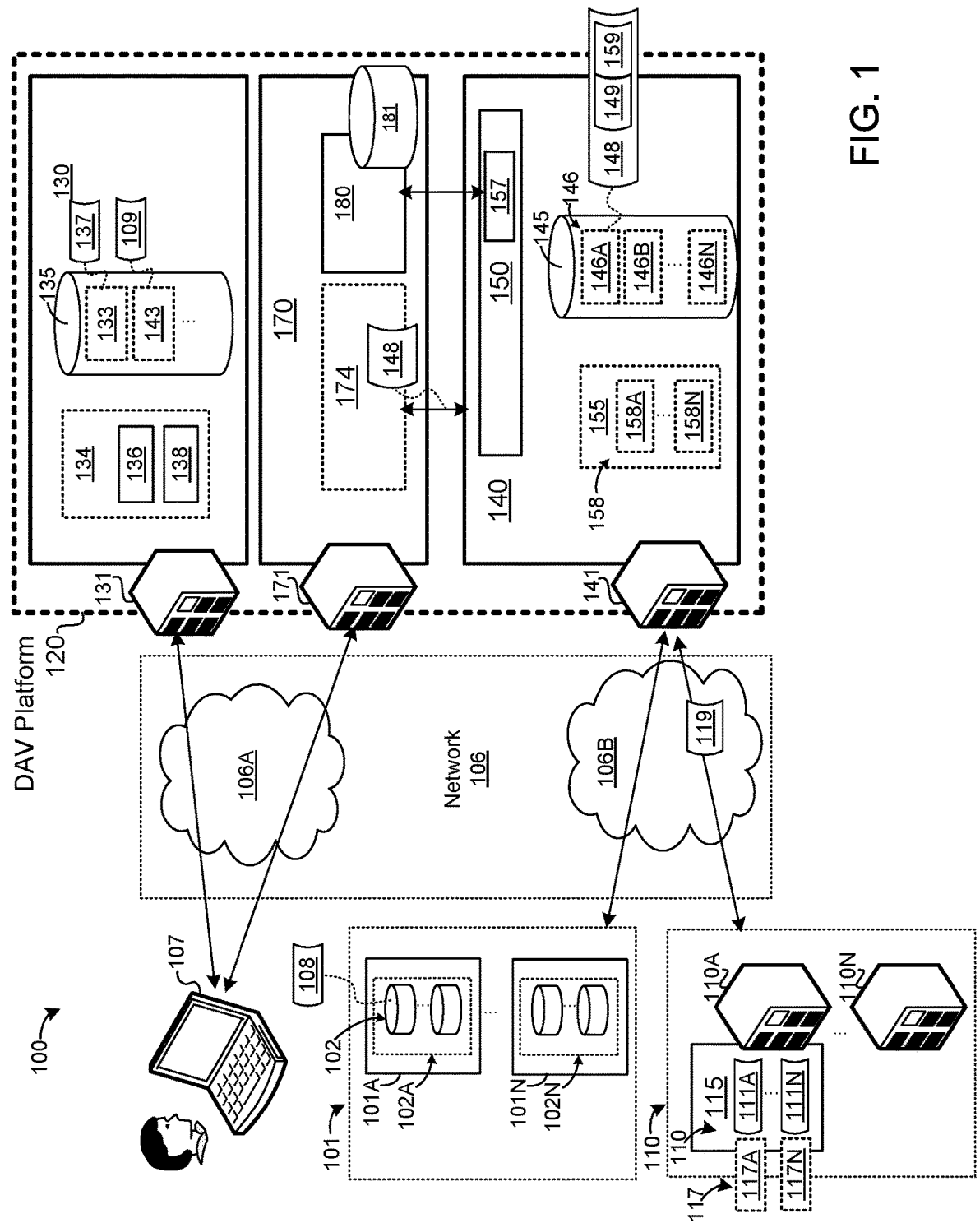
FIG. 1 is a schematic block diagram of one embodiment of a data analytics and visualization (DAV) platform configured to securely manage data imported from an entity, such that the entity retains control over the data after the data is imported into the DAV platform.

FIG. 1 depicts one embodiment of a system 100 for securely managing data pertaining to an entity 101 within data analytics and/or visualization (DAV) platform 120. The DAV platform 120 may comprise a distributed and/or cloud-based system (e.g., a distributed and/or cloud-based data analytics and/or visualization platform and/or system). The DAV platform 120 may be configured to provide various services to different respective entities 101 (e.g., entities 101A-N as illustrated in FIG. 1). The DAV platform 120 may be configured to provide data analytics and/or visualization functionality pertaining to imported data pertaining to the entities 101. As used herein, an entity 101 may comprise, but is not limited to: a group, a sub-group, a meta group, an organization, a sub-organization, a meta-organization, an enterprise, a business, an association, a set of common computing infrastructure (e.g., data storage and/or management systems), and/or the like.

The DAV platform 120 may comprise and/or be communicatively coupled to an administration service 130, a data manager 140, and a content service 170. In some embodiments, the administration service 130, data manager 140, and/or content service 170 comprise and/or are embodied on respective servers, such as an administration server 131, data management server 141, content server 171, and/or the like. The servers 131, 141, and/or 171 may comprise and/or be embodied within one or more: computing devices, computing systems, server computing devices, server computing systems, virtual computing devices, virtual servers, group of clustered computing devices, server clusters, and/or the like. Although FIG. 1 shows the administration server 131, data management server 141, and content server 171 as separate servers, the disclosure is not limited in this regard. In some embodiments, one or more of the servers 131, 141, and/or 171 may comprise and/or be embodied within a same server (e.g., embodied on a same computing system and/or within a same cluster). Although not shown in FIG. 1 to avoid obscuring the details of the illustrated embodiments, the servers 131, 141, and/or 171 may comprise respective processing resources (e.g., one or more processing units, central processing units, general-purpose processing units, special-purpose processing units, virtual processing units, and/or the like), volatile memory resources (e.g., volatile random access memory, virtual memory, cache memory, and/or the like), non-transitory storage, input/output resources, network interface resources, and/or the like.

As disclosed in further detail herein, the administration service 130 may provide an administration interface 134 by which authorized users of respective entities 101 may configure services pertaining to the respective entities 101 implemented by the DAV platform 120. An entity 101 may use the administration interface 134 to, inter alia, configure the data manager 140 to import data pertaining to the entity 101, secure the imported data (e.g., using one or more specified master keys 111 and/or key management systems (KMS) 110 associated with the entity 101), control access to the imported data (e.g., revoke access to the imported data, purge the imported data, etc.), and so on. The data manager 140 may be configured to import data of the entity 101, encrypt the imported data using keys associated with the specified master keys 111 and/or KMS 110, and purge unencrypted data and/or key material from persistent storage of the DAV platform 120, such that the entity 101 retains control over the data after such data has been stored persistently within the DAV platform 120. As disclosed in further detail herein, the content service 170 may leverage the imported data to provide data access, query, analytics, and/or visualization (DAQV) functionality pertaining to the imported data to authorized users of the entities 101. As used herein, DAQV functionality generally refers to any suitable operation(s) pertaining to imported data including, but not limited to: data access operations, data query operations, data processing operations, data import operations (e.g., extract, transform, and load operations), data sorting operations, data filtering operations, data calculation operations, data aggregation operations, data analytics operations, data science operations, data visualizations (e.g., generating and/or displaying visualizations pertaining to the imported data), data monitoring operations, notification functions, and/or the like.

The DAV platform 120 may be communicatively coupled to network infrastructure of the entities 101A-N and/or one or more key management systems 110 via a network 106. The network 106 may comprise any electronic communication network (and/or combination of networks) capable of communicating data, control, and other information between computing devices. The network 106 may include, but is not limited to: an Internet Protocol (IP) network (e.g., a Transmission Control Protocol IP network (TCP/IP)), a Local Area Network (LAN), a Wide Area Network (WAN), a Virtual Private Network (VPN), a wireless network (e.g., IEEE 802.11a-n wireless network, Bluetooth® network, a Near-Field Communication (NFC) network, and/or the like), a public switched telephone network (PSTN), a cellular data network, and/or the like. The network 106 may comprise one or more sub-networks 106A and/or 106B. The sub-networks may comprise one or more wide area networks, virtual networks, virtual private networks (VPNs), separate networks (e.g., air-gaped networks), and/or the like. The sub-network 106A may be configured for front-end communication (e.g., communication of human-readable electronic data, such as hyper-text markup language (HTML) content). The sub-network 106A may comprise an IP network, such as the Internet. The sub-network 106B may be configured for back-end communication (e.g., back-channel, B2B, or server-to-server communication). The sub-network 106B may comprise a storage area network (SAN), infiniband network, and/or the like. Although FIG. 1 depicts a network 106 comprising two sub-networks 106A and 106B, the disclosure is not limited in this regard and could be adapted to use in any network environment (e.g., use a single, unitary network 106, such as the Internet; use a plurality of sub-networks, each sub-network corresponding to a respective entity 101 and/or KMS 110; and/or the like).

The DAV platform 120 may be configured to access data pertaining to respective entities 101 from one or more data management systems 102 associated with the respective entities 101. As used herein, a data management system (DMS) 102 refers to any device, system, platform, and/or service from which data pertaining to the entity 101 may be obtained. A DMS 102 may include, but is not limited to: an access control system, a memory device, a storage device, a non-volatile storage device, a non-volatile storage system, a network-accessible storage service, a network attached storage (NAS) system, a distributed storage and processing system, a database system, an Enterprise Data Management (EDM) system, a database management system (DMBS), a relational DMBS, an Object-Oriented DMBS (OODMBS), an eXtensible Markup Language (XML) DMBS, an in-memory database system, a file system, a distributed file system, a virtualized data management system, a columnar database, a streaming database system, a network attached storage (NAS) system, a directory system, a user directory, an organization directory, a customer relationship management (CRM) platform, an enterprise resource planning (ERP) platform, a collaboration platform, a messaging platform, and/or the like. In the FIG. 1 embodiment, DMS 102A may comprise data pertaining to entity 101A, DMS 102B may comprise data pertaining to entity 101B, and so on, with DMS 102N comprising data pertaining to the entity 101N.

A DMS 102 may be configured to organize data pertaining to an entity 101 as one or more entity datasets 108. As used herein, a "dataset" refers to electronically encoded information comprising one or more datum, a dataset may include, but is not limited to: structured data, relational data, comma-separated (CSV) values, a data structure, a table, a list, a database table, a column, a row, a field, an attribute, value, a series, a sequence, Structured Query Language (SQL) structured data (e.g., an SQL result set, a set of rows from a relational database table), an object, a data object, one or more tuples (e.g., one or more attribute-value pairs), key-value data, XML data, unstructured data (e.g., a data blob), and/or the like. A dataset may comprise one or more data elements. A data element may be associated with one or more attributes, such as a name (e.g., column name), type (e.g., data type of the element, such as text, UTF-8, number, INT, FLOAT, or the like), label(s), tag(s), and/or the like.

Entity datasets 108 may be associated with respective import metadata 109, which may comprise any suitable information pertaining to the entity datasets 108 and/or corresponding DMS 102. As disclosed in further detail herein, the DAV platform 120 may use the import metadata 109 to, inter alia, import entity datasets 108 into the DAV platform 120. Portions of the import metadata 109 may be defined by and/or correspond to information pertaining to the respective DMS 102 of the entity datasets 108. A DMS 102 may manage entity datasets 108 in accordance with a DMS configuration. As used herein, DMS configuration refers to one or more of: a namespace, a data dictionary, a file system, a file format (e.g., CSV file format), a schema, an object schema, a database schema, a Structured Query Language (SQL) schema, an XML schema, and/or the like. The DMS configuration may define the entities, tables, fields, elements, attributes, security attributes, security tags, access controls, users, user groups, relationships, views, indexes, packages, procedures, functions, queues, triggers, types, sequences, views, synonyms, links, directories, objects, XML schemas, and other metadata pertaining to the entity datasets 108. The DMS configuration of a DMS 102 may, therefore, define the format of the entity datasets 108 managed thereby (e.g., define the columns, rows, and so on of the entity dataset 108). The import metadata 109 associated with an entity dataset 108 may correspond to the DMS configuration of the DMS 102 and may comprise, inter alia, information pertaining to the source of the entity dataset 108 (e.g., the DMS 102, an identifier of the entity dataset 108 within the DMS 102); a schema of the entity dataset 108 (e.g., data elements, data element types, and/or the like), attributes of the entity dataset 108 (e.g., attributes of particular elements of the entity dataset 148, security attributes, security labels, tags, access control lists, and/or the like), users associated with the entity dataset 108, and/or the like. In some embodiments, import metadata 109 pertaining to an entity dataset 108 may be maintained within the DMS 102 comprising the entity dataset 108 (e.g., may comprise and/or correspond to the DMS configuration and/or schema of the DMS 102). Alternatively, or in addition, the import metadata 109 pertaining to entity datasets 148 to be imported into the DAV platform 120 may be maintained within the DAV platform 120 (e.g., within configuration storage 135 and/or a dataset configuration 143, as disclosed in further detail herein).

One or more of the DMS 102 comprising data pertaining to an entity 101 may be managed by a third-party service, separate from the entity 101. In one non-limiting example, one or more of the DMS 102A associated with entity 101A may be hosted within the network infrastructure of the entity 101A, and one or more other DMS 102A may be hosted outside of the network infrastructure of the entity 101A (e.g., one or more of the DMS 102A may comprise cloud-based storage and/or hosting services).

The entities 101 may be configured to export data to one or more external services, such as the DAV platform 120. Data exported from an entity 101 (e.g., from a DMS 102 associated with the entity 101) may comprise sensitive and/or confidential information. In some embodiments, an entity 101 may require external services to comply with a security policy, which may require the external services to secure data imported from the entity 101. Securing the data may comprise controlling access to the imported data (e.g., requiring user authentication and/or access controls), securing imported data maintained within the external system, and so on. An entity 101 may require encryption of its imported data using, inter alia, a data encryption key (DEK). The DEK may be provided by the entity 101 and may be generated by the external service, by both the entity 101 and the external service (e.g., in a secure key exchange protocol), by a third-party, and/or the like. Once the external service is provided with the DEK, however, the entity 101 may no longer retain control over access to the imported data. Although the entity 101 may be capable of revoking the DEK (if the DEK signed and/or associated with an issuer), the external service could simply ignore the revocation and continue using the DEK to access the imported data of the entity 101. Moreover, the entity 101 may not retain control over security policies pertaining to the imported data. The external service may, for example, encrypt all data associated with a particular entity 101 using a same DEK and, as such, if the DEK is compromised, all of the imported data of the entity 101 may be potentially exposed. Furthermore, the entity 101 may not have any reliable mechanism for purging its data from the external service.

As disclosed in further detail herein, the DAV platform 120 may be configured to secure data exported from respective entities 101, such that the entities 101 retain control over access to the data exported therefrom. The DAV platform 120 may be configured to implement security policies managed by the entities 101, which may enable the entities 101 to retain control over an encryption policy pertaining to the data exported therefrom within the DAV platform 120. The DAV platform 120 may be further configured to provide for purging data of an enterprise, such that the entity 101 is guaranteed that the DAV platform 120 is no longer capable of accessing data imported from the entity 101.

In some embodiments, an entity 101 may comprise and/or be associated with one or more key management systems 110. As used herein, a key management system (KMS) refers to a system configured to provide key management services, which may include, but are not limited to: key provisioning, key wrapping, key encryption, key validation, key unwrapping, key revocation, and/or the like. A KMS 110 may be configured to manage master keys 111 (e.g., each KMS 110A-N may manage a respective set of master keys 111A-N). Each master key 111 may be assigned to (owned by) a respective entity 101, and may comprise a respective identifier, which may enable the corresponding KMS 110 to uniquely identify the master key 111 within a namespace of the KMS 110. The entities 101 may control access to the master keys 111 managed by respective KMS 110. An entity 101 may configure a KMS 110 to allow specified external services to access designated master keys 111 of the entity 101. Provisioning an external service, such as the DAV platform 120, access to a designated master key 111 may comprise configuring the KMS 110 to authorize the external service to: a) generate DEKs corresponding to the designated master key 111, b) wrap or encrypt DEKs using the designated master key 111, c) unwrap or decrypt encrypted DEKs using the master key 111, and so on. The master keys 111 may be associated with respective authorization metadata 117 (e.g., authorization metadata 117A-N corresponding to master key 111A-N, respectively). The authorization metadata 117 may comprise one or more of: access rights, access controls, access control lists, access lists, and/or the like. The authorization metadata 117 may be controlled by the respective entities 101 (e.g., each entity 101 may control the authorization metadata 117 pertaining to the master keys 111 thereof). The KMS 110 may control access to the master keys 111 in accordance with the authorization metadata 117 (e.g., access rights) controlled by the entities 101. Access to imported data pertaining to the entities 101 may be controlled within the DAV platform 120 based on, inter alia, the authorization metadata 117 controlled by the respective entities 101.

As disclosed in further detail herein, the DAV platform 120 may be configured to secure data imported from an entity 101 using a master key 111 of the entity managed by a designated KMS 110. Importing data from the entity 101 may comprise, inter alia: a) obtaining a DEK corresponding to the master key 111 from the designated KMS 110, b) encrypting the imported data using the obtained DEK, and c) encrypting the DEK for storage within the DAV platform 120. Accessing the data within the DAV platform 120 may, therefore, comprise, inter alia: a) obtaining the DEK from the KMS 110 (e.g., requesting the DEK and/or requesting decryption of the encrypted DEK using the master key 111), b) using the DEK to temporarily decrypt the data for use within the DAV platform 120, and c) purging the DEK and/or decrypted data such that the data is no longer being utilized within the DAV platform 120. The entity 101 may purge the imported data from the DAV platform 120 by, inter alia, revoking the master key 111 (and/or de-authorizing access to the master key 111 by the DAV platform 120). Subsequent attempts to access and/or decrypt the DEK by the DAV platform 120 may fail, such that the imported data is inaccessible to the DAV platform 120. The DAV platform 120 may be further configured to provide a control protocol for purging certain data (e.g., a "purge protocol"). In response to activation of the purge protocol, the DAV platform 120 may be configured to purge data associated with a particular entity 101, KMS 110, master key 111 and/or DEK. Purging data associated with a particular entity 101 may comprise purging data associated with the entity 101 from the DAV platform 120, purging data associated with a particular KMS 110 may comprise purging data corresponding to DEK(s) issued by the particular KMS 110 from the DAV platform 120 (e.g., purging data associated with master key(s) 111 and/or DEK(s) associated with the KMS 110), purging data associated with a particular master key 111 may comprise purging data associated with the master key 111 from the DAV platform 120 (e.g., purging data associated with DEK(s) associated with the master key 111), purging data associated with a particular DEK may comprise purging data associated with the DEK, and so on. As used herein, purging data from the DAV platform 120 may comprise removing the data from data resources of the DAV platform 120. As used herein, a "data resource" refers to any resource, system, device, component, circuit, and/or the like, capable of recording data. A data resource may include, but is not limited to: a storage resource, a storage device, a storage system, a storage component, a non-volatile storage device, a persistent storage device, solid-state storage, virtual storage, a memory resource, a memory system, a memory component, volatile memory, solid-state memory, virtual memory, a cache resource, a cache device, a cache system, a cache component, volatile cache storage, non-volatile cache storage, solid-state cache storage, and/or the like.

Referring to the DAV platform 120, the administration server 131 may be configured to, inter alia, configure one or more services provided to respective entities 101 thereby. The administration service 130 may comprise an administration interface 134, which may enable authorized users of an entity 101 to define, create, modify, edit, remove, and/or otherwise manage an entity configuration 133 for the entity 101 within the DAV platform 120. The administration server 131 may maintain an entity configuration 133 for respective entities 101 (e.g., a separate entity configuration 133 for each entity 101A-N) within persistent storage of the DAV platform 120 (e.g., configuration storage 135). An entity configuration 133 may include, but is not limited to: information pertaining to the entity 101, an entity identifier (EID) 113, one or more security policies 137, one or more dataset configuration(s) 143, and so on. The EID 113 may be configured to identify the entity 101 within the DAV platform 120. As disclosed in further detail herein, a dataset configuration 143 may define operations for importing data into the DAV platform 120 (e.g., define extract, transform, and load operations) and a security policy 137 may define security requirements for managing the imported data within the DAV platform 120. The security policy 137 may comprise one or more of: an access control policy, a KMS configuration, a data security policy, and/or the like. An access control policy may specify users that are authorized to access data pertaining to the entity 101 within the DAV platform 120. An access control policy may further specify users that are authorized to manage the entity configuration 133 of the entity 101 (e.g., specify administrators). In some embodiments, the access control policy may correspond to a third-party authentication and/or authorization service, such as a central authentication service (CAS), a Security Assertions Markup Language (SAML) service, an Identity Federation Framework (ID-FF) service, and/or the like.

The KMS configuration of an entity 101 may identify the KMS 110 associated with the entity 101, identify master keys 111 of the entity 101, and so on. The KMS configuration may further comprise information to enable the DAV platform 120 to interface with the KMS 110 and/or request key management operations pertaining to the master keys 111 of the entity 101. The KMS configuration may comprise network address(es) of the KMS 110, authentication credentials corresponding to the KMS 110, an identifier assigned to the DAV platform 120 by the KMS 110, protocols used by the KMS 110, and so on.

The security policy 137 may specify how data of the entity 101 is to be managed within the DAV platform 120. The security policy 137 may require data pertaining to the entity 101 to be encrypted within the DAV platform 120, specify an encryption policy for the imported data, and so on. The security policy 137 may require that the imported data be encrypted using a DEK corresponding to one or more master keys 111 (DEK acquired from one or more KMS 110 in accordance with the KMS configuration), specify parameters pertaining to the DEK (e.g., key size, key type, etc.), define encryption parameters (e.g., encryption algorithm, algorithm settings), and so on. The security policy 137 may further define criteria for DEK refresh operations. As used herein, a DEK refresh operation refers to an operation to replace a DEK that is currently being used to encrypt/decrypt data imported from the entity 101 with a new DEK. In a refresh operation, the current DEK is marked as "expired" and is replaced with a new DEK obtained from a KMS 110. Information pertaining to the expired DEK may be retained within the DAV platform 120 so that the expired DEK can be used to decrypt data encrypted thereby. The DEK refresh criteria of the security policy 137 may comprise any suitable criterion, including, but not limited to: a time-based criterion (e.g., require DEK refresh after a threshold period of time), a count criterion (e.g., require DEK refresh after a threshold number of usages of the DEK), a quantity criterion (e.g., require DEK refresh after the DEK is used to encrypt/decrypt a threshold amount of data), an interaction criterion (e.g., require DEK refresh after a threshold number of interactions pertaining to the DEK with the KMS 110), an explicit criterion (e.g., require DEK refresh in response to an explicit refresh request), and/or the like.

In some embodiments, the security policy 137 may apply to all data pertaining to the entity 101 within the DAV platform 120. For example, the security policy 137 may specify that all data pertaining to the entity 101 is to be encrypted using a DEK corresponding to a particular master key 111 (and that the DEK is to be refreshed weekly). In another example, the security policy 137 may specify that data imported from respective DMS 102 are to be encrypted using different respective DEK (e.g., data imported from a first DMS 102 are encrypted using a first DEK corresponding to a master key 111, data imported from a second DMS 102 are encrypted using a second DEK corresponding to the master key 111, and so on). Alternatively, or in addition, the security policy 137 may specify the data security policy for specific types of imported data (e.g., data imported from particular DMS 102, corresponding to particular entity datasets 108, and/or pertaining to particular users). For example, the security policy 137 may specify that data imported from a first DMS 102 be encrypted using a DEK corresponding to a first master key 111 (e.g., master key 111A managed by KMS 110A), which is to be refreshed on a bi-weekly basis. The security policy 137 may further specify that other data imported from a second DMS 102 be encrypted using a second DEK corresponding to a second master key 111 (e.g., master key 111N managed by KMS 110N), which is to be refreshed on a daily basis. In another embodiment, the security policy 137 may define a first data encryption policy for data pertaining to a first user, and may define a second data encryption policy for data pertaining to a second user.

In some embodiments, the security policy 137 may comprise one or more sub-policies. As used herein, a sub-policy refers to policy information that pertains to a subset of data associated with the entity 101. A sub-policy may apply to data imported from a specified DMS 102 (e.g., a first sub-policy may apply to data imported from a first DMS 102, a second sub-policy may apply to data imported from a second DMS 102, and so on). Alternatively, or in addition, a sub-policy may apply to data pertaining to particular users of the entity 101, user groups, organizational groups, and/or the like (e.g., a first sub-policy may apply to data pertaining to a first group of users, a second sub-policy may apply to data pertaining to a second group of users, and so on). In some embodiments, a sub-policy may apply to imported data corresponding to specified entity datasets 108 and/or data having specified attributes (e.g., entity datasets 108 tagged with designated security labels, access control lists, and/or the like). A sub-policy may modify designated portions of the corresponding security policy 137. In some embodiments, a sub-policy may modify a default data encryption policy of the security policy 137. By way of non-limiting example, the security policy 137 may require that imported data be encrypted using a first DEK derived from a first master key 111 (e.g., master key 111A managed by KMS 110A), and that the first DEK is to be refreshed on a bi-weekly basis. A sub-policy that applies to higher-security data (e.g., data imported from a specified entity dataset 108) may require encryption using a different DEK (a second DEK) derived from a different master key 111 (e.g., master key 111N managed by KMS 110A), and that the second DEK is to be refreshed on more frequent basis (e.g., refreshed hourly rather than bi-weekly).

The data manager 140 may be configured to import data pertaining to respective entities 101 and to secure the imported data, such that the entities 101 retain control over access to the data pertaining thereto after such data has been imported into the DAV platform 120. The imported data may be used within the DAV platform 120 (e.g., may be used in DAQV operations within the content service 170). The data manager 140 may import data by use of, inter alia, an import engine 142. The imported data may be stored within persistent storage resources 145. The persistent storage resources 145 may comprise one or more non-transitory storage devices, persistent storage devices, non-volatile storage devices, solid-state storage devices, no-transitory memories, persistent memories, non-volatile memories, solid-state memories, file systems, data management systems, and/or the like. The persistent storage resources 145 may be configured to store imported data 146 corresponding to a plurality of different entities 101 (e.g., imported data 146A-N corresponding to respective entities 101A-N). The imported data 146 of an entity 101 may be embodied as one or more datasets 148, each dataset 148 comprising data pertaining to the entity 101 and/or corresponding dataset metadata 149. The datasets 148 may be encrypted for storage within the persistent storage resources 145 in accordance with applicable security policies 137, as disclosed herein. As used herein, an "encrypted dataset" or "secured dataset" refers to a dataset 148 that comprises encrypted data pertaining to an entity 101, and a "decrypted dataset" or "unsecured dataset" refers to a dataset 148 that comprises data pertaining to the entity 101 that is not encrypted.

Figure 2A:
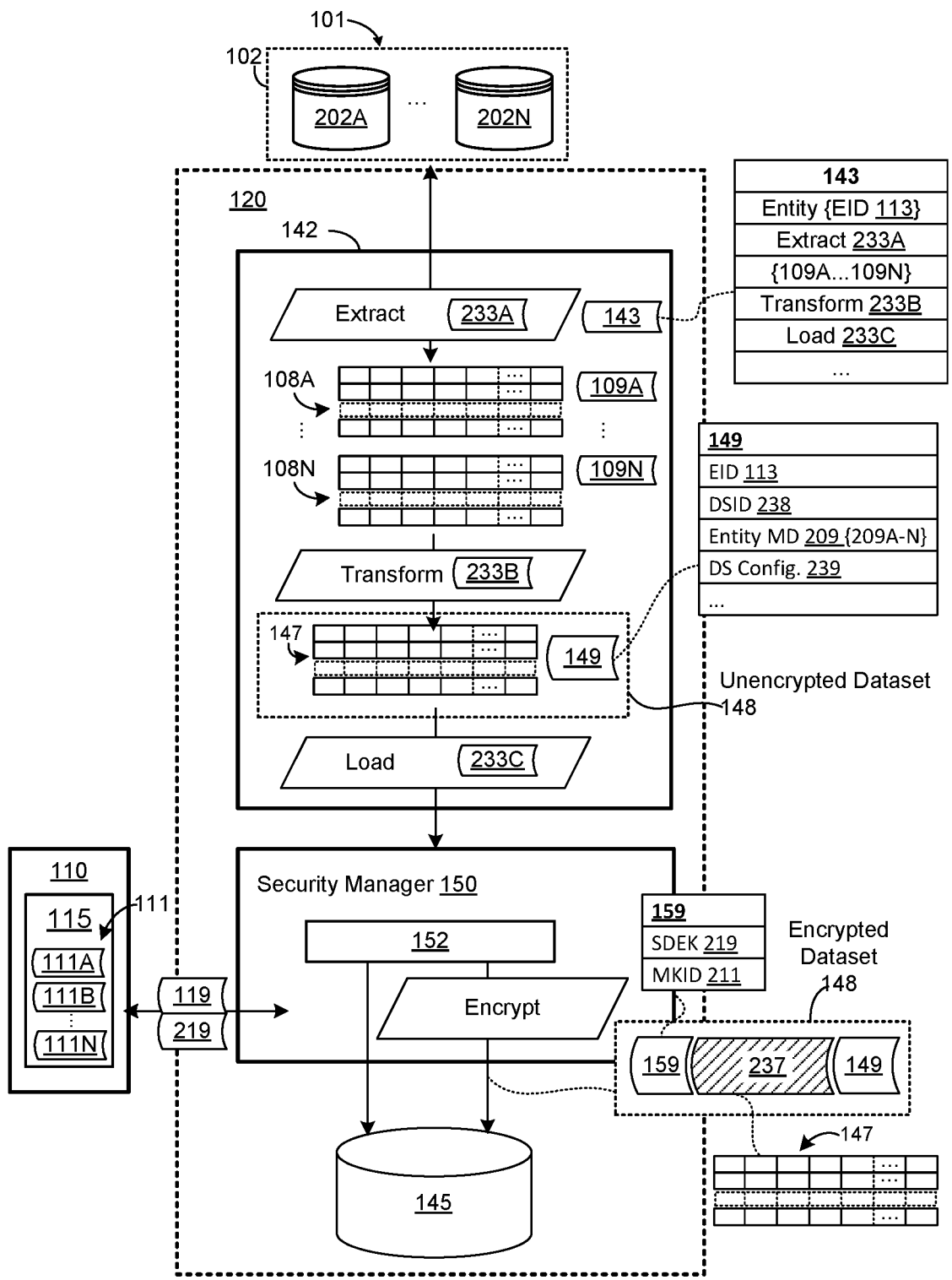
FIG. 2A is a schematic block diagram depicting data import and encryption operations implemented by embodiments of the disclosed DAV platform.

FIG. 2A illustrates one further embodiments of the disclosed DAV platform 120. In the FIG. 2A embodiment, the data manager 140 comprises an import engine 142 configured to import a dataset 148 pertaining to a particular entity 101 into the DAV platform 120. The import engine 142 may be configured to import the dataset 148 in accordance with a dataset configuration 143. The dataset configuration 143 may be maintained within the configuration storage 135 of the DAV platform 120 (e.g., as part of an entity configuration 133, as disclosed above). The dataset configuration 143 associated with the dataset 148 may define, inter alia, one or more import operations, including extract operations 233A, transform operations 233B, load operations 233C, and so on. The extract operation(s) 233A may specify one or more entity datasets 108 to extract from one or more DMS 102. In the FIG. 2A embodiment, extract operations 233A comprise extracting entity datasets 108A-N from DMS 102 associated with the entity 101 (e.g., DMS 202A-N). The dataset configuration 143 may comprise information to enable the import engine 142 to interface with the DMS 202A-N (e.g., specify network address(es) of the DMS 202A-N, provide authentication credential(s) corresponding to the DMS 202A-N, designate protocol(s) used by the DMS 202A-N, and/or the like). The dataset configuration 143 may further specify the data that is to be extracted from the one or more DMS 202A-N. The dataset configuration 143 may specify particular entity dataset(s) 108A-N to extract from one or more of the DMS 202A-N (e.g., specify one or more database tables, columns, rows, ranges, filters, queries, and/or the like). As illustrated in FIG. 2A, implementing the extract operation(s) defined in the dataset configuration 143 may comprise extracting entity datasets 108A-N from DMS 202A-N, respectively.

The extract operation 233A may further comprise acquiring import metadata 109A-N pertaining to the entity datasets 108A-N. The import metadata 109A-N (and/or portions thereof) may be acquired from the DMS 202A-N. Alternatively, or in addition, the import metadata 109A-N may be defined in the dataset configuration 143 (as part of configuration information pertaining to the extract operation 233A). As disclosed herein, the import metadata 109 of an entity dataset 108 may comprise any suitable information pertaining to the entity dataset 108 including, but not limited to: information pertaining to the source of the entity dataset 108 (e.g., information pertaining to the DMS 102 comprising the entity dataset 108; a name, address, and/or location of the entity dataset 108 within the DMS 102; and so on); a configuration of the entity dataset (e.g., a DMS configuration of the entity dataset 108, a format of the entity dataset 108, a schema of the entity dataset 108, element(s) of the entity dataset 108, column(s) of the entity dataset 108, and/or the like); attributes of the entity dataset 108 (and/or elements thereof), such as security attributes, labels, tags, access control, and/or the like; users associated with the entity dataset (e.g., individual users, user groups, organizational groups, etc.); and/or the like.

The dataset configuration 143 may further define one or more transform operations 233B to perform on one or more of the entity datasets 108A-N. The transform operations 233B may include any suitable operations capable of being performed on dataset(s) and/or element(s) of a dataset and may include, but are not limited to: remap operations (e.g., renaming and/or remapping element(s), column(s), field(s), attribute(s), and/or other data of the entity datasets 108A-N), normalize operations, conversion operations (e.g., converting an element from a first type to a second type), join operations, stack operations, union operations, aggregate operations, data calculations, cleanse operations, filter operations, sort operations, and/or the like. The import engine 142 may implement the transform operations 233B defined by the dataset configuration 143 on the extracted datasets 208A-N to thereby produce a dataset 148 comprising data 147 suitable for use within the DAV platform 120.

The transform operations 233B may further comprise generating dataset metadata 149 of the dataset 148. The dataset metadata 149 may comprise any suitable information pertaining to the dataset 148, and may include, but is not limited to, one or more of: a name, a label, a title, a description, a tag, a timestamp (indicating the time at which the dataset 148 was imported), an EID 113 of the entity 101 to which the dataset 148 pertains, a dataset identifier (DSID) 238, entity metadata 209, DS configuration data 239, and/or the like. The DSID 238 may be configured to identify the dataset 148 within the DAV platform 120 and may comprise one or more of a unique identifier, a globally unique identifier, a substantially unique identifier, a name, a distinguished name, a file name, a file address, a data address, a uniform resource identifier (URI), a uniform resource locator (URL), a path, an X-path, and/or the like. The entity metadata 209 may comprise, correspond to, and/or be derived from the import metadata 109A-N of the entity datasets 108A-N. The entity metadata 209 may include, but is not limited to, one or more of: source metadata 209A, attribute metadata 209B, and so on, including user metadata 209N. The source metadata 209A may identify source(s) of the dataset 148 (e.g., the entity dataset(s) 108A-N and/or corresponding DMS 202A-N). The attribute metadata 209B may comprise one or more attributes pertaining to the data 147, as disclosed above (e.g., attributes of the entity datasets 108A-N, such as security attributes, security labels, access control lists, tags, and/or the like). The user metadata 209N may identify users that are associated with the data 147, as disclosed herein. The entity metadata 209 may be manipulated in and/or in response to one or more transform operations 233B. For example, attribute(s) of an entity dataset 108A-N may be applied to the transformed datasets (e.g., data 147) after one or more transform operations 233B (e.g., an attribute of an element of an entity dataset 108A-N may be applied to a corresponding element of the dataset 148 after the element is remapped and/or joined with one or more other element(s) in one or more transform operations 233B). The DS configuration data 239 may comprise information pertaining to the schema of the dataset 148, such as the columns of the dataset, column type, column labels, and/or the like. The DS configuration data 239 may correspond to and/or be derived from the import metadata 109 of the entity datasets 108. Alternatively, or in addition, portions of the DS configuration data 239 may be defined in the dataset configuration 143, which may "remap" elements of the entity datasets 108 to columns of the dataset 148 (e.g., in one or more transform operations 233B).

The dataset configuration 143 may further define load operation(s) 233C to store the dataset 148 within persistent storage resources 145 of the data manager 140. The dataset configuration 143 and/or dataset metadata 149 may specify a storage location, name, and/or address for the dataset 148 within the persistent storage resources 145. The dataset 148 may comprise unencrypted data 147 pertaining to the entity 101 (e.g., may comprise data of the one or more entity datasets 108A-N, data corresponding to and/or derived from one or more of the entity datasets 108A-N, and/or the like). Accordingly, the dataset 148 produced by the import engine 142 may comprise an unencrypted dataset 148. As used herein, a dataset 148 comprising data 147 pertaining to an entity 101 that is unencrypted, clear-text, decrypted, and/or otherwise unsecured may be referred to as an unencrypted dataset 148, a clear-text dataset 148, a decrypted dataset 148, an unsecured dataset 148, and/or the like. By contrast, a dataset 148 in which data pertaining to the entity 101 has been replaced with secure data (e.g., encrypted data 237) may be referred to as an encrypted dataset 148, a secured dataset 148, and/or the like.

The unencrypted dataset 148 produced by the import engine 142 (e.g., data 147) may comprise sensitive and/or confidential information pertaining to the entity 101. The DAV platform 120 may be configured to secure data pertaining to various entities 101, which may comprise encrypting datasets 148 associated with the entities 101. A security manager 150 may be configured to selectively encrypt datasets 148 for storage within the persistent storage resources 145 in accordance with applicable security policies 137. As disclosed above, the entity configuration 133 associated with the entity 101 may define, inter alia, a security policy 137 for data pertaining to the entity 101. The security policy 137 may require that datasets 148 comprising data pertaining to the entity 101 be encrypted within the DAV platform 120 (and/or specify policies pertaining to such encryption). The load operation(s) 233C implemented by the import engine 142 may, therefore, comprise providing the unencrypted dataset 148 to the security manager 150 (as opposed to directly loading the unencrypted dataset 148 into the persistent storage resources 145).

The security manager 150 may receive the unencrypted dataset 148 from the import engine 142 (along with information pertaining to storage location(s) for the dataset 148 as defined by the dataset configuration 143 and/or dataset metadata 149). In response, a policy engine 152 of the security manager 150 may retrieve a security policy 137 corresponding to the dataset 148. The policy engine 152 may retrieve the security policy 137 from the configuration storage 135 of the administration server 131 (and/or may access a local configuration cache at the data manager 140). The policy engine 152 may identify a security policy 137 to apply to the dataset 148 by use of the dataset metadata 149 thereof (e.g., based on one or more of the EID 113 and/or other information of the dataset metadata 149). In response to determining that the identified security policy 137 does not require the dataset 148 to be encrypted within the DAV platform 120 (e.g., the security policy 137 allows certain datasets 148 comprising data pertaining to the entity 101 to be unsecured), the policy engine 152 may configure the security manager 150 to store the unencrypted dataset 148 within the persistent storage resources 145. In response to determining that the identified security policy 137 requires the dataset 148 to be encrypted, the policy engine 152 may configure the security manager 150 to convert the unencrypted dataset 148 to an encrypted dataset 148 for storage within the DAV platform 120. The encryption operation may comprise: a) obtaining a DEK 119; and b) using the DEK 119 to encrypt the dataset 148 (encrypt data 147 to thereby produce encrypted data 237). The encryption operation may further comprise replacing the unencrypted data 147 with the encrypted data 237 to produce an encrypted dataset 148. The encrypted dataset 148 may comprise encryption metadata 159, which may comprise any suitable information pertaining to the encryption operation. The encrypted dataset 148 may be written to the persistent storage resources 145 of the DAV platform 120.

In some embodiments, the DEK 119 used to encrypt the dataset 148 may be obtained from a KMS 110 associated with the entity 101. The security manager 150 may be configured to prevent the DEK 119 and/or the unencrypted dataset 148 from being persistently retained within the DAV platform 120 in order to, inter alia, enable the entity 101 to retain control over data after such data has been imported into the DAV platform 120. If the DEK 119 and/or unencrypted dataset 148 were persistently retained, the security manager 150 could potentially access the dataset 148 (and/or other data pertaining to the entity 101), regardless of whether such access was authorized by the entity 101. The security manager 150 may be configured to purge the DEK 119 from the DAV platform 120 after using the DEK 119 in encryption/decryption operations, which may comprise, inter alia, erasing the DEK 119, securely erasing the DEK 119, and/or the like. The data security manager 150 may be configured to persistently retain a secure DEK (SDEK) 219 corresponding to the DEK 119. As used herein, an SDEK 219 refers to data configured to enable the security manager 150 to obtain a corresponding DEK 119 if, and only if, authorized by the entity 101 associated with the DEK 119. An SDEK 219 may comprise the DEK 119 encrypted and/or wrapped in a master key 111 managed by a KMS 110 associated with the entity 101 (and/or a key encryption key (KEK) associated with the master key 111). Alternatively, or in addition, the SDEK 219 may comprise information to securely exchange the DEK 119 with the KMS 110 (e.g., may comprise client-side key exchange data pertaining to a secure key exchange protocol, such as a Diffie-Hellman key exchange).

In the FIG. 2A embodiment, the KMS 110 may securely manage master keys 111 associated with the entity 101. The KMS 110 may maintain the master keys 111 within a Hardware Security Module (HSM) 115, which may prevent the master keys 111 from being exposed outside of the HSM 115 and/or KMS 110. The entity 101 may control access to the master keys 111 (e.g., the entity 101 may selectively authorize access to specified master keys 111). The entity 101 may authorize the DAV platform 120 to access designated master keys 111 (e.g., master key 111A). The DAV platform 120 may be configured to encrypt data pertaining to the entity 101 (e.g., the dataset 148) using the DEK 119 corresponding to the designated master key 111A. The security manager 150 may obtain the DEK 119 used to encrypt the dataset 148 from the KMS 110 (e.g., by sending a generate request to the KMS 110 that comprises, inter alia, an identifier of the master key 111A designated by the entity 101). The KMS 110 may determine whether the entity 101 has authorized the DAV platform 120 to access the designated master key 111A and, if so, may generate and return the DEK 119 (and/or corresponding SDEK 219) to the security manager 150. The security manager 150 may use the DEK 119 to encrypt the dataset 148, as disclosed above.

The security manager 150 may be configured to prevent the DEK 119 from being persistently retained within the DAV platform 120. The DEK 119 may be needed to decrypt the dataset 148 for use within the DAV platform 120. Since the DEK 119 is not persistently retained, decrypting the dataset 148 may comprise obtaining the DEK 119 from the KMS 110. The security manager 150 may request the DEK 119 from the KMS 110, the request comprising, inter alia, the SDEK 219 corresponding to the DEK 119 and/or identifier of the master key 111A associated with the DEK 119. In response, the KMS 110 may determine whether the DAV platform 120 is authorized to access the master key 111A and, if so, may return the DEK 119, which may then be used to decrypt the dataset 148. If the entity 101 has revoked access to the master key 111A, the KMS 110 may not provide the DEK 119 to the security manager 150, which may prevent the security manager 150 from decrypting and/or otherwise accessing the dataset 148 (and/or other data pertaining to the entity 101). Accordingly, the security manager 150 disclosed herein may be configured to: a) use the DEK 119 controlled by the entity 101 to encrypt data pertaining to the entity 101 within the DAV platform 120, and b) prevent the DEK 119 (and/or unencrypted data pertaining to the entity 101) from being persistently retained, which may enable the security manager 150 to allow the entity 101 to retain control over data after such data has been imported into the DAV platform 120.

In some embodiments, the security manager 150 may be further configured to prevent unauthorized access to the DEK 119 and/or unencrypted data 147 pertaining to the entity 101. In some embodiments, the DEK 119 (and/or unencrypted data 147) may be maintained in volatile memory that is periodically purged. The volatile memory may be pinned to physical memory, such that contents of the memory (e.g., the DEK 119) are not stored in virtual memory (e.g., swap storage, a swap file, and/or the like). Alternatively, or in addition, the DEK 119 may be stored within protected memory that is not accessible to processes other than the security manager 150. The security manager 150 may be configured to operate in a particular protection domain (e.g., a particular ring, such as ring 0), such that memory allocated by the security manager 150 for temporary storage of the DEK 119 is inaccessible to other processes. The security manager 150 may be further configured to purge the DEK 119 after using the DEK 119 to encrypt and/or decrypt data pertaining to the entity 101. Purging the DEK 119 may comprise erasing the DEK 119 from memory resources of the data manager 140. Purging the DEK 119 may further comprise removing the DEK 119 from virtual memory storage (e.g., swap storage, a swap file, and/or the like). Alternatively, or in addition, purging the DEK 119 may comprise securely erasing the DEK 119 (e.g., clearing and/or overwriting memory location(s) used to store the DEK 119).

As disclosed above, the security manager 150 may store encrypted datasets 148 with encryption metadata 159. The encryption metadata 159 may be stored at a determined offset within the dataset 148 (e.g., at the head of the dataset 148), which may enable the security manager 150 to extract the encryption metadata 159 during subsequent decryption operations. The encryption metadata 159 may comprise information pertaining to encryption of the dataset 148, including information pertaining to the DEK 119 used to the encrypt dataset 148 (and required to decrypt the dataset 148). In the FIG. 2A embodiment, the encryption metadata 159 comprises the SDEK 219 corresponding to the DEK 119, and a master key identifier (MKID) 211. The MKID 211 may comprise an identifier of the master key 111 associated with the DEK 119 and may be used to obtain the DEK 119 from a KMS 110 (in conjunction with the SDEK 219). In other embodiments, the SDEK 219 may be stored separately from the encrypted dataset 148 (e.g., in separate persistent storage, such as secure DEK storage 165, as disclosed in further detail herein).

Referring back to FIG. 1, the security manager 150 may be configured to obtain a DEK 119 for use in encrypting/decrypting imported data pertaining to respective entities 101 from one or more KMS 110 (in accordance with the security policies 137 and/or KMS configuration(s) of the respective entities 101). The security manager 150 may obtain a new DEK 119 for encryption of data pertaining to a particular entity 101 by, inter alia, sending a request to generate the DEK 119 to a KMS 110 associated with the particular entity 101. The request may comprise credentials to authenticate the DAV platform 120 to the KMS 110, may identify the entity 101 and/or master key 111 associated with the new DEK 119, and so on. In response to the request, the KMS 110 may determine whether the DAV platform 120 is authorized to access the master key 111 of the entity 101 (based on KMS access controls managed between the entity 101 and the KMS 110). If the KMS 110 determines that the request is authorized, the KMS 110 may generate a new DEK 119 and/or provide the new DEK 119 (and/or corresponding SDEK 219) to the DAV platform 120. In some embodiments, the KMS 110 may generate the new DEK 119 and transmit the new DEK 119 to the DAV platform 120 via the network 106. Alternatively, or in addition, generating the new DEK 119 may comprise performing a secure key exchange protocol between the KMS 110 and the DAV platform 120 by which the new DEK 119 is securely exchanged between the DAV platform 120 and the KMS 110 (e.g., in a secure key exchange protocol, such as a Diffie-Hellman key exchange and/or the like). In some embodiments, the security manager 150 may be configured to store SDEKs 219 corresponding to the DEKs 119 used to encrypt respective datasets 148 with the respective encrypted datasets 148 (may include the SDEKs 219 in encryption metadata 159 of the respective datasets 148, as illustrated in FIG. 2A). Alternatively, or in addition, the security manager 150 may be configured to store SDEKs 219 separately from the encrypted datasets 148 (e.g., in secure DEK storage 165).

Figure 2B:
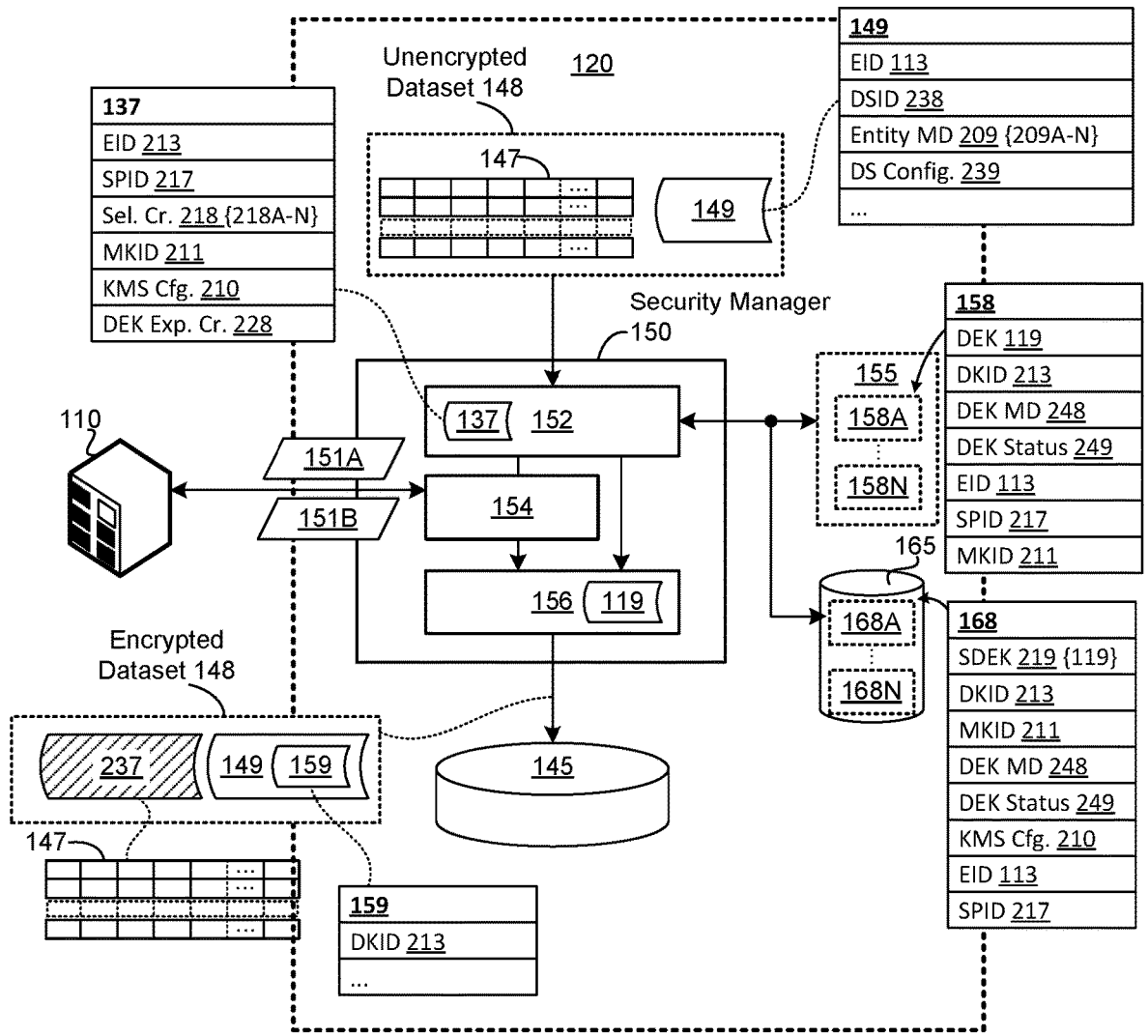
FIG. 2B is a schematic block diagram depicting further data import and encryption operations implemented by embodiments of the disclosed DAV platform.

FIG. 2B depicts further embodiments of the disclosed DAV platform 120. In the FIG. 2B embodiment, the security manager 150 may be configured to store DEK records 168 within secure DEK storage 165. Each DEK record 168 (DEK records 168A-N) may comprise information pertaining to a respective DEK 119 and, in particular, information to enable the security engine 150 to request the corresponding DEK 119 from a specified KMS 110. Such information may include an SDEK 219 corresponding to the DEK 119. Obtaining a DEK 119 from a KMS 110 may involve a certain amount of overhead (e.g., may require the DEK 119 to be obtained from a KMS 110 via the network 106). In some embodiments, the security manager 150 may be further configured to temporarily cache DEKs 119 that are currently being used within the DAV platform 120 within a DEK cache 155 (as respective DEK cache entries 158). The DEK cache 155 may comprise a plurality of DEK cache entries 158A-N, each comprising a respective DEK 119. The cached DEKs 119 may be used in a number of different encryption/decryption operations without "re-requesting" the DEKs 119 from the corresponding KMS 110.

As disclosed above, the security manager 150 may be configured to encrypt datasets 148 for storage within the DAV platform 120 in accordance with applicable security policies 137. In response to a request to encrypt a dataset 148 (a dataset 148 comprising unencrypted data 147 pertaining to an entity 101), the policy engine 152 may be configured to identify a security policy 137 corresponding to the dataset 148. The policy engine 152 may select the security policy 137 from the configuration storage 135 (from one or more entity configurations 133). Alternatively, or in addition, the policy engine 152 may select the security policy 137 from one or more cached entity configurations 133 and/or security policies 137 (e.g., configuration data cached at the data manager 140). The policy engine 152 may select the security policy 137 based on, inter alia, the dataset metadata 149 associated with the dataset 148. In the FIG. 2B embodiment, the dataset metadata 149 comprises an EID 113, a DSID 238, entity metadata 209, and so on. The EID 113 may identify the entity 101 to which the dataset 148 pertains. The DSID 238 may identify the dataset 148 within the DAV platform 120, as disclosed herein (e.g., may comprise a name of the dataset 148, a primary and/or unique key of the dataset 148, and/or the like). The entity metadata 209 may comprise any suitable information pertaining to the dataset 148, which may include, but is not limited to, one or more of: source metadata 209A, attribute metadata 209B, and so on, including user metadata 209N, as disclosed above.

In the FIG. 2B embodiment, a security policy 137 may include, but is not limited to, one or more of: an EID 113, a security policy identifier (SPID) 217, selection criteria 218, a master key identifier (MKID) 211, a KMS configuration 210, DEK expiration criteria 228, and/or the like. The EID 113 may specify the entity 101 to which the security policy 137 applies (e.g., may be inherited from the corresponding entity configuration 133). The SPID 217 may be configured to identify the security policy 137 within the DAV platform 120. The selection criteria 218 may comprise one or more criteria for identifying datasets 148 to which the security policy 137 applies (e.g., distinguishing datasets 148 to which the security policy 137 applies from datasets 148 to which the security policy 137 does not apply). The MKID 211 may identify a master key 111 for use in generating a DEK 119 to encrypt datasets 148 matching the selection criteria 218. The KMS configuration 210 may comprise information pertaining to a designated KMS 110 (e.g., the KMS 110 to use to generate and/or otherwise manage a DEK 119 pertaining to the security policy 137). The DEK expiration criteria 228 may define criteria for DEK refresh operations (e.g., may define the lifetime of a DEK 119 pertaining to the security policy 137). The DEK expiration criteria 228 may define the lifetime of a DEK 119 using any suitable metric, threshold, criteria, and/or the like including, but not limited to: a time expiration criteria, DEK usage expiration criteria, a KMS expiration criteria and/or the like. Time expiration criteria may specify that a DEK 119 is to expire after a predetermined time period (e.g., after the predetermined time period has elapsed since the DEK 119 was generated). A time expiration criterion may, therefore, require that the DEK 119 be refreshed on a period basis (e.g., a weekly basis, an hourly basis, and/or the like). A DEK usage expiration criterion may specify that a DEK 119 is to expire after being used to encrypt a determined amount of data, a threshold number of datasets 148 (and/or dataset entries 147), and/or the like. A DEK usage expiration criterion may, therefore, limit the amount of data potentially exposed if the DEK 119 is compromised. A KMS expiration criterion may specify that a DEK 119 is to expire after being obtained from and/or exchanged with the KMS 110 a threshold number of times. Although particular expiration criteria are described herein, the disclosure is not limited in this regard, and could be adapted to use any suitable criteria for expiring and/or refreshing a DEK 119.

The policy engine 152 may be configured to identify the security policy 137 that corresponds to a dataset 148 by, inter alia, matching the dataset metadata 149 to selection criteria 218 of the security policy 137. The policy engine 152 may be configured to compare the dataset metadata 149 to selection criteria 218 of each security policy 137 of the specified entity (per the EID 113 of the dataset metadata 149). In the FIG. 2B embodiment, the selection criteria 218 may comprise, but is not limited to, one or more of: source criteria 218A, attribute criteria 218B, name criteria 218C, content criteria 218D, and so on, including user criteria 218N. Source criteria 218A may specify dataset source metadata (e.g., the entity dataset(s) 108 and/or DMS 102 from which the dataset 148 was extracted), as disclosed above. Attribute criteria 218B may specify one or more dataset attributes (e.g., security labels, tabs, and/or the like, as disclosed herein). Name criteria 218C may define naming information, such as a dataset name, partial name, path, partial path, and/or the like (e.g., name criteria 218C may be configured to match datasets 148 having a name that includes the term "revenue" and/or "sales" such that the security policy 147 applied to datasets 148 comprising columns and/or other data elements with such names differs from the security policies 137 applied to other datasets of the entity 101). Content criteria 218D may pertain to content of the dataset 148 (e.g., column names, column types, field names, field types, dataset size, and/or the like). User criteria 218N may identify one or user(s) and/or user group(s) of the entity 101. Although particular examples of selection criteria 218 are described herein, the disclosure is not limited in this regard, and could be adapted to use any suitable criteria for dataset selection. Alternatively, or in addition, an entity 101 may establish a security policy 137 that applies to all data pertaining to the entity 101 within the DAV platform 120. In such embodiments, the security policy 137 may not include selection criteria 218 (e.g., the policy engine 152 may select the security policy 137 on the basis of the EID 113 of the dataset configuration 143).

The policy engine 152 may use the selected security policy 137 to obtain a DEK 119 for use in encrypting the dataset 148. The policy engine 152 may provide the DEK 119 to a processing module 156, which may use the DEK 119 to encrypt the dataset 148 (and/or generate an encrypted dataset entry 147), as disclosed herein. The policy engine 152 may obtain the DEK 119 by use of one or more of the DEK cache 155, the secure DEK storage 165, and/or a KMS 110 (and KMS agent 154). The policy engine 152 may determine whether a suitable DEK 119 is cached within the DEK cache 155. If so, the policy engine 152 may configure the processing module 156 to use the cached DEK 119 to encrypt the dataset 148, as disclosed herein. If a suitable DEK 119 is not available within the DEK cache 155, the policy engine 152 may obtain a new DEK 119 and/or determine whether a suitable DEK record 168 is available within the secure DEK storage 165. If a suitable DEK record 168 is identified, the policy engine 152 may configure the KMS agent 154 obtain the corresponding DEK 119 from a KMS 110 (and configure the processing module 156 to use the DEK 119 in the encryption operation). If no suitable DEK record 168 is available within the secure DEK storage 165 (and/or the KMS agent 154 is unable to obtain the corresponding DEK 119), the policy engine 152 may configure the KMS agent 154 to request a new DEK 119 from a KMS 110 (e.g., request the new DEK 119 in accordance with the KMS configuration 210 of the selected security policy 137).

As disclosed above, the security manager 150 may be configured to temporarily cache DEKs 119 that are actively being used within the DAV platform 120 within a DEK cache 155. A cached DEK 119 may be used in a number of different encryption and/or decryption operations without being "re-requested" from the corresponding KMS 110 in each operation. The DEK cache 155 may comprise one or more DEK cache entries 158A-N, each comprising a respective DEK 119. The security manager 150 may be configured to secure the contents of the DEK cache 155. The security manager 150 may ensure that contents of the DEK cache 155 are not retained persistently (e.g., maintained in volatile memory as opposed to persistent storage). The security manager 150 may be configured to periodically purge DEK cache entries 158 from the DEK cache 155. Purging a DEK cache entry 158 may comprise performing a secure erase operation in which memory address(es) associated with the DEK cache entry 158 are overwritten with one or more nonce data patterns. In some embodiments, the DEK cache 155 may be maintained in memory resources that are protected from being swapped out to virtual memory storage (e.g., in a memory region that is "pinned" within physical memory). Alternatively, or in addition, the DEK cache 155 may be maintained in a protected memory region that is inaccessible to processes other than processes associated with the security manager 150, as disclosed herein.

In the FIG. 2B embodiment, each DEK cache entry 158 may include, but is not limited to: a DEK 119, a DEK identifier (DKID) 213, DEK metadata 248, DEK status 249, and/or the like. The DKID 213 may comprise any suitable identifier, and may be configured to identify the DEK 119 (and/or DEK cache entry 158) within the DAV platform 120.

The DEK metadata 248 may comprise any suitable information pertaining to the DEK 119, which may include, but is not limited to, one or more time metrics, DEK usage metrics, KMS metrics, and/or the like. DEK time metrics may comprise one or more of a generation timestamp indicating the time at which the DEK 119 was generated, an authorization timestamp indicating the time at which the DEK 119 was last obtained from the KMS 110, an age of the DEK 119 (time elapsed since the DEK 119 was generated and/or last authorized), and/or the like. The DEK usage metrics may quantify usage of the DEK 119, such as a number of datasets 148 encrypted by the DEK 119, an amount of data encrypted by the DEK 119, a number of times the DEK 119 has been used in decryption operations, and/or the like. The KMS metrics may indicate the number of times the DEK 119 has been obtained from the KMS 110, and/or the like. The DEK status 249 may indicate whether the DEK 119 has expired (per DEK expiration criteria 228 associated with the DEK 119). A DEK cache entry 158 may further comprise one or more of: an EID 113, an SPID 217, an MKID 211, and/or the like. The EID 113 may identify the entity 101 associated with the DEK 119. The SPID 217 may identify the security policy 137 associated with the DEK 119. The MKID 211 may identify the master key 111 (and/or KMS 110) from which the DEK 119 was derived.

In some embodiments, the security manager 150 may be configured to securely store DEK records 168 pertaining to DEKs 119 used within the DAV platform 120 within secure DEK storage 165 (as opposed to storing the SDEKs 219 with the encrypted datasets 148 themselves, as in FIG. 2A). The secure DEK storage 165 may comprise any suitable storage resource (e.g., a persistent storage resource, as disclosed herein). Each DEK record 168 may comprise information to enable the KMS agent 154 to obtain a respective DEK 119 (from a corresponding KMS 110). A DEK record 168 may include, but is not limited to, one or more of: an SDEK 219 of a DEK 119, a DKID 213 of the DEK 119, an MKID 211 of a master key 111 associated with the DEK 119, DEK metadata 248, DEK status 249, and/or the like. The SDEK 219 may comprise secure key information by which the DEK 119 can be obtained from a corresponding KMS 110. The SDEK 219 may be secured such that the security manager 150 (and/or other components of the DAV platform 120) cannot derive the corresponding DEK 119 independently of the KMS 110. Accordingly, if the entity 101 revokes access to the master key 111 and/or KMS 110 associated with the SDEK 219 and/or MKID 211, the DAV platform 120 may not be capable of accessing the DEK 119, which may prevent the security manager 150 from accessing data encrypted by use of the DEK 119 within the DAV platform 120. As disclosed above, the SDEK 219 may comprise secure key information from which the DEK 119 may be cryptographically derived (by use of the master key 111 and/or KEK). The DEK metadata 248 may comprise information pertaining to the DEK 119, as disclosed above (e.g., DEK time metrics, DEK usage metrics, KMS metrics, and/or the like). The DEK status 249 may indicate whether the DEK 119 has expired (per DEK expiration criteria 228 of a security policy 137 associated with the DEK 119). In some embodiments, a DEK record 168 further comprises one or more of a KMS configuration 210, an EID 113, an SPID 217, and/or the like. The KMS configuration 210 may comprise information for requesting the DEK 119 from a specified KMS 110 (e.g., provide information for securely requesting the DEK 119 connection from the specified KMS 110). Alternatively, or in addition, the DEK record 168 may reference a KMS configuration 210 of a security policy 137 and/or entity configuration 133 associated with the DEK 119, as disclosed herein. The EID 113 may identify the entity 101 associated with the DEK 119 and the SPID 217 may identify a security policy 137 associated with the DEK 119 (which may define DEK expiration criteria 228 pertaining to the DEK 119).

The KMS agent 154 of the security manager 150 may be configured to obtain a DEK 119 from a KMS 110 by use of, inter alia, the DEK record 168 associated with the DEK 119. The KMS agent 154 may be configured to interface with a plurality of different KMS 110 in accordance with KMS configuration(s) 210 associated with the respective KMS 110 (e.g., KMS 110A-N as illustrated in FIG. 1). The KMS agent 154 may obtain a DEK 119 corresponding to a DEK record 168 by, inter alia, a) determining a KMS configuration 210 associated with the DEK record 168, and b) requesting the DEK 119 from the KMS 110 associated with the determined KMS configuration 210. In some embodiments, the KMS configuration 210 may be included in the DEK record 168. Alternatively, or in addition, the KMS configuration 210 may be determined from a security policy 137 and/or entity configuration 133 associated with the DEK record 168 (e.g., per the EID 113 and/or SPID 217 included in the DEK record 168). The determined KMS configuration 210 may specify the KMS 110 from which the DEK 119 may be obtained, provide information for establishing a secure connection to the KMS 110 via the network 106, define credentials for use in establishing the secure connection (e.g., authenticating and/or authorizing the connection and/or corresponding request(s) issued to the KMS 110 by the KMS agent 154), and so on. The KMS agent 154 may transmit a request 151A to the KMS 110. The request 151A may comprise a DEK request (e.g., a request to obtain a DEK 119 that was previously generated by the KMS 110). The request 151A may comprise the SDEK 219 of the DEK record 168. The request 151A may further comprise the MKID 211 (the identifier of the master key 111 associated with the DEK 119). If the KMS 110 determines that the request 151A is authorized, the KMS 110 may send a response to the KMS agent 154. The response may comprise securely transmitting the DEK 119 from the KMS 110 to the KMS agent 154 via the network 106. Alternatively, or in addition, the response may comprise performing a secure key exchange between the KMS 110 and the KMS agent 154 to thereby securely transfer the DEK 119, as disclosed herein. Obtaining the DEK 119 from a KMS 110 may involve a certain amount of overhead (network latency and/or bandwidth for network communication between the KMS 110 and DAV platform 120, and so on). As such, the KMS agent 154 may be further configured to cache the DEK 119 obtained from the KMS 110 within the DEK cache 155, as disclosed herein.

As disclosed above, the security manager 150 may be configured to encrypt data within the persistent storage resources 145. The security manager 150 may service a request to store and/or encrypt a dataset 148. The request 203 may be issued in response to the import engine 142 importing the dataset 148 from one or more entity dataset(s) 108 and/or DMS 102, as disclosed herein. In response to the request 201, the policy engine 152 may determine the security policy 137 that corresponds to the dataset 148, as disclosed herein (e.g., by comparing dataset metadata 149 of the dataset 148 with selection criteria 218 of one or more security policies 137). The policy engine 152 may use the security policy 137 to obtain a DEK 119 for use in encrypting the dataset 148. Obtaining the DEK 119 may comprise:

a) searching the DEK cache 155, b) searching the secure DEK storage 165, and/or c) generating a DEK 119.

Searching the DEK cache 155 may comprise determining whether the DEK cache 155 comprises a DEK cache entry 158 that satisfies the security policy 137. The policy engine 152 may determine whether a DEK cache entry 158 satisfies the security policy 137 by, inter alia, determining whether the DEK 119 of the DEK cache entry 158 is associated with the same entity 101 as the security policy 137, corresponds to the master key 111 and/or KMS 110 as the security policy 137 (has a same MKID 211 and/or KMS configuration 210), has not expired, and so on. If the DEK cache entries 158 include an SPID 217, the policy engine 152 may search the DEK cache 155 by identifying DEK cache entries 158 that have the same SPID 217 as the security policy 137 (and a DEK status 249 indicating that the corresponding DEK 119 is not expired). Alternatively, or in addition, the policy engine 152 may search the DEK cache 155 by, inter alia, identifying DEK cache entries 158 that match the EID 113 and MKID 211 of the security policy 137 (and have an appropriate DEK status 249). The policy engine 152 may be further configured to filter the identified DEK cache entries 158 (if any) based on whether the corresponding DEKs 119 are expired (despite not being identified as expired by the DEK status 249 thereof). The policy engine 152 may determine whether a DEK 119 has expired based on DEK expiration criteria 228 of the security policy 137 (if any). Determining whether a DEK 119 of a DEK cache entry 158 has expired may comprise one or more of: comparing DEK time metrics, DEK usage metrics, and/or KMS metrics of the DEK metadata 248 to corresponding time expiration criteria, usage expiration criteria, and/or KMS expiration criteria of the DEK expiration criteria 228. The policy engine 152 may be configured to update the DEK status 249 of any DEK cache entries 158 determined to be expired. The policy engine 152 may select a DEK cache entry 158 for the encryption operation in response to determining that the DEK 119 satisfies the security policy 137 and is not expired. In some embodiments, the policy engine 152 is further configured to verify that the DAV platform 120 is still authorized to utilize the DEK 119. The policy engine 152 may configure the KMS agent 154 to request confirmation from the KMS 110 associated with the DEK 119 (and/or entity 101) that the DAV platform 120 is authorized to access the master key(s) 111 associated with the DEK 119. The policy engine 152 may utilize the DEK 119 in the encryption operation if the KMS 110 and/or entity 101 indicates that the DAV platform 120 is still authorized to do so. Alternatively, the policy engine 152 may utilize the DEK 119 without verifying authorization.

If the policy engine 152 fails to find a suitable DEK 119 within the DEK cache 155, the policy engine 152 may proceed to searching the secure DEK storage 165. Searching the secure DEK storage 165 may comprise identifying DEK records 168 (if any) that satisfy the security policy 137 and are not expired. The policy engine 152 may determine whether a DEK record 168 satisfies the security policy 137 by, inter alia, determining whether the DEK record 168 is associated with the same entity 101 as the security policy 137, corresponds to the same master key 111 and/or KMS 110, has not expired, and so on, as disclosed above. If the policy engine 152 identifies a DEK record 168 that satisfies the security policy 137 within the DEK storage 165, the policy engine 152 may configure the KMS agent 154 to acquire corresponding DEK 119 from a KMS 110. The KMS agent 154 may acquire the DEK 119 from the KMS 110 using information contained in the DEK record 168, as disclosed herein (e.g., sending a request 151A to the KMS 110, the request 151A comprising, inter alia, the SDEK 219 of the DEK record 168). If the KMS 110 determines that the request 151A is authorized, the KMS 110 may provide the DEK 119 to the KMS agent 154, as disclosed herein. The policy engine 152 may provide the DEK 119 to the processing module 156 for use in encrypting the dataset 148. The policy engine 152 may be further configured to admit the DEK 119 into the DEK cache 155 (e.g., create a new DEK cache entry 158 comprising the DEK 119 within the DEK cache 155).

If the policy engine 152 is unable to identify a obtain a suitable DEK 119 within the DEK cache 155 and/or secure DEK storage 165, the policy engine 152 may configure the KMS agent 154 to request a new DEK 119. The KMS agent 154 may be configured to request generation of the new DEK 119 in accordance with the KMS configuration 210 of the security policy 137. The KMS configuration 210 may specify the KMS 110 from which the new DEK 119 is to be obtained (and/or specify a master key 111 from which the new DEK 119 should be derived). Generating the new DEK 119 may comprise transmitting a request 151B to the KMS 110. The request 151B may comprise a request to generate a new DEK 119 corresponding to a specified MKID 211. The request 151B may further comprise the EID 113, authentication credentials, and/or the like. If the KMS 110 determines that the request 151B is authorized, the KMS 110 may generate the new DEK 119. The KMS 110 may be further configured to transfer the new DEK 119 to the KMS agent 154, as disclosed herein. The KMS 110 may be further configured to provide SDEK 219 to the KMS agent 154, as disclosed herein. In response to obtaining the new DEK 119 from the KMS 110, the policy engine 152 may be configured to store a corresponding DEK record 168 within the secure DEK storage 165 and/or cache the new DEK 119 within the DEK cache 155, as disclosed herein.

In response to receiving an unencrypted dataset 148 for storage, the policy engine 152 may identify the security policy 137 corresponding to the dataset 148 and obtain a DEK 119 for use in encrypting the dataset 148. The policy engine 152 may obtain the DEK 119 from one or more of the DEK cache 155 and the KMS agent 154 (which may obtain a DEK 119 corresponding to a DEK record 168 and/or a new DEK 119 from a designated KMS 110, as disclosed herein). The policy engine 152 may be further configured to provide the DEK 119 to the processing module 156, which may use the DEK 119 to encrypt the dataset 148 for storage, as disclosed herein. The policy engine 152 may be further configured to update DEK metadata 248 pertaining to the DEK 119, in response to obtaining the DEK 119 and/or using the DEK 119 in the DEK 119 in the encryption operation. Updating the DEK metadata 248 may comprise, inter alia, updating time metrics (e.g., setting a timestamp of the DEK 119 if the DEK 119 comprises a new DEK 119 generated by the KMS 110, setting an authorization timestamp if the DEK was obtained using an existing SDEK 219, and/or the like), updating DEK usage metrics to increment a number and/or amount of data encrypted by the DEK 119, updating KMS metrics (e.g., if the DEK 119 was obtained from the KMS 110 using an existing SDEK 219), and/or the like. The DEK metadata 248 may be updated in one or more of the DEK cache 155 and/or secure DEK storage 165.

In some embodiments, the policy engine 152 may be configured to admit new DEKs 119 into the DEK cache 155 in response to obtaining the new DEKs 119 from one or more KMS 110. As such, when a new DEK 119 is obtained from a KMS 110 by the KMS agent 154, the policy engine 152 may store a corresponding DEK cache entry 158 comprising the new DEK 119 within the DEK cache 155. In some embodiments, the policy engine 152 is configured to retain DEK cache entries 158 within the DEK cache 155 until the corresponding DEKs 119 are determined to be expired, such that the DEK cache 155 comprises substantially all of the "active" and/or "non-expired" DEKs 119 currently being used to encrypt data within the DAV platform 120. Accordingly, if the policy engine 152 is unable to identify a suitable DEK 119 for encryption of a particular dataset 148, the policy engine 152 may configure the KMS agent 154 to obtain a new DEK 119 from a KMS 110 rather than searching the secure DEK storage 165 for a DEK record 168 corresponding to a suitable, non-expired, DEK 119 (since all non-expired DEKs 119 are available within the DEK cache 155).

The policy engine 152 may be further configured to monitor the DEK cache entries 158 within the DEK cache 155 in order to, inter alia, identify DEK cache entries 158 that should be evicted from the DEK cache 155. The policy engine 152 may identify a DEK cache entry 158 for eviction from the DEK cache 155 in response to determining that the corresponding DEK 119 is expired. Monitoring a DEK cache entry 158 may comprise comparing the DEK metadata 248 of the DEK cache entry 158 to DEK expiration criteria 228 of a corresponding security policy 137, as disclosed herein. In response to identifying an expired DEK cache entry 158, the policy engine 152 may evict the DEK cache entry 158 and/or update the DEK status 249 of the corresponding DEK record 168 (to indicate that the DEK 119 is expired). Evicting a DEK cache entry 158 may comprise erasing and/or purging the DEK cache entry 158 from the DEK cache 155, as disclosed herein.

Figure 2C:
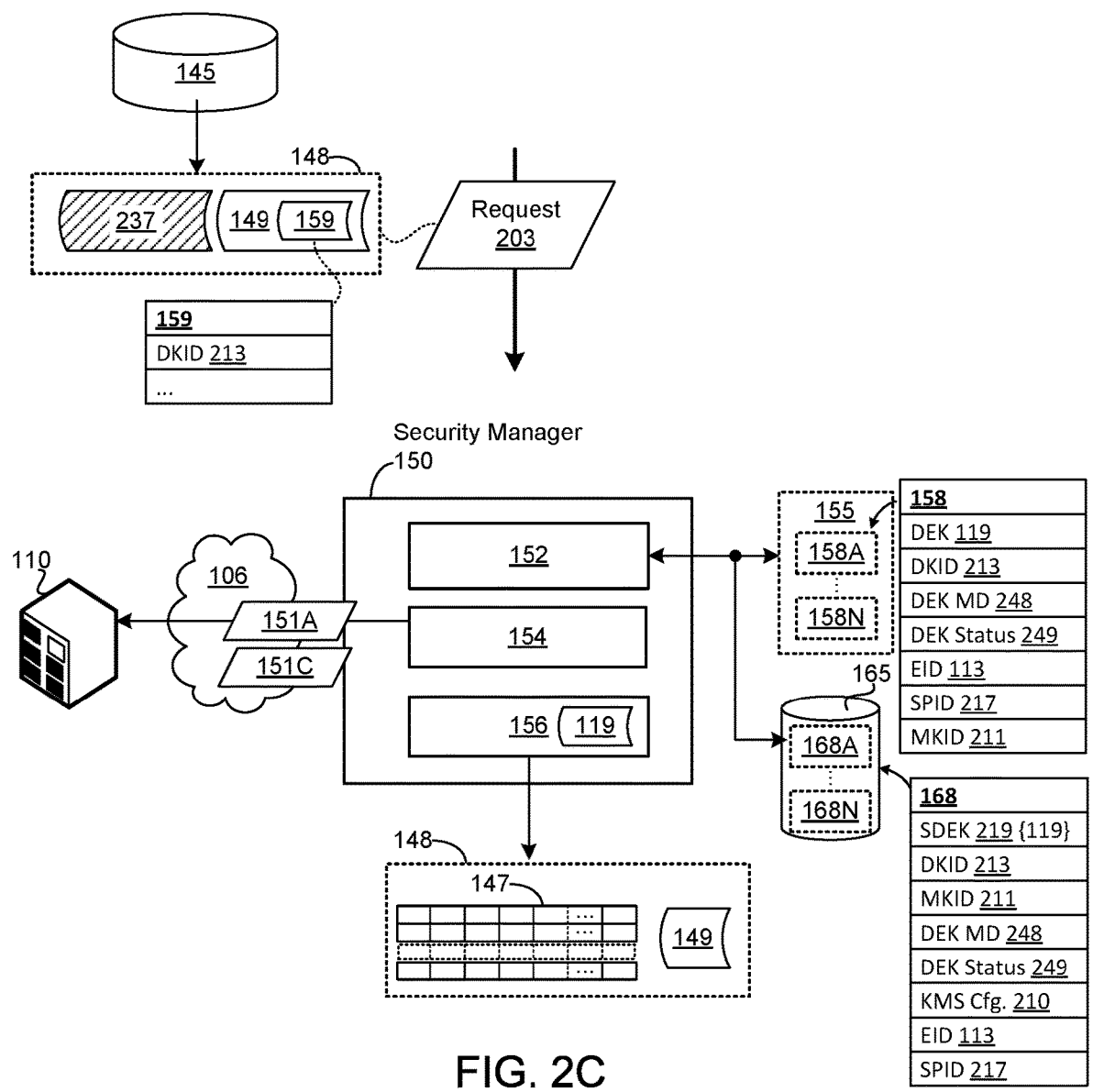
FIG. 2C is a schematic block diagram depicting data access and/or decryption operations implemented by embodiments of the disclosed DAV platform.

Referring back to FIG. 1, the security manager 150 may be further configured to provide access to encrypted data within the DAV platform 120. The security manager 150 may be configured to service requests to access encrypted datasets 148, which may comprise: decrypting the datasets 148 (to generate corresponding decrypted datasets 148), returning the decrypted datasets 148 to the requester(s), and so on. FIG. 2C depicts further embodiments of the disclosed DAV platform 120. In the FIG. 2C embodiment, the security manager 150 receives a request 203 to access and/or decrypt an encrypted dataset 148. In some embodiments, the request 203 may comprise the encrypted dataset 148. Alternatively, or in addition, the request 203 may comprise an identifier of the encrypted dataset 148 (e.g., a DSID 238), which may enable the security manager 150 (and/or other component(s) of the DAV platform 120) to retrieve the encrypted dataset 148 from the persistent storage resources 145.

In response to the request 203, the policy engine 152 may use the dataset metadata 149 (and/or encryption metadata 159) to identify the DEK 119 required to decrypt the dataset 148. In the FIG. 2C embodiment, the encryption metadata 159 of the dataset 148 may comprise a DKID 213, which may uniquely identify the DEK 119 used to encrypt the dataset 148 (and/or identify the DEK cache entry 158 or DEK record 168 corresponding to the DEK 119). Alternatively, and as illustrated in FIG. 2A, the encryption metadata 159 stored with the encrypted dataset 148 may comprise the SDEK 219 and/or MKID 211 of the DEK 119 used to encrypt the dataset 148 (as opposed to storing the SDEK 219 and/or MKID 211 in the separate secure DEK storage 165). The policy engine 152 may attempt to retrieve the DEK 119 required to decrypt the dataset 148 from the DEK cache 155, which may comprise searching the DEK cache 155 for a DEK cache entry 158 corresponding to the DKID 213. If the DEK 119 is available within the DEK cache 155, the policy engine 152 may provide the DEK 119 to the processing module 156. The processing module 156 may use the cached DEK 119 to service the request 203, which may comprise decrypting the encrypted dataset 148 and returning a corresponding decrypted dataset 148 in response to the request 203. The policy engine 142 may be further configured to update the DEK metadata 248 pertaining to the DEK 119, as disclosed above. Updating the DEK metadata 248 may comprise updating DEK usage metrics (e.g., incrementing a number of datasets 148 decrypted by the DEK 119 and/or amount of data decrypted by the DEK 119) and/or the like.

If the DEK 119 cannot be retrieved from the DEK cache 155, the policy engine 152 may retrieve a DEK record 168 corresponding to the DKID 213 from the secure DEK storage 165. The policy engine 152 may provide the retrieved DEK record 168 to the KMS agent 154, which may use the DEK record 168 to request the DEK 119 from a KMS 110, as disclosed herein. In other embodiments, such as the embodiments illustrated in FIG. 2A, the security manager 150 may be configured to store the SDEK 219 and/or MKID 211 within the encrypted dataset 148 itself (e.g., within encryption metadata 159 stored at a determined offset within the encrypted dataset 148). In such embodiments, the policy engine 152 may be configured to extract the SDEK 219 and/or MKID 211 from the encrypted dataset 148, rather than loading a DEK record 168 from the secure DEK storage 165. As disclosed above, the KMS agent 154 may attempt to obtain the DEK 119 from a specified KMS 110, which may comprise sending a request 151A to the KMS 110 via the network 106. The request 151A may comprise a request to obtain a DEK 119 previously generated by the KMS 110, and may include the SDEK 219, MKID 211, and/or the like. If the KMS 110 determines that the request 151A is authorized (in accordance with KMS access controls managed by the entity 101), the KMS 110 may provide the DEK 119 to the KMS agent 154, as disclosed herein.

In response to the KMS agent 154 retrieving the DEK 119 from the KMS 110, the policy engine 152 may provide the DEK 119 to the processing module 156, which may use the DEK 119 to service the request 203, as disclosed above. The policy engine 142 may be further configured to update the DEK metadata 248 pertaining to the DEK 119, as disclosed above. Updating the DEK metadata 248 may comprise updating time metrics (e.g., updating an authorization timestamp of the DEK 119), updating DEK usage metrics, updating KMS metrics (e.g., updating a count of the number of times the DEK 119 has been obtained from the KMS 110), and/or the like.

If the KMS 110 determines that the request 151A is not authorized (the entity 101 has revoked access to the master key 111 and/or de-authorized the DAV platform 120), the KMS 110 may not provide the DEK 119 to the KMS agent 154 and the request 151A may fail. If the request 151A fails, the security manager 150 may not be able to obtain the DEK 119 required to decrypt the dataset 148. Accordingly, if the request 151A fails, the security manager 150 may be unable to decrypt the dataset 148 and, as such, may return an error in response to the request 203.

As disclosed above, the DAV platform 120 may be configured to enable an entity 101 to retain control over data exported from the DMS 102 of the entity 101 into the DAV platform 120. An entity 101 may establish an entity configuration 133 and/or security policy 137 that requires data pertaining to the entity 101 to be encrypted within the DAV platform 120. The security policy 137 may further require that the data be encrypted using DEK(s) 119 derived from master key(s) 111 controlled by the entity 101. The DAV platform 120 may prevent the DEK(s) 119 and/or unencrypted data of the entity 101 from being persistently retained with the DAV platform 120, such that access to the data within the DAV platform 120 requires access to the corresponding master key(s) 111 controlled by the entity 101. The entity 101 may, therefore, retain control over data pertaining to the entity 101 after such data 146 has been imported into the DAV platform 120 (e.g., after datasets 148 comprising data pertaining to the entity 101 have been imported and stored within persistent storage resources 145 of the DAV platform 120). The entity 101 may prevent the DAV platform 120 from accessing data pertaining to the entity 101 by, inter alia, revoking access to the KMS 110 and/or master key(s) 111 corresponding to the DEK(s) 119 used to encrypt the data. When such access is revoked, the DAV platform 120 may be unable to acquire the DEK 119 required to decrypt the data, which may render the data inaccessible.

In some embodiments, the security manager 150 may be further configured to enforce more finely grained access control to DEK 119 of the entity 101. The security manager 150 may be configured to provide information pertaining to the proposed use of a DEK 119 with requests 151A. For example, the security manager 150 may determine a user associated with a request to decrypt the encrypted data 148, and may include a user identifier (or other information pertaining to the user in the request 151A (e.g., a distinguished name, ACL, user authorizations, user credentials, user organization and/or group memberships, location, jurisdiction, etc.). The KMS 110 may use the information to, inter alia, determine whether the user is authorized to access the DEK 119 (e.g., in accordance with authorization metadata 117 associated with the master key 111). The authorization metadata 117 may comprise user-level access controls for respective master keys 111, which may be defined and/or managed by the entity 101. In response to the request 151, the KMS 110 may evaluate the authorization metadata 117 and may return the DEK 119 in response to determining that both the DAV platform 120 and the user are authorized (and may deny access if either the DAV platform 120 or user is not authorized to access the DEK 119). The determination may be based on characteristics of the user (e.g., whether the user is still a member of the "managers" group). Alternatively, or in addition, the determination may be based on the current location of the user (e.g., whether the user is located in a jurisdiction in which access to data secured by the DEK 119 is not allowed).

In some embodiments, the security manager 150 may be further configured to verify user access to cached DEK 119. In response to retrieving a DEK 119 from the DEK cache 155, the security manager 150 may send a request 151C to the KSM 110. The request 151C may comprise a status and/or access query configured to determine, inter alia, whether both the DAV platform 120 and the user are authorized to access the DEK 119 (per the authorization metadata 117). If the KMS 110 indicates that both the DAV platform 120 and the user are authorized, the security manager 150 may use the DEK 119 to produce unencrypted data 148, as disclosed herein. If the KMS 110 indicates that the DAV platform 120 is no longer authorized to access the DEK 119, the security manager 150 may purge the DEK 119 from the DEK cache 155, as disclosed herein. If the KMS 110 indicates that the DAV platform 120 is authorized to access the DEK 119, but that the user is not, the security manager 150 may not use the DEK 119 to decrypt the encrypted dataset 148, but may retain the DEK 119 within the DEK cache 155.

Maintaining DEK 119 in the DEK cache 155 may enable the DAV platform 120 to retain the ability to decrypt data associated with DEKs 119 even after such access is revoked by the KMS 110 and/or entity 101 (per the access metadata 117). In some embodiments, the DAV platform 120 is further configured to implement purge operations. As used herein, a purge operation refers to an operation to purge specified data from the DAV platform 120. A purge operation pertaining to a particular entity 101 may comprise removing cached DEKs 119 associated with the particular entity 101 from the DEK cache 155, removing decrypted datasets 148 associated with the particular entity 101 from the content service 170, and so on. In some embodiments, a purge operation may further comprise verifying that the DAV platform 120 is no longer authorized to access master keys 111 associated with the particular entity 101 and/or informing one or more KMS 110 associated with the entity 101 that the DAV platform 120 is no longer authorized to access master keys 111 associated with the particular entity 101.

Figure 2D:
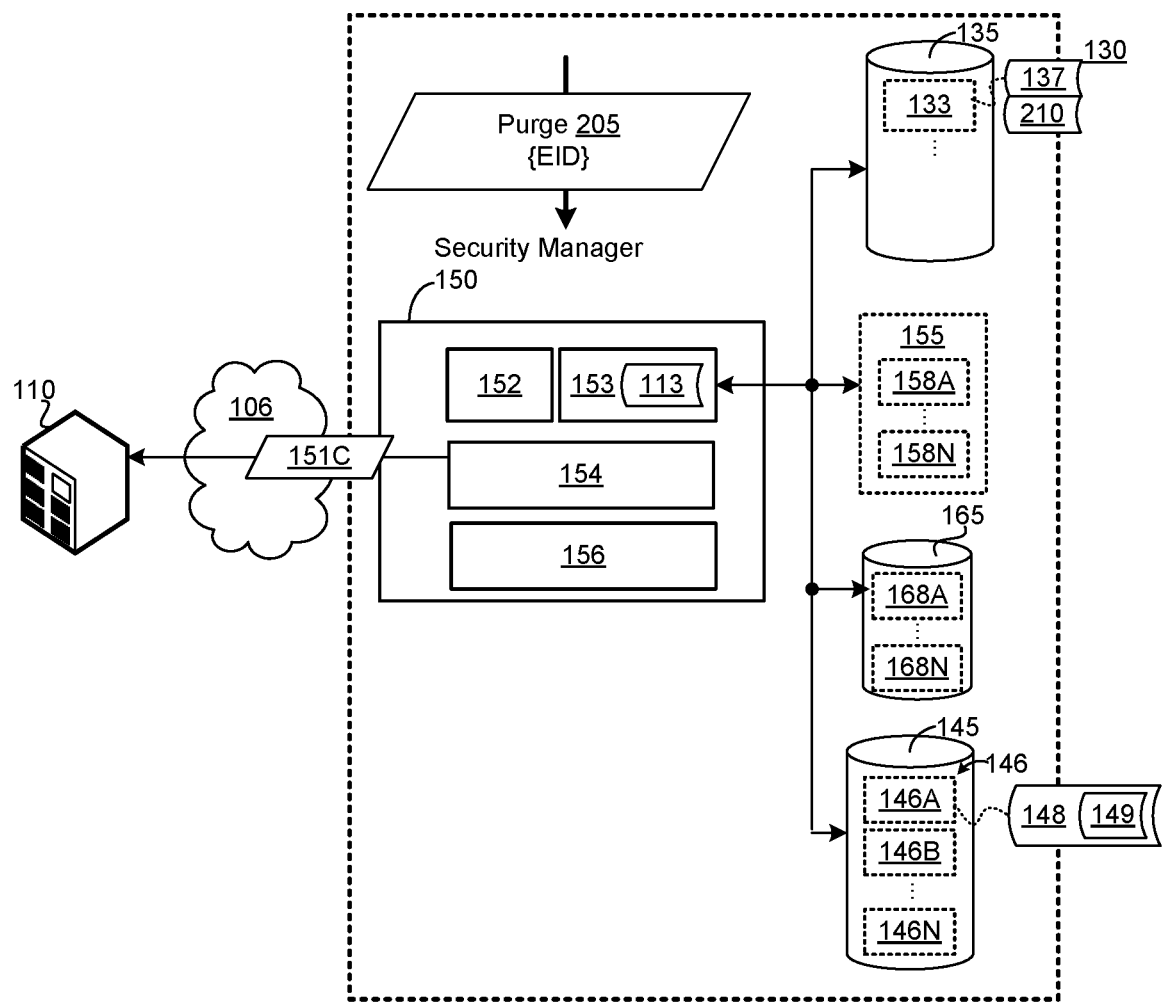
FIG. 2D is a schematic block diagram depicting purge operations implemented by embodiments of the disclosed DAV platform.

FIG. 2D depicts another embodiment of the DAV platform 120 disclosed herein. In the FIG. 2D embodiment, the security manager 150 of the DAV platform 120 comprises a policy engine 152, KMS agent 154, processing module 156, and purge engine 153. The purge engine 153 may be configured to purge data pertaining to particular entities 101 from the DAV platform 120 and/or guarantee that such data has been securely purged (e.g., guarantee that the data has been purged, erased, and/or otherwise rendered inaccessible within the DAV platform 120). The security manager 150 may be configured to monitor, track, identify, and/or purge data pertaining to particular entities 101, KMS 110, master keys 111, and/or the like.

The data manager 140 may receive a purge request 205, which may pertain to a particular entity 101 (as identified by an EID included in the purge request 205). The security manager 150 may implement the purge request 205, which may comprise purging data pertaining to the entity 101 from the DEK cache 155 by, inter alia, identifying DEK cache entries 158 associated with the EID within the DEK cache 155 (if any) and purging the identified DEK cache entries 158. Purging a DEK cache entry 158 may comprise evicting the DEK cache entry 158 from the DEK cache 155 (e.g., erasing the DEK cache entry 158). Alternatively, or in addition, purging a DEK cache entry 158 may comprise securely erasing memory storage location(s) of the DEK cache entry 158. Securely erasing the memory location(s) may comprise erasing the memory location(s), writing one or more data patterns to the memory storage location(s), repeatedly writing data patterns to the memory storage location(s), and/or the like. Purging a DEK cache entry 158 may further comprise purging data corresponding to the DEK cache entry 158 from a backing store of the DEK cache 155 (if any), virtual memory associated with the DEK cache 155 (e.g., swap storage, a swap file, and/or the like), and so on. Purging the DEK cache 155 of data pertaining to the entity 101 may ensure that encrypted data pertaining to the entity 101 stored within the DAV platform 120 (e.g., stored within persistent storage resources 145) is rendered inaccessible. Since access to the KMS 110 and/or master key(s) 111 associated with the entity 101 have been revoked, the data security manager 150 may be unable to access DEKs 119 required to decrypt data pertaining to the entity 101 stored within the persistent storage resources 145, even if corresponding DEK records 168 are retained within the secure DEK storage 165.

In some embodiments, the data security manager 150 may be further configured to verify that the DAV platform 120 is no longer authorized to access master key(s) 111 associated with the entity 101 in response to the purge request 205. Verifying that access to the master key(s) 111 has been revoked may comprise configuring the KMS agent 154 to send a request 151C to the corresponding KMS 110 (per the KMS configuration 210 of the entity 101). The request 151C may comprise an access request, a status request, an authorization query, and/or the like. The request 151C may comprise MKID(s) of the master key(s) 111 of the entity 101 (in accordance with the entity configuration 133 and/or security policies 137 of the entity 101). The KMS 110 may respond to the request 151C with an indication of whether access to the specified master key(s) 111 has been revoked. If access has not been revoked, the data security manager 150 may be further configured to request revocation of such access by the KMS 110 (if permitted by the KMS 110). Alternatively, or in addition, the data security manager 150 may purge the corresponding master key identifier(s) and/or KMS configuration 210 from the configuration storage 135, such that the DAV platform 120 is no longer capable of accessing the master key(s) 111 of the entity 101, regardless of whether the entity 101 has revoked such access. The data security manager 150 may be further configured to verify whether access to master key(s) 111 of a particular entity 101 has been revoked in response to other types of requests (e.g., in response to a request from the administration server 131 corresponding to user selection of the verify disabled input 303 of interface 328A).

In response to purging the DEK cache 155 and/or verifying that access to the master key(s) 111 of the entity 101 has been disabled, the security manager 150 may guarantee that encrypted data pertaining to the entity 101 can no longer be accessed by the security manager 150, regardless of whether encrypted datasets 148 pertaining to the entity 101 and/or DEK records 168 corresponding to DEKs 119 required to encrypt the datasets 148 are retained within the persistent storage resources 145 and/or secure DEK storage 165. The security manager 150 may make this guarantee since, inter alia, although the DEK records 168 may comprise information pertaining to the DEKs 119 used to encrypt datasets 148 pertaining to the entity 101 (e.g., SDEK 219), it may be cryptographically impossible to derive the DEKs 119 from the DEK records 168 without access to the corresponding master key(s) 111 and/or KMS 110. Therefore, regardless of whether any encrypted datasets 148 pertaining to the entity 101 and/or corresponding DEK records 168 are retained, such data may be inaccessible to the DAV platform 120. The security manager 150 may, therefore, acknowledge completion of the purge request 205 in response to purging the DEK cache 155 of DEK cache entries 158 comprising DEK(s) used to encrypt imported data 146 pertaining to the entity 101, verifying that access to the master key(s) 111 of the entity 101 has been revoked, and/or purging the master key(s) and/or KMS configuration(s) 210 associated with the entity 101 from the configuration storage 135 (e.g., if revocation of the master key(s) 111 cannot be verified).

Referring back to FIG. 1, in some embodiments, the DAV platform 120 may comprise and/or be communicatively coupled to one or more persistence layers and/or services 180. As used herein, a persistence service 180 refers to a service, layer, component, and/or facility configured to store data (e.g., datasets, imported dataset(s) 146, and/or the like). A persistence service 180 may be configured to manage data pertaining to one or more other services and/or layers, such as the content service 170, a messaging service, a collaboration service, and/or the like In one embodiment, the persistence service 180 may be configured to manage messaging and/or collaboration data pertaining to the entity (e.g., messaging and/or collaboration data of one or more users of the entity 101). The persistence service 180 may be configured to store data in one or more data stores 181. The data store 181 may comprise a non-persistent data store, such as a memory database, a persistent data store, and/or the like. The persistence service 180 may be configured to encrypt data pertaining to the entity 101 as such data is persisted within the data tore 181. The persistence service 180 may be configured to persist any suitable data (and/or secure such data using DEK 119 controlled by the entity 101). The persistence service 180 may be configured to manage imported data sets 146, unencrypted datasets 148 (obtained from the security manager 150), and/or data generated or produced by users of the entity 101 (e.g., messaging data, collaboration data, annotations, data analysis objects, visualizations, and/or the like). The persistence service 180 may be configured to encrypt data before such data is persisted within the data store 181 (and/or other memory or storage facility). The persistence service 180 may encrypt such data by use of, inter alia, a security interface 157 provided by the security manager 150. The security interface 157 may be configured to encrypt data pertaining to the entity 101 for storage by and/or within any suitable persistence layer (using DEK 119 and/or master keys 111 controlled by the entity 101, as disclosed herein). The security interface 157 may be further configured to provide for decrypting data pertaining to the entity 101 stored within the persistence service 180. The persistence service 180 may utilize the security interface 157 to encrypt data of the entity to be persisted thereby (within the data store 108). In response to receiving a request to encrypt data pertaining to the entity 101 via the security interface 157, the security manager 150 may be configured to: obtain a suitable DEK 119 (per a security 137 of the entity 101); encrypt the data by use of the DEK 119 (if authorized to access the DEK 119, as disclosed herein), and return the encrypted data to for persistence. The persistence service 180 may persist the encrypted data, which may include encryption metadata 159, as disclosed herein. The persistence service 180 may access and/or retrieve encrypted data by use of the security interface 157. The persistence service 180 may request decryption of encrypted data (the request including the encrypted data, a reference to the encrypted data, encryption metadata 159, a reference to the encryption metadata 159, and/or the like). In response, the security manager 150 may be configured to: obtain the DEK 119 used to encrypt the data, decrypt the data (If authorized to access the DEK 19 and/or corresponding master key 111), and return the decrypted data. Although FIG. 1 shows one persistence service 180, the disclosure is not limited in this regard, and could be adapted to include any number of persistence services 180, layers, and/or the like. Since data pertaining to the entity 101 is encrypted within the persistence service 180 (and/or data store 181), the entity 101 may control access to such data using the KSM 110 (and/or master key 111 and corresponding authorization metadata 117).

In some embodiments, the persistence service 180 may comprise an in-memory data store 181 (e.g., may comprise an in-memory persistence layer). The persistence service 180 may be configured to encrypt the memory used to store data pertaining to the entity 101 by use of, inter alia, the security interface 157 of the security manager 150. The security manager 150 may be configured to implement a memory and/or input/output filter configured to, inter alia, encrypt data written to designated regions of memory (e.g., as disclosed above in conjunction with the DEK cache 155). The security manage 150 may be further configured to decrypt data retrieved from the region(s) of memory. The security manager 150 may encrypt and/or decrypt data using DEK 119 obtained from the KMS 110, as disclosed herein. The security interface 157 may provide for defining the memory region(s) to encrypt, associating the memory region(s) with a entity 101 (and/or security policy 133), and/or the like.

As illustrated in FIG. 1, unencrypted datasets 148 pertaining to respective entities 101 may be utilized within various components of the DAV platform 120 (e.g., components outside of the data manager 140 and/or security manager 150). As used herein, a utilization of unencrypted data pertaining to an entity 101 (e.g., an unencrypted, a decrypted, and/or a clear-text dataset 148 and/or portion thereof) refers to processing, storing, caching, persisting, displaying, modeling, and/or otherwise maintaining data pertaining to the entity 101. In some embodiments, a purge operation may further comprise purging utilizations of the data pertaining to the entity 101. Purging utilizations of the data by the content service 170 may comprise removing identifying data pertaining to the entity 101 being utilized by the content service 170 and/or purging the identified data. In the FIG. 1 embodiment, the content service 170 may utilize decrypted data pertaining to respective entities 101 in order to, inter alia, provide DAQV functionality to authorized users of the respective entities 101. The content service 170 may access data pertaining to an entity 101 by use of the data manager 140, as disclosed herein (e.g., by issuing access requests 203 for the decrypted dataset(s) 148 to the data manager 140, as disclosed herein). In response to a request 203, the data manager 140 may retrieve an encrypted dataset 148 from storage, attempt to decrypt the dataset 148 (e.g., attempt to obtain a DEK 119 required to decrypt the dataset 148 from a corresponding KMS 110), and provide the decrypted dataset 148 to the content service 170 (if access to the DEK 119 is authorized by the KMS 110 and/or entity 101). The content engine 172 may utilize the decrypted dataset 148 in one or more DAQV operations (process the decrypted dataset 148, generate visualizations of the decrypted dataset(s) 148, and/or the like) and/or display the results of such operations in an interface 174 (e.g., a web-accessible interface, such as a web interface, browser interface, and/or the like). Accordingly, the content service 170 may process, store, cache, persist, display, visualize, model, and/or otherwise maintain decrypted dataset(s) 148 and/or portions thereof. In some embodiments, a purge operation pertaining to an entity 101 may further comprise, inter alia, identifying data pertaining to the entity 101 being utilized within the DAV platform 120 (e.g., being utilized by the content service 170 and/or interface 174 thereof) and purging the identified data. Purging data pertaining to an entity 101 from the content service 170 may comprise purging the data from one or more of the content server 171, interface server (e.g., server(s) used to serve interface(s) 174 comprising data pertaining to the entity 101, such as one or more web servers, web caches, and/or the like), purging the data from query storage, purging the data from processing storage (e.g., purging intermediate processing results), purging visualization data (e.g., purging a data model, data visualizations, etc.), persistence layer(s) 180, data store(s) 181, and/or the like.

The administration interface 134 may comprise a purge control 136, which may enable an authorized user of an entity 101 to initiate a purge operation to purge data pertaining to the entity 101 from the DAV platform 120 (and/or otherwise render such data inaccessible to the DAV platform 120), as disclosed herein. The purge control 136 may be initiated by an authorized user of the entity 101 (e.g., an administrator).

Implementing a purge operation may disrupt the services provided to the entity 101 by the DAV platform 120. Resuming operation after a purge operation may be time-consuming and inefficient (e.g., may require large amounts of data to be reimported into the DAV platform 120). As such, in some embodiments, the administration server 131 may require the purge control 136 to be initiated through a purge protocol 138. The purge protocol 138 may be configured to prevent users from inadvertently initiating purge operations and/r may ensure that the users understand and acknowledge the consequences of such purge operations (e.g., that data pertaining to the entity 101 will be rendered inaccessible, which may disrupt services provided to the entity 101 by the DAV platform 120. In some embodiments, the purge protocol 138 may require two or more authorized users to agree to proceed with the purge operation. In some embodiments, a first authorized user may initiate the purge protocol 138 (and complete a first phase of the purge protocol 138). Completion of the first phase of the purge protocol 138 may comprise designating a second authorized user of the entity 101 to complete a second phase of the purge protocol 138. The designated user may be required to complete the second phase of the purge protocol 138 within a determined time period (e.g., 30 minutes). In response to completion of the second phase of the purge protocol 138, the administration service 130 may initiate a purge operation to purge data pertaining to the entity 101 (and/or otherwise render data pertaining to the entity 101 inaccessible), as disclosed herein. If the second user fails to complete the second phase of the purge protocol 138 within the designated timeframe, or if the first user cancels the purge operation before the second phase is complete, the administration service 130 may terminate the purge protocol 138 without performing the purge operation.

Figure 3A:
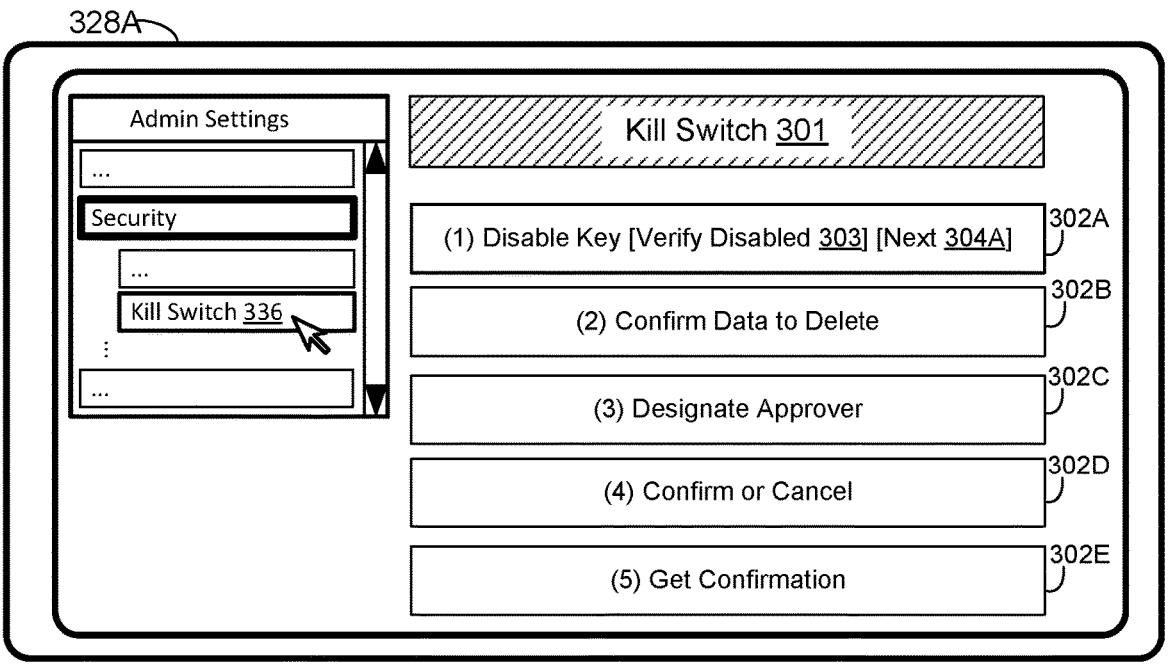
FIGS. 3A-3E depict exemplary embodiments of user interfaces for implementing a first phase of a purge protocol.

FIG. 3A depicts one embodiment of an interface 328A for initiating a purge protocol 138, as disclosed herein (e.g., initiating a first phase of the purge protocol 138). The interface 328A may be accessible through the administration interface 134 (by selection of a "kill switch" control 336). The interface 328A may include a "kill switch" banner 301, which may indicate that the user is in the process of initiating a purge operation, which will purge, remove, and/or otherwise render data of the entity 101 inaccessible within the DAV platform 120 and/or interrupt services provided to the entity 101 by the DAV platform 120. The interface 328A may further comprise one or more control elements 302A-E. The control elements 302A-E may be selectively enabled in sequence (e.g., from control element 302A to control element 302E). In the FIG. 3A embodiment, the control element 302A is active and the other control elements 302B-E are disabled. The control element 302A may comprise a prompt to disable one or more KMS 110 and/or master key(s) 111 associated with the entity 101. The control element 302A may comprise a verify disabled input 303, which may configure the KMS agent 154 to determine whether access to the KMS 110 and/or master key(s) 111 have been revoked (e.g., by transmitting one or more requests to the KMS 110 via the network 106). The verify disabled input 303 may be updated to indicate whether the KMS 110 and/or master key(s) 111 have been revoked. A next input 304A may be selected to proceed to a next step of the first phase of the purge protocol 138.

Figure 3B:
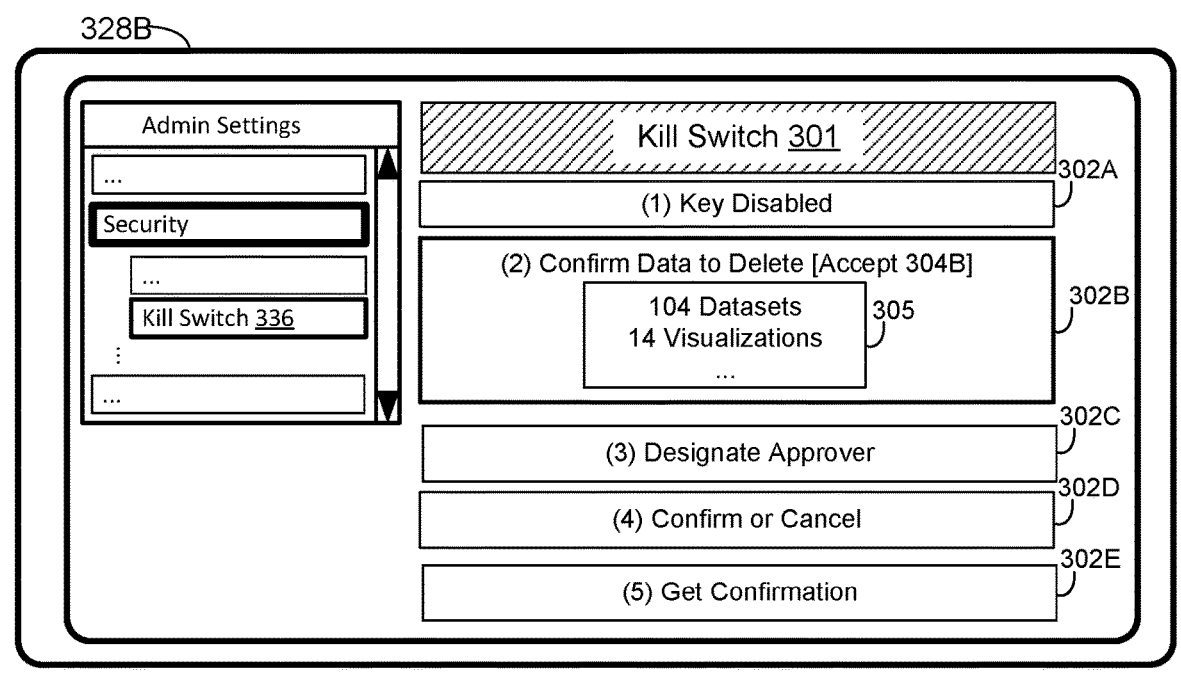

FIG. 3B depicts one embodiment of another interface 328B pertaining to the first phase of the purge protocol 138. The control element 302B may be enabled, and the other control elements 302A and 302C-E may be disabled. The control element 302B may comprise a display element 305, which may identify data that will be deleted, purged, and/or otherwise rendered inaccessible to the DAV platform 120 in response to the purge operation. The data may be identified as respective quantities (e.g., N datasets). The display element 305 may further indicate a number of data analysis and/or visualization (DAV) components, disclosed in further detail herein, that will be affected by the purge operation (e.g., indicate that 15 data visualization components will be rendered unusable by the purge operation). The control element 302B may comprise an accept input 304B by which a user may indicate acknowledgement and to proceed to a next step of the first phase of the purge protocol 138.

Figure 3C:
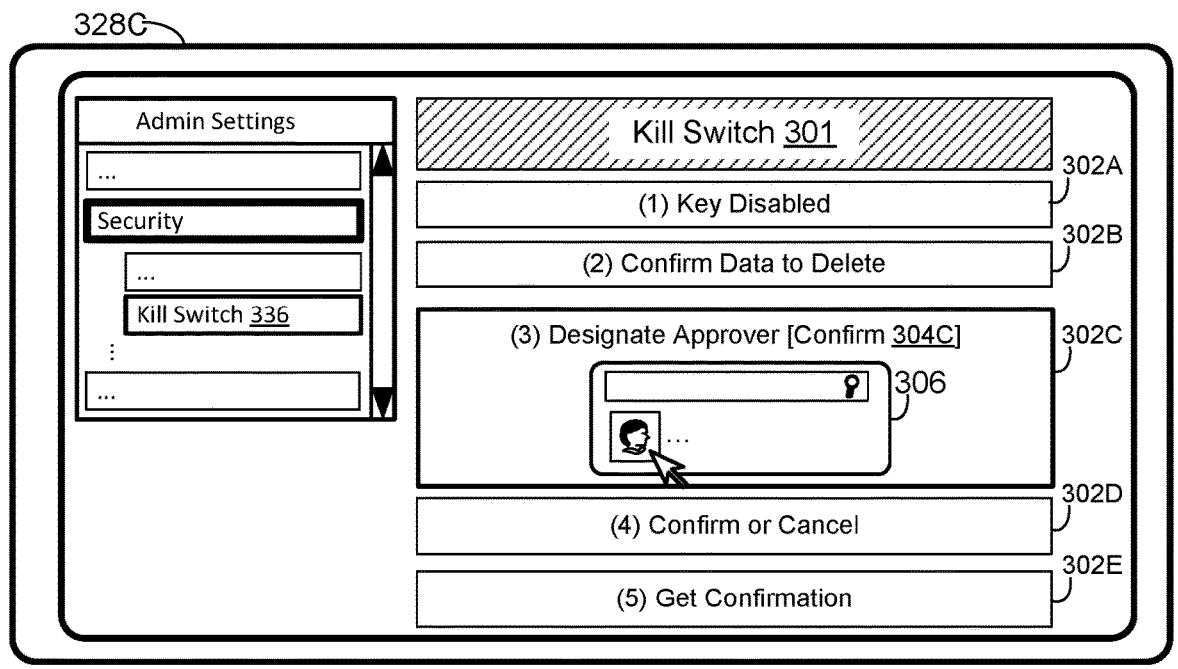

FIG. 3C depicts one embodiment of another interface 328C pertaining to the first phase of the purge protocol 138. In FIG. 3C the control element 302C may be enabled, and may comprise a user select input 306 to enable selection of a designated approver to complete the second phase of the purge protocol 138 (e.g., select the second authorized user of the entity 101). The user select input 306 may be configured to provide for listing, searching, and/or otherwise designating an authorized user of the entity 101. The control element 302C may further comprise a confirm input 304C to confirm designation of the approver and proceed to a next step of the first phase of the purge protocol 138.

Figure 3D:
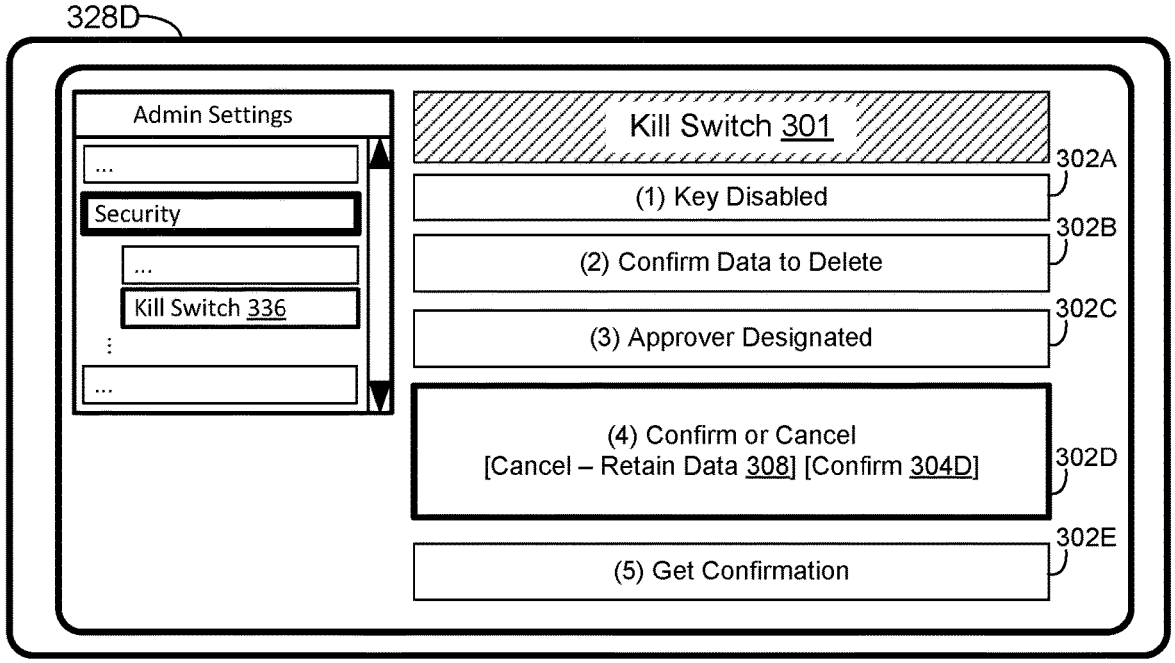

FIG. 3D depicts one embodiment of another interface 328D pertaining to the first phase of the purge protocol 138. The control element 302D may be enabled and may comprise a prompt by which the user can either confirm or cancel the first phase of the purge protocol 138. The administration server 131 may terminate the purge protocol 138 in response to user selection of the cancel input 308. The administration server 131 may complete the first phase of the purge protocol 138 and/or initiate a second phase of the purge protocol 138 in response to user selection of the confirm input 304D. Initiation of the second phase of the purge protocol 138 may comprise: a) requesting confirmation from the designated approver, and/or b) initiating a countdown timer by which the designated approver must respond in order to proceed with the purge protocol 138.

Figure 3E:
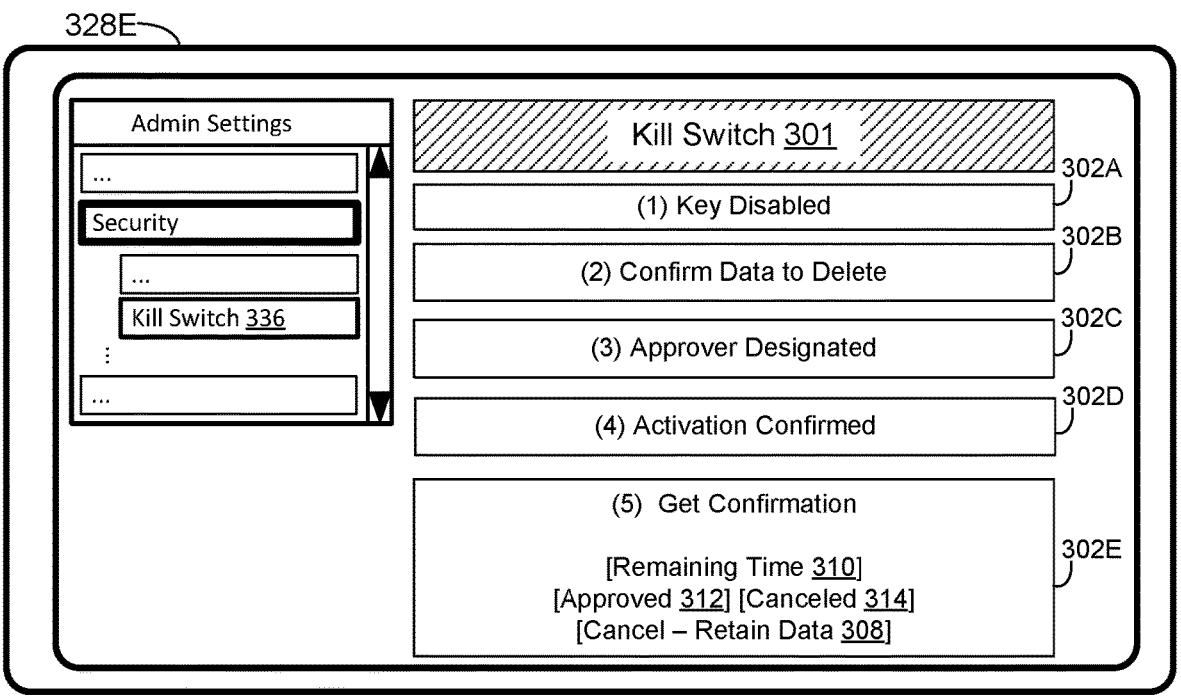

FIG. 3E depicts one embodiment of an interface 328D pertaining to a last step of the first phase of the purge protocol 138. In the interface 328D, the control element 302E may be enabled, and the other control elements 302A-D may be disabled. The control element 302E may indicate that the first phase of the purge protocol 138 has been completed. The control element 302E may further comprise a timer element 310, which may indicate a remaining time for completion of the second phase of the purge protocol 138 (e.g., a time by which the designated approver must confirm activation of the purge operation). The control element 302E may further comprise an approved display element 312 and a canceled display element 314. The approved display element 312 may indicate whether the designated approver has completed the second phase of the purge protocol 138, and the canceled display element 314 may indicate whether the designated approver has canceled the purge protocol 138. Until the purge operation has been implemented by the DAV platform 120, the control element 302E may comprise a cancel input 308 by which the purge protocol 138 may be terminated. In response to user selection of the cancel input 308, the administration server 131 may terminate the purge protocol 138, regardless of whether the designated approver has completed the second phase of the purge protocol 138.

Figure 3F:
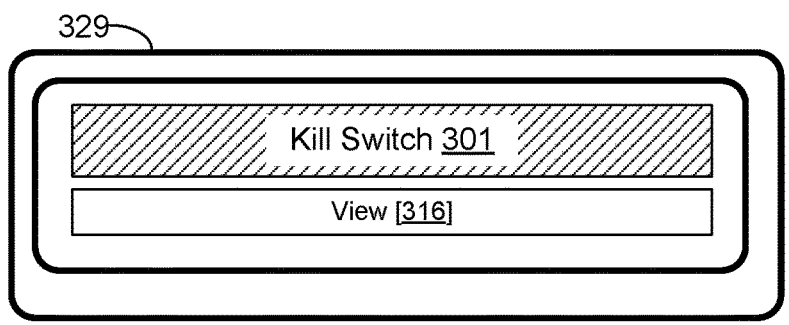
FIGS. 3F-3I depict exemplary embodiments of user interfaces for implementing a second phase of a purge protocol.

FIG. 3F depicts one embodiment of a message 329 issued to the designated approver in response to activation of the confirm input 304D. The message 329 may be communicated via any suitable communication mechanism including, but not limited to: email, text message, and/or the like. The message 329 may comprise a "kill switch" banner 301, which may indicate that the message 329 pertains to the purge protocol 138 (e.g., relates to an operation to purge data of the entity 101 from the DAV platform 120), describe the consequences for proceeding with the purge protocol 138, and so on, as disclosed above. The message 329 may further comprise a link 314, which may direct the designated approver to complete the second phase of the purge protocol 138 through, inter alia, the administration interface 134 of the administration server 131. Selection of the link 314 may direct a computing device used to display the message 329 to an administration interface 134 of the administration server 131.

Figure 3G:
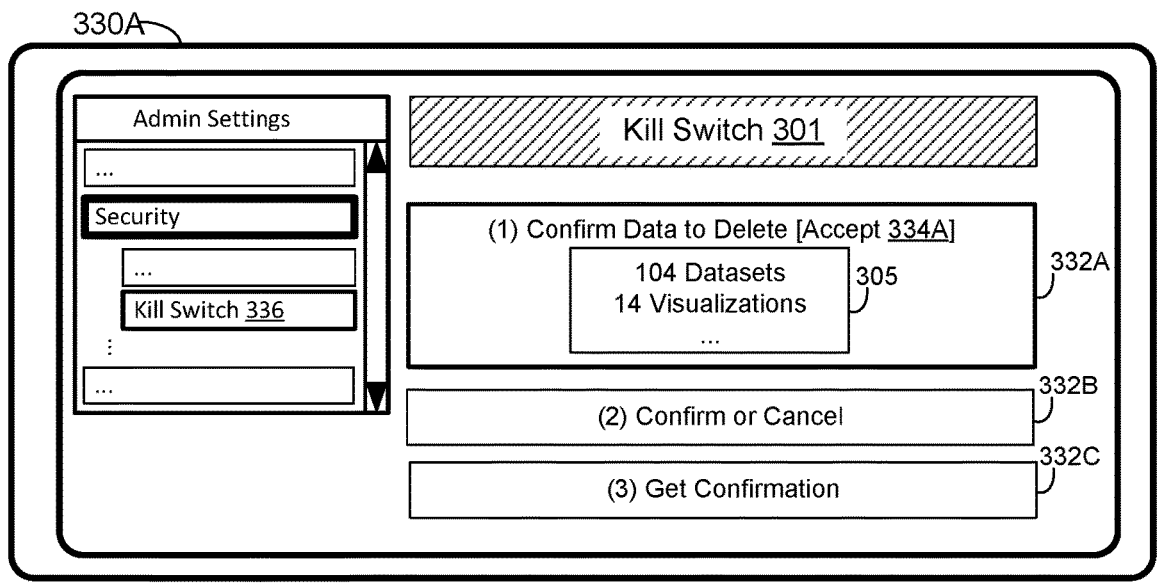

FIG. 3G depicts one embodiment of a first interface 330A of the second phase of the purge protocol 138. The interface 330A may be displayed to the designated approver in response to selection of the link 314 of the message 329. Alternatively, or in addition, the interface 330A may be displayed in response to the designated approver accessing the administration interface 134 independently (e.g., in response to selection of a "kill switch" control 336 by the designated approver). The interface 330A may comprise a "kill switch" banner 301, as disclosed herein. The interface 330A may further comprise a plurality of control elements 332A-C. In FIG. 3G, the control element 332A may be enabled and the other control elements 332B-C may be disabled. The control element 332A may comprise a display element 305, which, as disclosed above, may identify data that will be deleted, purged, and/or otherwise rendered inaccessible to the DAV platform 120 in response to the purge operation. The control element 332A may comprise an input 334A by which the designated approver may indicate acknowledgement and proceed to a next step of the second phase of the purge protocol 138.

Figure 3H:
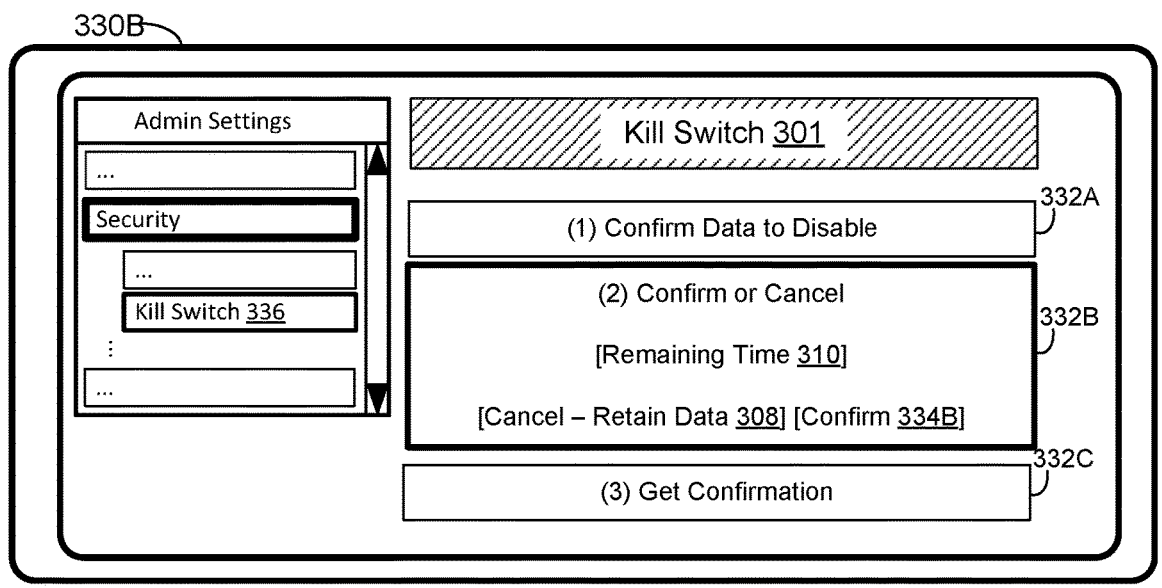
Figure 3I:
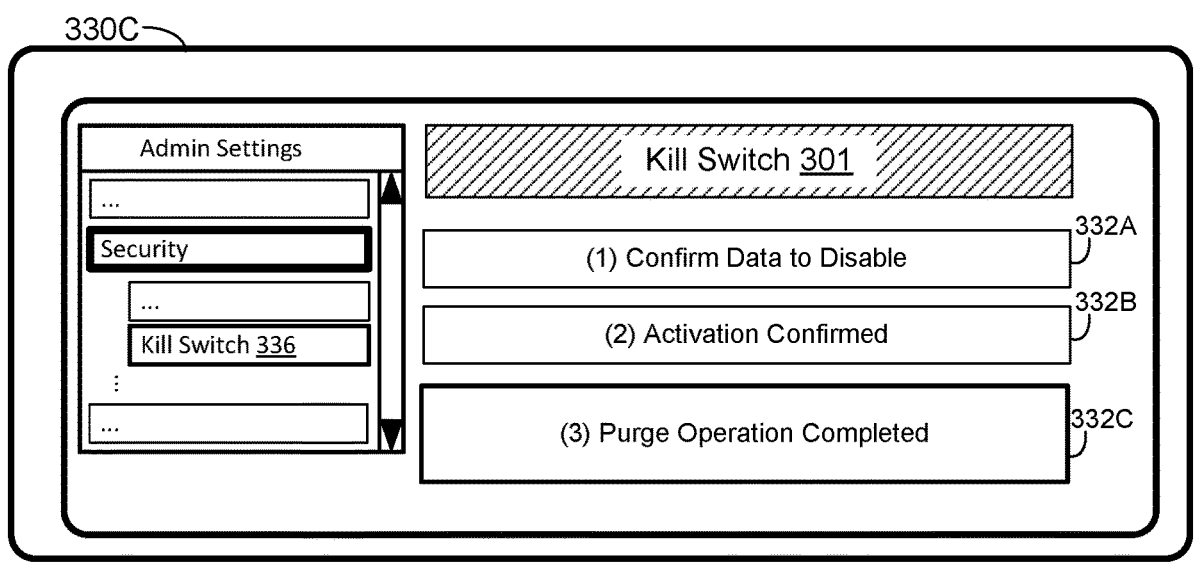

FIG. 3H depicts one embodiment of another interface 330B pertaining to the second phase of the purge protocol 138. The control element 332B may be enabled, and may comprise a prompt by which the designated approver may either cancel or complete the second phase of the purge protocol 138. The control element 332B may comprise a cancel input 308 and a confirm input 334B. In response to selection of the cancel input 308, the administration server 131 may cancel the purge protocol 138. In response to selection of the confirm input 334B (within the designated timeframe), the administration server 131 may complete the second phase of the purge protocol 138. The control element 332B may further comprise a timer element 310, which may indicate the remaining time for the designated approver to activate the confirm input 334B.

In response to the designated approver completing the second phase of the purge protocol 138 (e.g., by activating the confirm input 334B within the designated timeframe), the administration server 131 may implement the purge operation, which may comprise purging data pertaining to the entity 101 from the DAV platform 120 (and/or rendering such data inaccessible), as disclosed herein. The administration server 131 may display the interface 330C to the designated approver, which may comprise a control input 332C indicating that the purge operation has been performed (and/or completed). The control element 302E of interface 328E presented to the user that initiated the purge protocol 138 may be similarly updated.

Figure 4A:
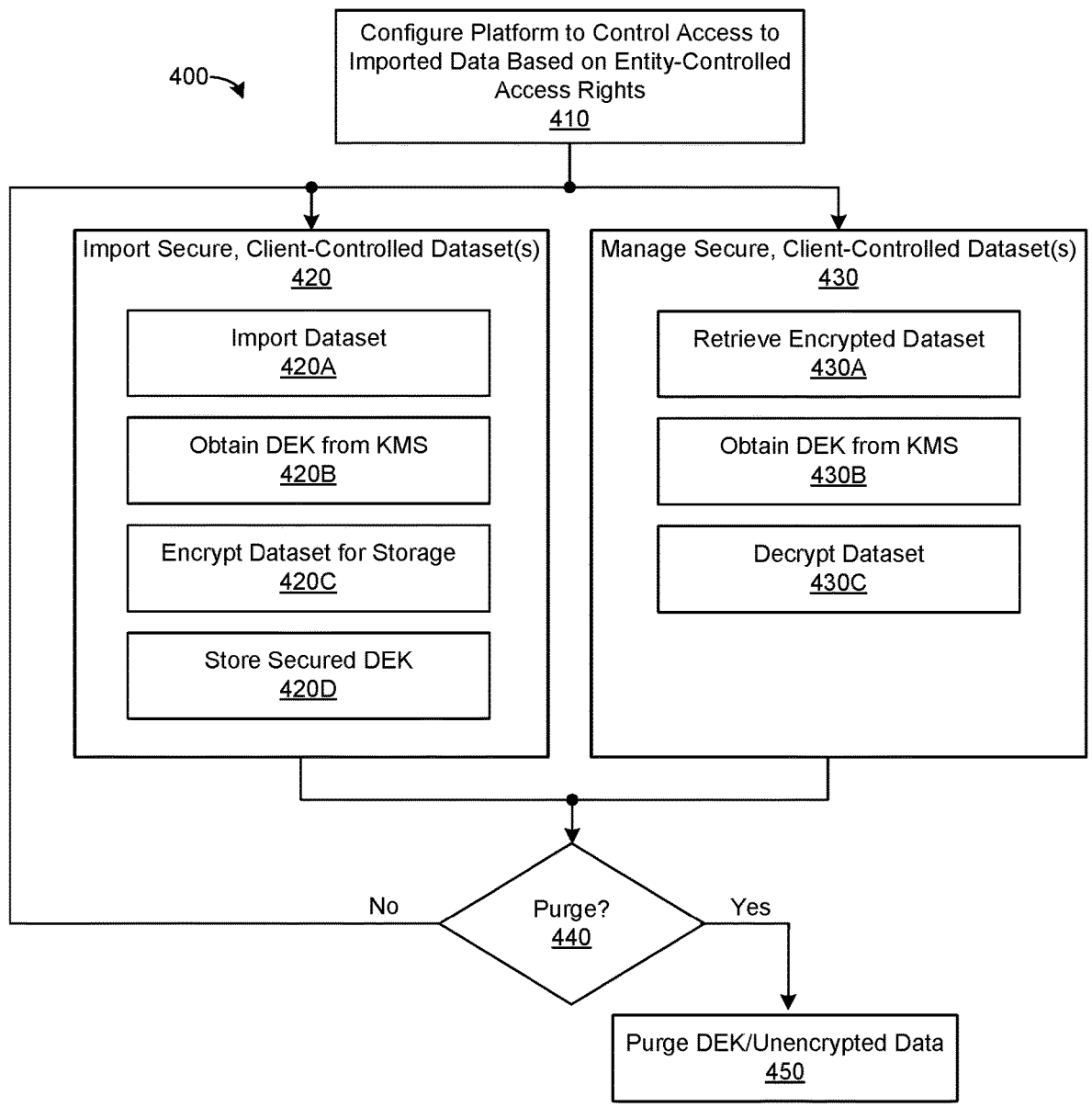
FIG. 4A is a flow diagram of one embodiment of a method for secure management of imported data.

FIG. 4A is a flow diagram of one embodiment of a method 400 for enabling an entity 101 to retain control over data imported into an external, cloud-based system, such as the DAV platform 120, as disclosed herein. Steps and/or operations of the method 400 (and/or portions thereof), and the steps and/or operations of other method(s) disclosed herein (and/or portions thereof), may be embodied as one or more of instructions configured for execution by one or more computing devices, such as a client computing device 107, servers 131, 141, and/or 171, and/or the like, as disclosed herein, which may be stored within one or more non-transitory storage medium, hardware components, circuits, devices, services, servers, network-accessible services, and/or the like.

Step 410 may comprise configuring the DAV platform 120 to control access to imported data pertaining to respective entities 101 in accordance with access controls and/or access rights controlled by the respective entities 101 (e.g., access rights to respective master keys 111 of the entities 101). Step 410 may comprise receiving and/or defining an entity configuration 133, security policy 137, dataset configuration 143, and/or KMS configuration 210 pertaining to respective entities 101, as disclosed herein. Step 410 may comprise specifying a KMS 110 and/or master key(s) 111 for use in generating the DEK 119 to encrypt data pertaining to the entity 101, as disclosed herein. Access to the KMS 110 and/or master key(s) 111 of the respective entities 101 may be controlled by authorization metadata 117 controlled by the respective entities 101 (e.g., access rights of the respective master key(s) 111 controlled by the respective entities 101).

Step 420 may comprise importing a secure, client-controlled dataset 148 pertaining to the entity 101 into the DAV platform 120, such that the entity 101 retains control over access to the imported dataset 148 after such dataset 148 is stored within the persistent storage resources 145 of the DAV platform 120. Step 420A may comprise importing the dataset 148, as disclosed herein (e.g., importing entity dataset(s) 108 from one or more DMS 102, transforming the entity dataset(s) 108 to produce an unencrypted dataset 148 suitable for use within the DAV platform 120, and so on). Step 420B may comprise obtaining a DEK 119 for encryption of the dataset 148. Step 420B may comprise obtaining the DEK 119 from a specified KMS 110 using a specified master key 111. Step 420B may further comprise acquiring an SDEK 219 corresponding to the DEK 119. The DEK 119 and/or SDEK 219 may be derived from and/or correspond to the specified master key 111. Access to the specified master key 111 through the KMS 110 may be controlled by authorization metadata 117 controlled by the entity 101 (e.g., by access controls and/or rights managed by the entity 101). Alternatively, or in addition, step 420B may comprise retrieving the DEK 119 from a DEK cache 155 (and/or validating that the DAV platform 120 is authorized to use the cached DEK 119). Step 420C may comprise encrypting the dataset 148 for storage. Step 420C may comprise including encryption metadata 159 in the encrypted dataset 148. In some embodiments, the encryption metadata 159 comprises an SDEK 219. Alternatively, or in addition, the encryption metadata 159 may include an identifier of the SDEK 219 and/or reference a separate storage location of the SDEK 219 (e.g., reference a DEK record 168 maintained within secure DEK storage 165, or the like). Step 420D may comprise storing the encrypted dataset 148 in the persistent storage resources 145 of the DAV platform 120, as disclosed herein. Importing the dataset 148 may further comprise preventing the DEK 119 from being retained in persistent storage by, inter alia, purging the DEK 119 after using the DEK 119 to encrypt the dataset 148.

Step 430 may comprise managing the secure, client-controlled dataset 148. Step 430A may comprise retrieving the encrypted dataset 148 from the persistent storage resources 145 (e.g., in response to an access request, such as a request 203 from the content service 170). Step 430B may comprise obtaining the DEK 119 required to decrypt the encrypted dataset 148. Step 430B may comprise extracting information pertaining to the DEK 119 from the encrypted dataset 148, such as the SDEK 219, MKID 211, and/or the like. Alternatively, or in addition, step 430B may comprise extracting a DKID 213 from the encrypted dataset 148 and using the DKID 213 to obtain information pertaining to the DEK 119 from another storage location (e.g., retrieve a DEK record 168 from secure DEK storage 165, load a DEK cache entry 158 from the DEK cache 155, and/or the like). Step 430B may further comprise verifying that the DAV platform 120 is authorized to access the DEK 119 by, inter alia, attempting to obtain the DEK 119 from the KMS 110 and/or issuing an authorization query to the KMS 110. Step 430C may comprise decrypting the dataset 148 using the DEK 119 obtained at step 430B. Alternatively, if the DAV platform 120 is unable to access the required DEK 119 (and/or is no longer authorized to use the DEK 119), step 430C may comprise returning an access failure.

Step 440 may comprise determining whether the entity 101 has initiated a purge operation, as disclosed herein (e.g., by activating the purge control 136, completing the purge protocol 138, and/or the like). If a purge operation has not been initiated, the flow may continue back at step(s) 420 and/or 430. If a purge operation has been initiated, the flow may continue at step 450. Step 450 may comprise implementing a purge operation pertaining to the entity 101, as disclosed herein. Step 450 may comprise removing DEK(s) 119 used to encrypt dataset(s) 148 pertaining to the entity 101 from the DEK cache 155 (if any). Step 450 may further comprise verifying that authorization to access specified master key(s) 111 of the entity 101 has been revoked through the corresponding KMS 110. Step 450 may further include informing the KMS 110 that the DAV platform 120 is no longer authorized to access the master key(s) 111 associated with the entity 101 and/or removing KMS configuration 210 data pertaining to the entity 101 from the DAV platform 120, as disclosed herein. In some embodiments, step 450 further comprises purging data pertaining to the entity 101 being utilized within the DAV platform 120 (e.g., decrypted data being utilized within the content service 170), and/or the like.

Figure 4B:
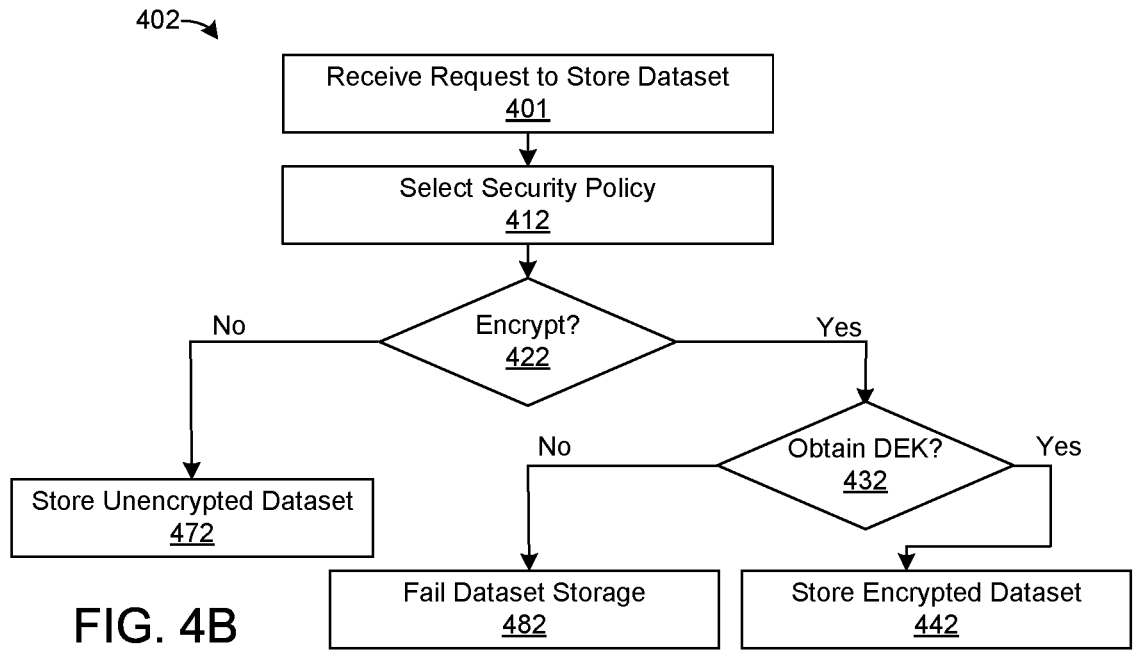
FIG. 4B is a flow diagram of one embodiment of a method for securing imported data pertaining to an entity, such that the entity retains control over the imported data.

FIG. 4B is a flow diagram of another embodiment of a method 402 for enabling an entity 101 to retain control over data imported to an external entity, such as the DAV platform 120, as disclosed herein. Step 401 may comprise receiving a request to store a dataset 148 within persistent storage resources of the DAV platform 120. Step 401 may correspond to an import operation of the import engine 142, as disclosed herein. Alternatively, or in addition, step 401 may comprise a request to encrypt data to be persisted by a persistence layer or service 180 (e.g., in response to a request received via the security interface 157).

Step 412 may comprise selecting a security policy 137 for the dataset 148. Step 412 may comprise selecting the security policy 137 based on, inter alia, dataset metadata 149, an entity configuration 133, and/or the like, as disclosed herein. Step 412 may comprise selecting one of a plurality of security policies 137 associated with the entity 101 in response to comparing the security policies 137 to the dataset metadata 149. The security policy 137 may be determined based on a DSID 238 of the dataset 148 (e.g., a name, path, URI, or the like). Alternatively, or in addition, the security policy 137 may be determined based on entity metadata 209 associated with the dataset 148. The security policy 137 may be determined by, inter alia, source metadata 209A (e.g., information pertaining to the entity dataset(s) 108A-N and/or DMS 202A-N from which the dataset 148 was imported), attribute metadata 209B (e.g., security attributes, security labels, tags, and/or the like associated with the dataset 148), and so on, including user metadata 209N (e.g., users, groups, organizational groups, and/or the like, associated with the dataset 148). Step 412 may comprise applying different security policies 137 having different encryption requirements (e.g., different master key(s) 111, different KMS 110, different DEK expiration criteria 228, and so on), to different datasets 148 associated with the entity 101 based on, inter alia, the name of the datasets 148 (e.g., DSID 238), source of the datasets 148, attributes of the datasets 148, users associated with the datasets 148, and/or the like. Accordingly, step 412 may comprise: selecting a first security policy 137 requiring encryption in DEKs 119 obtained from a first KMS 110 (using first master keys 111), and that are refreshed on a daily basis, for datasets 148 associated with a first entity dataset 108, first DMS 102, and/or first user(s); selecting a second, different security policy 137 that requires encryption in DEKs 119 obtained from a second KMS 110 (using second master keys 111), and that are refreshed on an hourly basis, for datasets 148 associated with a second entity dataset 108, second DMS 102, and/or second user(s); and so on.

Step 422 may comprise determining whether the selected security policy 137 requires encryption of the dataset 148 within the DAV platform 120. If the selected security policy 137 does not require encryption of the dataset 148, the flow may continue to step 470, where the unencrypted dataset 148 may be stored within the persistent storage resources 145 of the DAV platform 120. If the selected security policy 137 requires the dataset 148 to be encrypted, the flow may continue to step 432.

Step 432 may comprise obtaining a DEK 119 for use in encrypting the dataset 148. Step 432 may comprise obtaining the DEK 119 from a KMS 110 specified in the selected security policy 137 (using a master key 111 designated in the selected security policy 137). Step 432 may, therefore, comprise issuing a request to generate a new DEK 119 to the specified KMS 110 (e.g., issuing a request 151B, as disclosed above). Step 432 may further comprising obtaining an SDEK 219 corresponding to the DEK 119, as disclosed herein. Alternatively, or in addition, step 432 may comprising determining whether a suitable DEK 119 is available in the DEK cache 155 (e.g., determining whether the DEK cache 155 comprises a DEK cache entry 158 comprising a DEK 119 that satisfies the selected security policy 137 and/or is not expired). If so, step 432 may comprise retrieving the DEK 119 from the DEK cache 155 (and/or verifying that the DAV platform 120 is authorized to use the DEK 119). In some embodiments, step 432 may comprise obtaining a DEK 119 that was previously generated by the KMS 110 by use of a corresponding SDEK 219 maintained at the DAV platform 120 (e.g., by issuing a request 151A for the existing DEK 119 to the KMS 110). If the DAV platform 120 is unable to obtain the DEK 119 (and/or determines that access to the DEK 119 and/or specified master key(s) 111 has been revoked), the flow may continue to step 482, where the request to encrypt the dataset 148 may fail (e.g., an error code may be returned in response to the request). Otherwise, the flow may continue to step 442. Step 442 may comprise encrypting the dataset 148 using the DEK 119, and storing the encrypted dataset 148 in the persistent storage resources 145 of the DAV platform 120, as disclosed herein. Step 442 may further comprise persisting an SDEK 219 corresponding to the DEK 119 within the DAV platform 120 (e.g., within the encrypted dataset 148 and/or in separate, secure DEK storage 165). In some embodiments, step 442 further comprises admitting the DEK 119 into the DEK cache 155, as disclosed herein. Step 442 may further comprise preventing the DEK 119 and/or unencrypted data from being persistently retained within the DAV platform 120, such that access to the dataset 148 (and/or other data pertaining to the entity 101) is predicted on authorization of the entity 101. As disclosed above, since the DEK 119 and unencrypted dataset 148 are not retained, access to the unencrypted dataset 148 requires the DAV platform 120 to obtain the DEK 119 from the KMS 110 using a specified MKID 211 (and/or SDEK 219). The entity 101 retains control over access to the MKID 211, and can revoke access to the MKID 211 at the KMS 110. If the entity 101 revokes such access, the DAV platform 120 may be unable to obtain the DEK 119 required to decrypt the dataset 148 and, as such, may be prevented from accessing the corresponding unencrypted data pertaining to the entity 101.

Figure 4C:
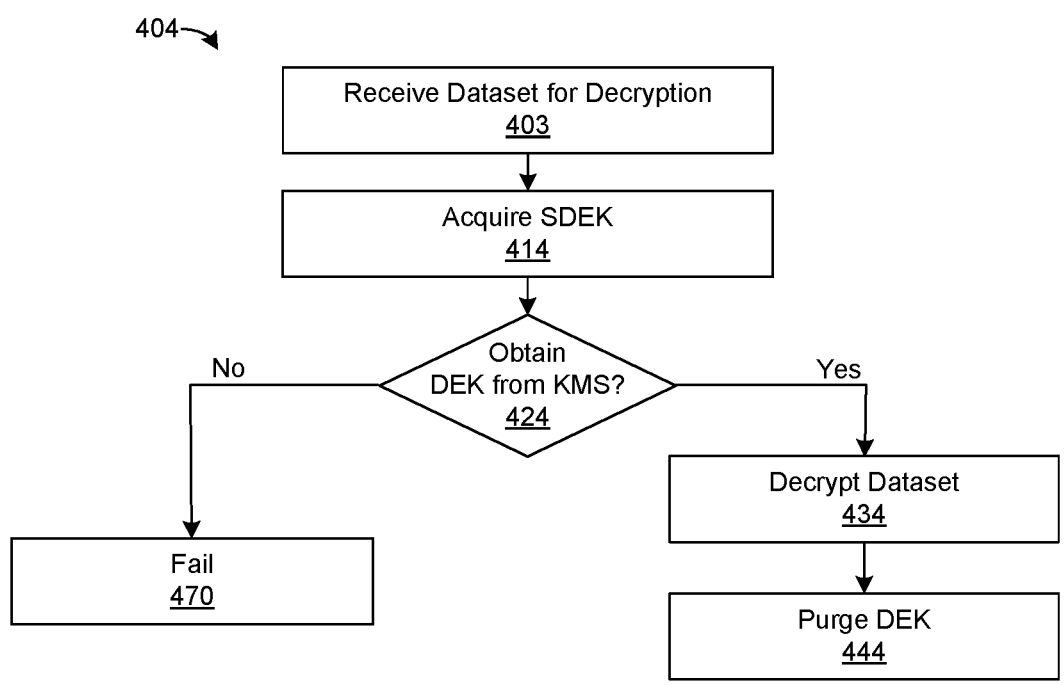
FIG. 4C is a flow diagram of one embodiment of a method for securely accessing data pertaining to an entity, such that the entity retains control over the imported data.

FIG. 4C is a flow diagram of another embodiment of a method 404 for enabling an entity to retain control over data imported to an external entity, such as the DAV platform 120, as disclosed herein. Step 403 may comprise receiving a request to access and/or decrypt an encrypted dataset 148, as disclosed herein (e.g., an access and/or decrypt request 203 from the content service 170). Step 414 may comprise acquiring an SDEK 219 associated with the encrypted dataset 148 (e.g., the SDEK 219 and/or MKID 211 corresponding to the DEK 119 required to decrypt the encrypted dataset 148). Step 414 may comprise extracting the SDEK 219 (and/or MKID 211) from encryption metadata 159 of the encrypted dataset 148. Alternatively, step 414 may comprise obtaining the SDEK 219 (and/or MKID 211) from a separate storage location (e.g., secure DEK storage 165), as disclosed herein.

Step 424 may comprise attempting to obtain the DEK 119 required to decrypt the encrypted dataset 148 from a KMS 110. Step 424 may comprise transmitting a request 151A for the DEK 119 to the KMS 110 associated with the SDEK 219 and/or MKID 211 obtained at step 414 (via the network 106). In some embodiments, step 424 may comprise including information pertaining to the requested use of the DEK 119, such as user information, location, jurisdiction, and/or the like. Step 424 may comprise including a user identifier in the request 151A (and/or other information pertaining to the user and/or requested use of the DEK 119). If the KMS 110 determines that the entity 101 has authorized the DAV platform 120 to access the DEK 119 (and/or corresponding master key 111), the KMS 110 may provide the DEK 119 in response to the request 151A, and the flow may proceed to step 434. If the request 151A fails, the DAV platform 120 may not be capable of obtaining the DEK 119 required to decrypt the dataset 148 and, as such, the flow may continue at step 470 where the request 203 may fail, which may comprise returning an error indication in response to the request 203.

Step 434 may comprise decrypting the encrypted dataset 148 using the DEK 119 obtained from the KMS 110, as disclosed herein. Step 434 may further comprise returning the decrypted dataset 148 in response to the request 203 (and/or otherwise providing the decrypted dataset 148 to the requester). Step 444 may comprise purging the DEK 119, as disclosed herein.

Figure 5:
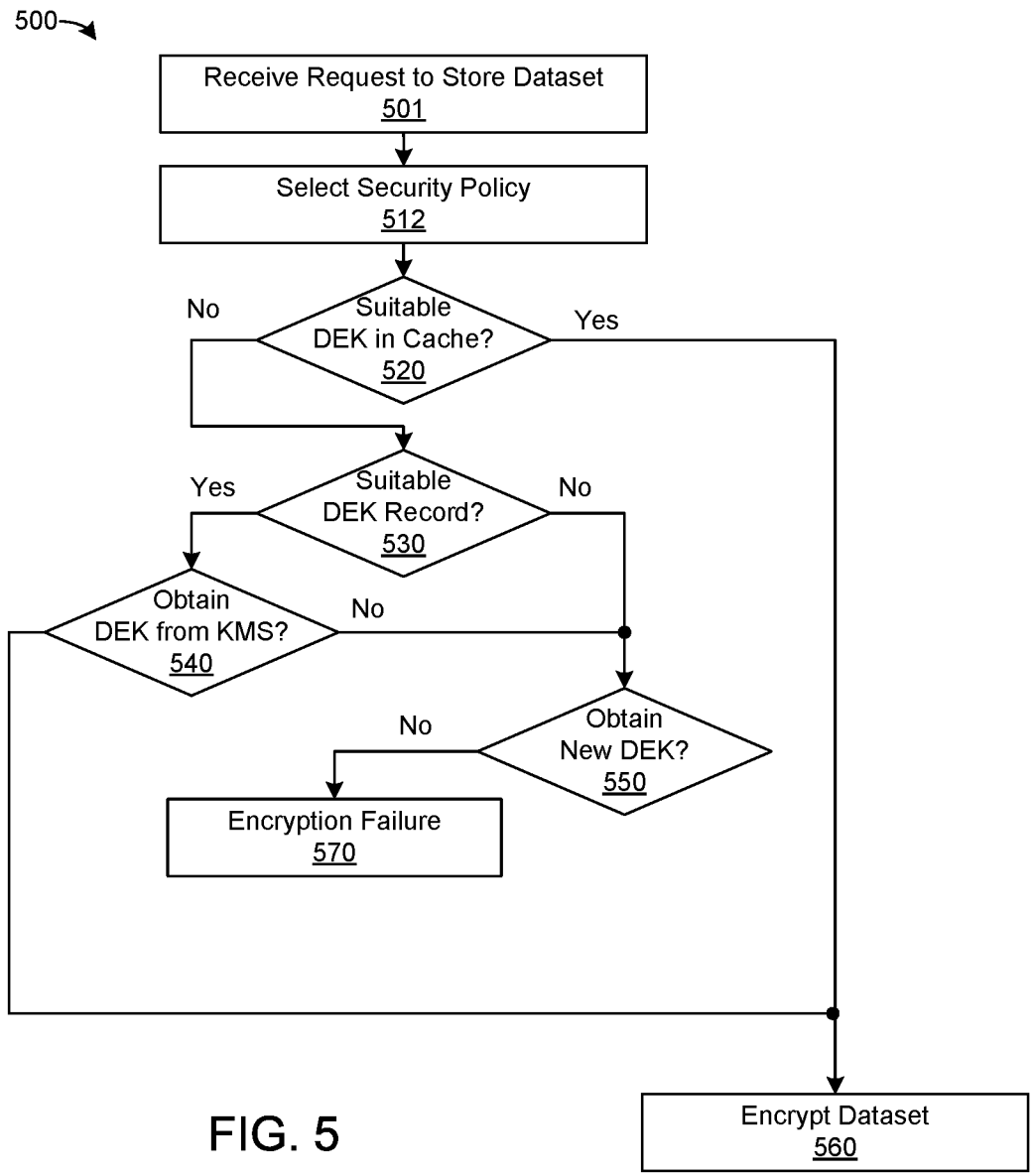
FIG. 5 is a flow diagram of further embodiments of a method for securing imported data pertaining to an entity, such that the entity retains control over the imported data.

FIG. 5 is a flow diagram of one embodiment of a method 500 for securing data within the DAV platform 120, as disclosed herein. Step 501 may comprise receiving a request to encrypt a dataset 148, and step 512 may comprise selecting an applicable security policy 137, as disclosed herein. Alternatively, or in addition, step 501 may comprise a request to encrypt data to be persisted by a persistence layer or service 180 (e.g., in response to a request received via the security interface 157).

Step 520 may comprise determining whether a suitable DEK cache entry 158 is available within the DEK cache 155. Step 520 may comprise determining whether the DEK cache 155 comprises a DEK cache entry 158 that satisfies the selected security policy 137 and is not expired (per DEK expiration criteria 228 of the selected security policy 137). Determining whether a DEK cache entry 158 is expired may comprise DEK metadata 248 of the DEK cache entry 158 to DEK expiration criteria 228 of the selected security policy 137, which may comprise comparing time metrics (e.g., DEK timestamp, DEK age, DEK authorization timestamp, and/or the like), DEK usage metrics (e.g., data encrypted/decrypted, dataset(s) encrypted/decrypted, and/or the like), KMS metrics (e.g., number of times the KMS has been obtained from the KMS 110), to corresponding DEK expiration criteria 228, as disclosed herein. If a suitable DEK cache entry 158 is identified at step 520, the corresponding DEK 119 may be retrieved and used to encrypt the dataset 148 at step 560. If a suitable DEK cache entry 158 is not found, the flow may continue at step 530.

Step 530 may comprise determining whether a secure DEK storage 165 comprises a suitable DEK record 168, as disclosed herein. Step 530 may comprise searching the secure DEK storage 165 for a DEK record 168 that satisfies the selected security policy 137 and is not expired, as disclosed herein. If a suitable DEK record 168 is identified, the flow may continue to step 540; otherwise, the flow may continue to step 550. Step 540 may comprise obtaining a DEK corresponding to the identified DEK record 168 from a KMS 110 (e.g., using an SDEK 219 and/or MKID 211 of the DEK record 168), as disclosed herein. If the DEK 119 is obtained from the KMS at step 540, the flow may continue at step 560; otherwise the flow may continue at step 550.

Step 550 may comprise obtaining a new DEK 119 from a KMS 110 specified in the selected security policy 137, as disclosed herein. Step 550 may further comprise obtaining and/or storing an SDEK 219 and/or MKID 211 associated with the new DEK 119. If the request to obtain the DEK 119 is successful, the flow may continue to step 560; otherwise, the flow may continue at step 570. Step 560 may comprise encrypting the dataset 148 for storage, as disclosed herein. Step 570 may comprise failing the encryption request, which may comprise returning an error indication in response to the request (without storing the dataset 148 within the DAV platform 120).

Figure 6A:
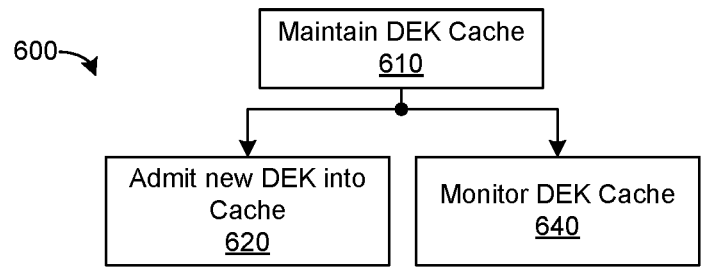
FIG. 6A is a flow diagram of one embodiment of a method for managing a data encryption key cache.
Figure 6B:
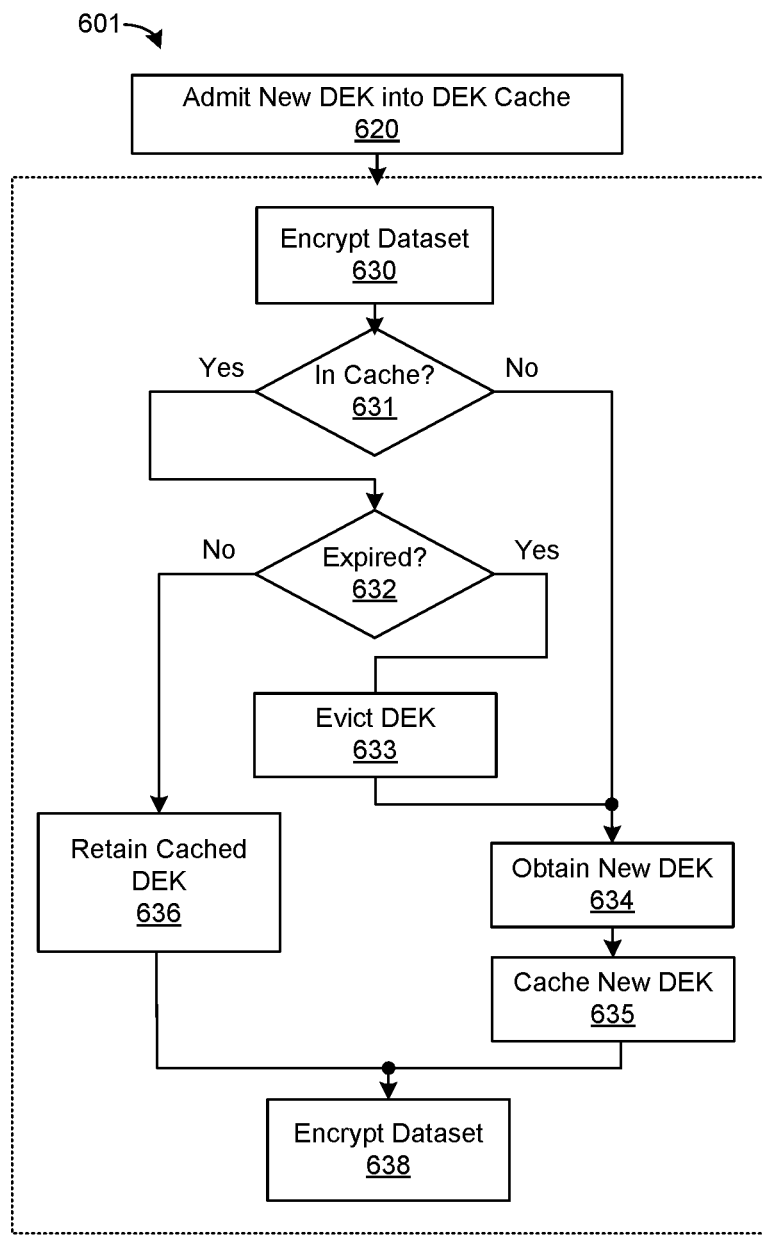
FIG. 6B is a flow diagram of one embodiment of a method for managing admission into a data encryption key cache.

FIG. 6A is a flow diagram of one embodiment of a method 600 for caching DEK 119 in the DAV platform 120, as disclosed herein. Step 610 may comprise maintaining a DEK cache 155. Step 610 may comprise allocating volatile memory for use in storing DEK cache entries 158. Step 610 may further comprise securing the DEK cache 155 and/or preventing contents of the DEK cache 155 from being stored persistently (e.g., swapped to persistent storage), accessed by processes other than processes associated with the security manager 150, and/or the like, as disclosed herein. Maintaining the DEK cache 155 at step 610 may further comprise admitting the DEK 119 into the DEK cache 155 at step 620 in response to requests to encrypt datasets 148 (e.g., in response to importing the datasets 148) and/or monitoring the DEK cache 155 at step 640.

FIG. 6A is a flow diagram of one embodiment of a method 601 for admitting DEK into a DEK cache 155. Step 620 may comprise admitting new DEK obtained from respective KMS 110 into the DEK cache 155. Step 620 may correspond to request(s) to encrypt dataset(s) 148 for storage within the DAV platform 120 (e.g., in response to importing the datasets 148).

Step 630 may comprise encrypting a dataset 148 for storage within the persistent storage resources 145 of the DAV platform 120. Step 631 may comprise determining whether a suitable DEK 119 is available in the DEK cache 155. Step 631 may comprise identifying a security policy 137 associated with the dataset 148, determining whether the DEK cache 155 comprises a DEK cache entry 158 that satisfies the identified security policy 137, and so on, as disclosed herein. If the DEK cache 155 comprises a suitable DEK cache entry 158, the flow may continue to step 632; otherwise, the flow may continue to step 634. Step 632 may comprise determining whether the DEK cache entry 158 is expired. Step 632 may comprise comparing DEK metadata 248 of the DEK cache entry 158 to DEK expiration criteria 228 of the identified security policy 137, which may comprise comparing time metrics (e.g., DEK timestamp, DEK age, DEK authorization timestamp, and/or the like), DEK usage metrics (e.g., data encrypted/decrypted, dataset(s) encrypted/decrypted, and/or the like), KMS metrics (e.g., number of times the KMS has been obtained from the KMS 110), to corresponding DEK expiration criteria 228, as disclosed herein. If the comparing indicates that the DEK cache entry 158 has expired, the flow may continue at step 633; otherwise, the flow may continue at step 636.

Step 633 may comprise evicting the expired DEK cache entry 158 from the DEK cache 155 (e.g., purging the expired DEK cache entry 158), as disclosed herein. Step 634 may comprise obtaining a new DEK 119 for encryption of the dataset 148 from a KMS 110 (in accordance with a security policy 137 associated with the dataset 148), as disclosed herein. Step 635 may comprise admitting a DEK cache entry 158 comprising the new DEK 119 into the DEK cache 155. Step 635 may further comprise storing an SDEK 219 and/or MKID 211 associated with the new DEK 119 in persistent storage of the DAV platform 120 (e.g., persistent storage resources 145 and/or secure DEK storage 165).

Step 636 may comprise retaining the DEK cache entry 158 in the DEK cache 155 (and retrieving the corresponding DEK 119 for use in encrypting the dataset 148). Step 638 may comprise encrypting the dataset 148, as disclosed herein (e.g., using either the DEK 119 retrieved from the DEK cache 155 or the new DEK 119 acquired from the KMS 110).

Figure 6C:
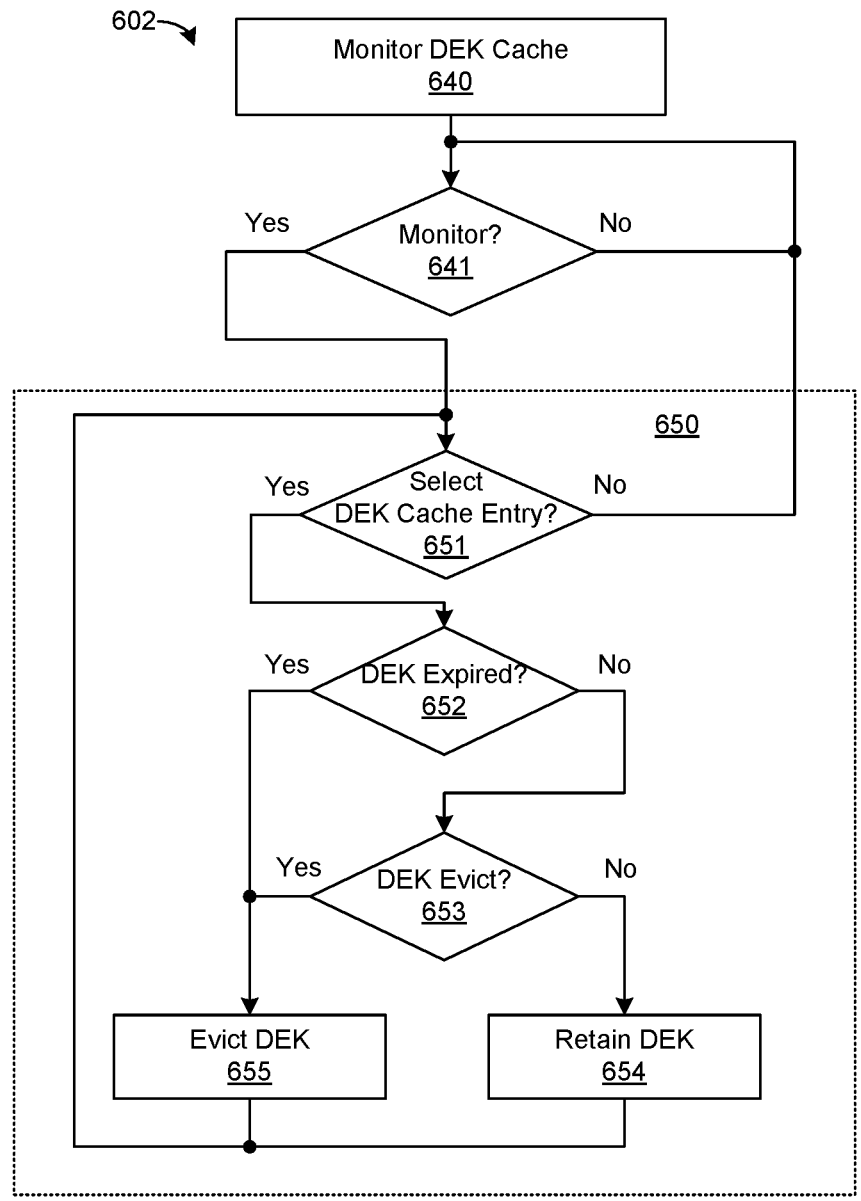
FIG. 6C is a flow diagram of one embodiment of a method for monitoring a data encryption key cache.

FIG. 6C is a flow diagram of one embodiment of a method 602 for monitoring a DEK cache 155 (step 640). Monitoring the DEK cache 155 at step 640 may comprise periodically performing monitoring operations 650 on the DEK cache 155 and/or performing monitoring operations 650 in response to determined conditions (e.g., when a size of the DEK cache 155 reaches a determined threshold, a number of DEK cache entries 158 reaches a threshold, and/or the like). Step 641 may comprise determining whether to perform a monitoring operation 650 (e.g., in accordance with a monitoring period, monitoring condition, trigger, and/or the like). If the determination of step 641 is to perform a monitoring operation 650, the flow may continue to step 650; otherwise, the flow may continue back at step 641. Step 650 may comprise performing a monitoring operation on the DEK cache 155. The monitoring operation may comprise evaluating each DEK cache entry 158 within the DEK cache 155 to determine, inter alia, whether to retain or evict the DEK cache entry 158. Step 651 may comprise selecting a DEK cache entry 158 to evaluate in the monitoring operation. Step 651 may comprise iteratively selecting DEK cache entries 158, such that each DEK cache entry 158 is selected for evaluation in a particular order (e.g., from oldest to most recent, age, least recently used, most recently used, and/or the like). Step 651 may further comprise determining whether all of the DEK cache entries 158 have been evaluated in the monitoring operation 650. If all of the DEK cache entries 158 have been evaluated, the flow may continue back to step 641; otherwise, step 651 may comprise selecting a DEK cache entry for evaluation, and the flow may proceed to step 652.

Step 652 may comprise determining whether the DEK cache entry 158 is expired, as disclosed herein (e.g., based on DEK metadata 248 of the DEK cache entry 158 and/or DEK expiration criteria of a corresponding security policy 137). If the DEK cache entry 158 is determined to be expired, the flow may continue to step 655; otherwise, the flow may continue to step 653. Step 653 may comprise determining whether the DEK cache entry 158 should be evicted based on other criteria (e.g., eviction criteria). The eviction criteria limit caching of certain DEK 119. The eviction criteria of a DEK cache entry 159 may define a maximum period of time the DEK 119 may be maintained in un-encrypted form (to avoid the possibility of the DEK cache entries 158 being exposed). Alternatively, or in addition, the eviction criteria may require access to the DEK 119 to be periodically re-validated (e.g., require the DAV platform 120 to acquire the DEK 119 from a corresponding KMS 110). The eviction criteria of a DEK 119 may be defined in the security policy 137 associated with the DEK 119. Alternatively, or in addition, the security manager 150 may define default eviction criteria, to limit the amount of time DEK 119 remain in the DEK cache 155. If the evaluation of step 653 indicates that the DEK cache entry 158 should be evicted, the flow may continue to step 655; otherwise, the flow may continue to step 654.

Step 655 may comprise evicting the DEK cache entry 158 from the DEK cache 155. Step 655 may comprise purging the DEK cache entry 158, as disclosed herein. Step 654 may comprise retaining the DEK cache entry 158 within the DEK cache 155. Following step 655 and/or 654, the flow may continue back to step 651, where a next DEK cache entry 158 may be evaluated (or the monitoring operation 650 may complete if no unevaluated DEK cache entries 158 remain).

Figure 6D:
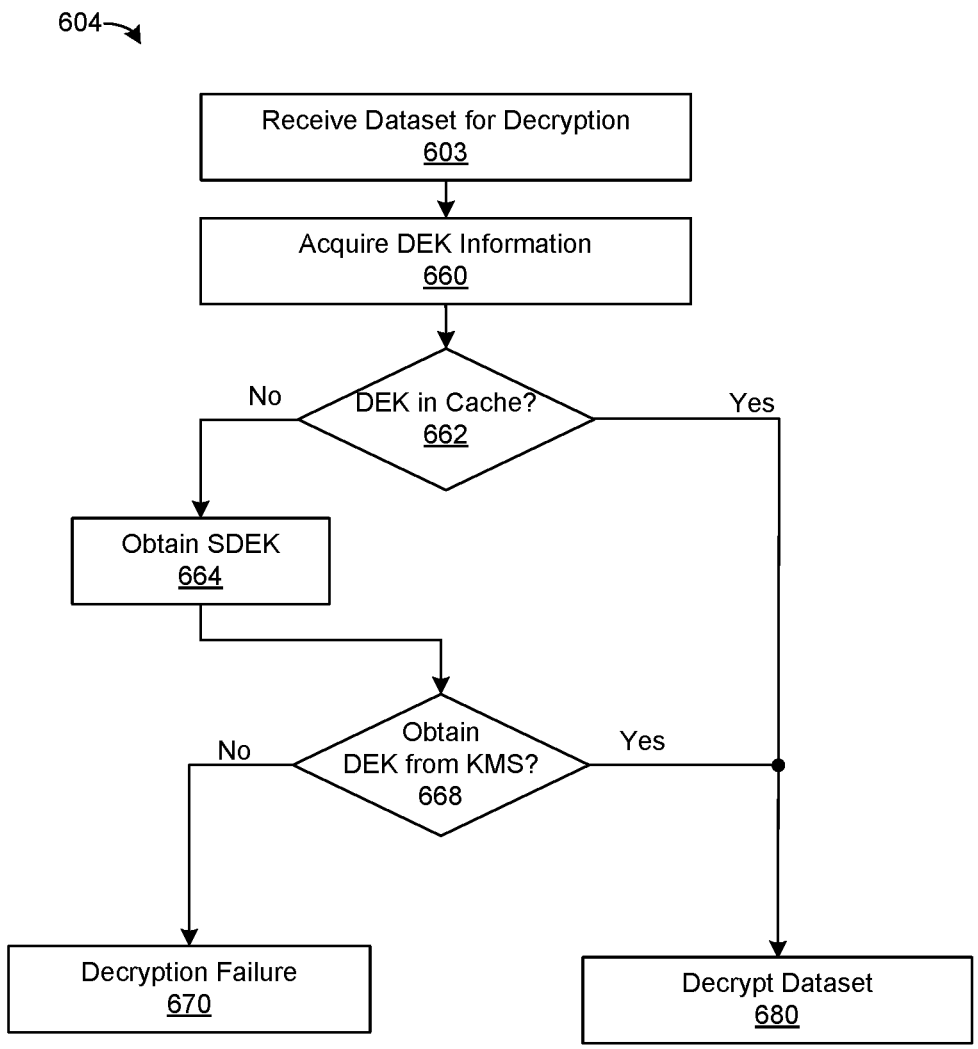
FIG. 6D is a flow diagram of one embodiment of a method managing decryption of imported data using, inter alia, a data encryption key cache.

FIG. 6D is a flow diagram of one embodiment of a method 604 for managing access to encrypted datasets using, inter alia, a DEK cache 155. Step 603 may comprise receiving a request to access and/or decrypt an encrypted dataset 148 (e.g., a request 203). Step 660 may comprise acquiring information pertaining to the DEK 119 required to decrypt the dataset 148. Step 660 may comprise retrieving encryption metadata 159 from the encrypted dataset 148. The encryption metadata 159 may comprise a DKID 213 of the required DEK 119.

Step 662 may comprise determining with the required DEK 119 is available in a DEK cache 155. Step 662 may comprise searching the DEK cache 155 for a DEK cache entry 158 associated with the DKID 213. If the DEK 119 is available in the DEK cache 155, the flow may continue at step 680; otherwise, the flow may continue to step 670. Step 664 may comprise obtaining an SDEK 219 corresponding to the required DEK 119. The SDEK 219 may be extracted from the encryption metadata 159 of the encrypted dataset 148. Alternatively, the SDEK 219 may be retrieved from separate secure DEK storage 165 (e.g., from a DEK record 168 associated with the DKID 213), as disclosed above. Step 668 may comprise obtaining the required DEK 119 from a KMS 110 by use of the SDEK 219 obtained at step 664, as disclosed herein. If the DEK 119 is obtained at step 668, the flow may continue to step 680; otherwise, the flow may continue to step 670. At step 670 the request 203 to access and/or decrypt the dataset 148 may fail. Step 670 may comprise returning an error indication in response to the request 203. Step 680 may comprise decrypting the dataset 148 by use of the DEK 119 obtained from the DEK cache 155 and/or KMS 110. Step 680 may comprise returning a decrypted dataset 148 in response to the request 203. Step 680 may further comprise purging the DEK 119, as disclosed herein.

Figure 7A:
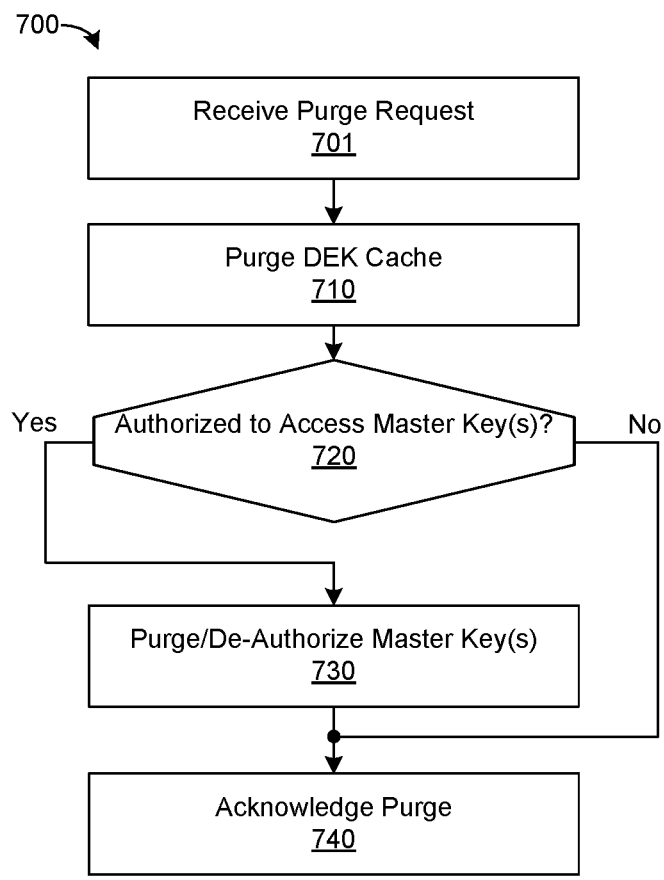
FIG. 7A is a flow diagram of one embodiment of a method for purging data pertaining to an entity.

FIG. 7A is a flow diagram of one embodiment of a method 700 for purging the data pertaining to an entity 101 from the DAV platform 120, as disclosed herein. Step 701 may comprise receiving a purge request (e.g., purge request 205). The purge request 205 may be issued in response to user activation of the purge control 136 and/or completion of the purge protocol 138, as disclosed herein.

Step 710 may comprise purging the DEK cache 155 of information pertaining to the entity 101. Step 710 may comprise identifying DEK cache entries 158 that are associated with the entity 101 (e.g., based on EID 113, SPID 217, MKID 211 and/or other information of the DEK cache entries 158). Step 710 may further comprise purging the identified DEK cache entries 158, as disclosed herein (e.g., securely erasing and/or overwriting memory location(s) used to store the identified DEK cache entries 158). In some embodiments, step 710 further comprises purging unencrypted data pertaining to the entity 101 being utilized within the DAV platform 120. Step 710 may comprise purging unencrypted data pertaining to the entity 101 from the content service 170, which may comprise purging DAQV operations, objects, modules and/or other components that comprise data pertaining to the entity 101. Step 710 may further comprise purging one or more interfaces 174 being used to display data pertaining to the entity 101.

Step 720 may comprise determining whether the DAV platform 120 is authorized to access KMS 110 and/or master keys 111 associated with the entity 101. Step 720 may comprise accessing information pertaining to the KMS 110 and/or master keys 111 associated with the entity 101 in the configuration storage 135 (e.g., in the entity configuration 133, security policy 137, dataset configuration 143, KMS configuration 210 and/or the like). Step 720 may further comprise verifying that the DAV platform 120 is no longer to access the identified KMS 110 and/or master keys 111 by, inter alia, issuing authorization and/or access requests pertaining to the identified master keys 111 to the identified KMS 110. If step 720 indicates that the DAV platform 120 is authorized to access one or more of the identified master keys 111, the flow continues at step 730; otherwise, the flow may continue to step 740. Step 730 may comprise purging information pertaining to the identified master keys 111, SDEK(s) 219, and/or the like, from the DAV platform 120, such that the master keys 111 and/or corresponding DEK 119 cannot be accessed by the DAV platform 120 regardless of whether the entity 101 has revoked access to the master keys 111 through the KMS 110. Step 730 may further comprise informing the KMS 110 that the DAV platform 120 no longer has access to the identified master keys 111.

Figure 7B:
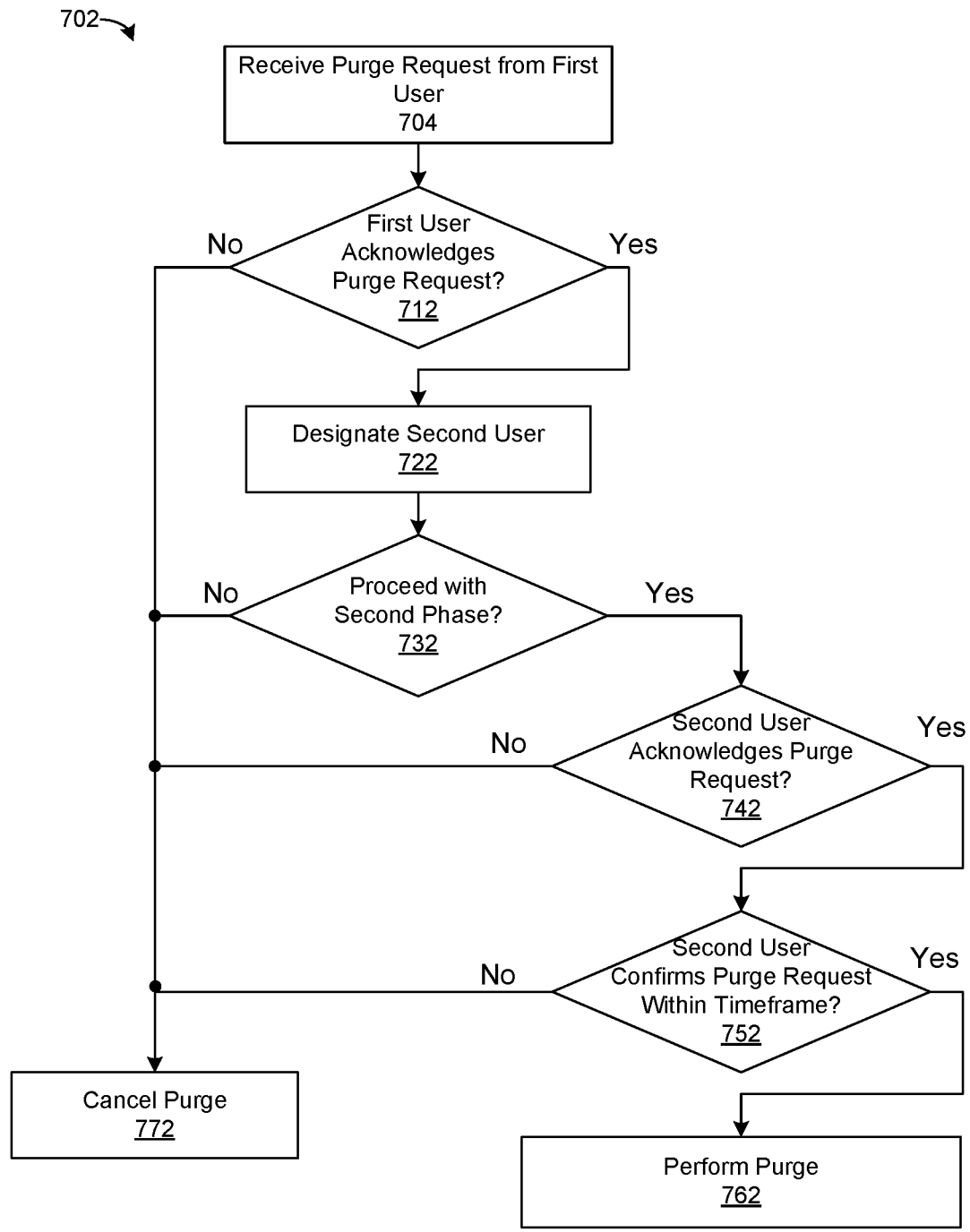
FIG. 7B is a flow diagram of one embodiment of a method for implementing a secure purge protocol.

FIG. 7B is a flow diagram of one embodiment of a method 702 implementing a purge protocol 138 to initiate a purge operation, as disclosed herein. Step 704 may comprise receiving a request to initiate the purge protocol 138 from a first authorized user of an entity 101 (through an administration interface 134 of the administration service 130, as disclosed herein). Step 712 may comprise determining whether to proceed with a first phase of the purge protocol 138. Step 712 may comprise: a) displaying confirmation to proceed with the purge protocol 138, b) showing consequences of proceeding with the purge protocol 138 (e.g., showing a number of datasets 148 and/or corresponding DAV functionality that will be purged from the DAV platform 120), and/or c) receiving confirmation that the first user understands the consequences of proceeding with the purge protocol 138, and wishes to proceed. Step 712 may correspond to interfaces 328A and 328B, disclosed above.

Step 722 may comprise the first user designating a second authorized user of the entity 101 to complete a second phase of the purge protocol 138. Step 722 may correspond to interface 328C, disclosed above. Step 732 may comprise determining whether the first user confirms completion of the first phase of the purge protocol 138. Step 732 may comprise receiving a confirmation from the first user through, inter alia, control confirmation input 304D of interface 328D.

Step 742 may comprise determining whether to proceed with the second phase of the purge protocol 138. Step 742 may comprise sending a message 329 to the second user comprising a prompt and/or link 314 to direct the second user to the administration interface 134 of the DAV platform 120. Step 742 may further comprise displaying information pertaining to the consequences of proceeding to with the purge protocol 138 and/or receiving acceptance from the second user, as disclosed herein. Step 742 may correspond to the message 329 and interface 330A, disclosed above. Step 742 may further comprise initiating a timer to track a time at which the message 329 was sent to the second user (and/or the second user accessed the administration interface 134 in response to the message 329). The timer may be used to define, inter alia, the timeframe in which the second user must complete the second phase of the purge protocol 138.

Step 752 may comprise determining whether the second user has completed the second phase of the purge protocol 138 within the timeframe (e.g., whether the second user has confirmed to proceed with the purge operation). Step 752 may comprise displaying interface 330B to the second user, the second interface 330B comprising a prompt by which the second user can either confirm or cancel the purge protocol 138. Step 752 may comprise determining whether the second user selected the confirm input 334B within the determined timeframe. If the second user completes the second phase of the purge protocol 138 within the determined timeframe, the flow may continue to step 762; otherwise, the flow may continue to step 772. Step 762 may comprise implementing an operation to purge data pertaining to the entity 101 from the DAV platform 120, as disclosed herein. Step 762 may comprise issuing a purge request 205 to the data manager 140, comprising an EID 113 of the entity 101. Step 772 may comprise canceling the purge operation and/or purge protocol 138, such that data pertaining to the entity 101 is not purged from the DAV platform 120.

Referring back to FIG. 1, the content service 170 may be configured to expose DAQV functionality to authorized users of respective entities 101, which may comprise providing interface(s) 174 through which authorized users may access, query, process, and/or visualize datasets 148 pertaining to the respective entities 101. As used herein, DAQV functionality generally refers to an any suitable operation(s) pertaining to imported data including, but not limited to: data access operations, data query operations, data processing operations, data import operations (e.g., extract, transform, and load operations), data sorting operations, data filtering operations, data calculation operations, data aggregation operations, data analytics operations, data science operations, data visualizations (e.g., generating and/or displaying visualizations pertaining to the imported data), data monitoring operations, notification functions, and/or the like.

Figure 8:
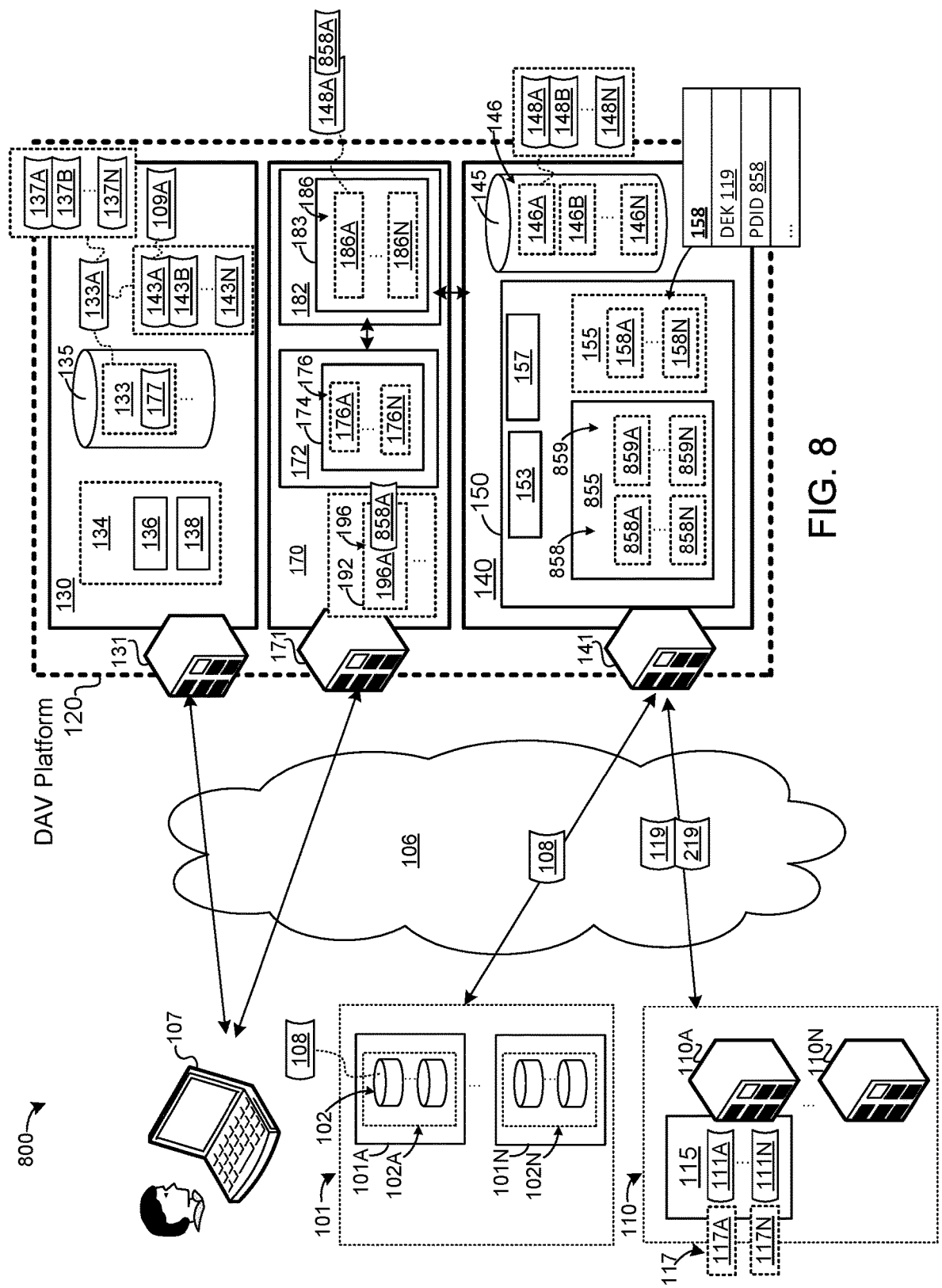
FIG. 8 is a schematic block diagram of another embodiment of the disclosed DAV platform.

FIG. 8 depicts further embodiments the disclosed DAV platform 120. The administration service 130 may provide an administration interface 134 by which authorized users of respective entities 101 may configure services pertaining to the respective entities 101 implemented by the DAV platform 120, and the data manager 140 may be configured to import data of respective entity 101, encrypt the imported data using keys associated with specified master keys 111 and/or KMS 110 of the respective entities 101, and provide access to the encrypted datasets 148 to the content service 170, as disclosed herein. The KMS 110 and/or master keys 111 may comprise and/or correspond to authorization metadata 117. The authorization metadata 117 may define access rights and/or access controls pertaining to the respective master keys 111 (e.g., authorization metadata 117A-N to control access to master keys 111A-N, respectively). The authorization metadata 117 may be managed and/or controlled by the respective entities 101. The entities 101 may use the authorization metadata 117A-N to selectively provision and/or revoke authorization rights to the DAV platform 120 to respective master key(s) 111. As disclosed herein, the DAV platform 120 may control access to imported data pertaining to the respective entities 101 in accordance with the authorization metadata 117 of the corresponding master keys 111.

In the FIG. 8 embodiment, the data manager may be configured to import datasets 148A, 148B, and so on, including 148N, each of which may comprise data pertaining to entity 101A. The datasets 148A-N may be imported in accordance with an entity configuration 133A managed by the entity 101A (e.g., respective dataset configuration(s) 143A-N, each configured for importing a respective one of the datasets 148A-N). The dataset configuration(s) 143A-N may configure the data manager 140 to import the datasets 148A-N in response to trigger conditions (e.g., when the corresponding entity datasets 108 are updated), periodically (e.g., once every hour), and/or the like. The datasets 148A-N may be secured for storage within the DAV platform 120 in accordance with applicable security policies 137 managed by the entity 101A. In the FIG. 8 embodiment, each dataset 148A-N corresponds to a respective security policy 137A-N of the entity 101A, such that the security policy 137A applicable to dataset 148A may differ from the security policies 137B-N of datasets 148B-N, and vice versa. As such, the master key(s) 111 and/or KMS 110 used to generate DEK 119 to encrypt dataset 148A may differ from the master key(s) 111 and/or KMS 110 used to encrypt dataset(s) 148B-N. Moreover, the expiration criteria of DEK(s) 119 used to encrypt the dataset 148A may differ from the expiration criteria of DEK(s) 119 used to encrypt datasets 148B-N (e.g., the DEK 119 used to encrypt data 148A-N may be refreshed at different respective rates, DEK 119 used to encrypt dataset 148A may be expire after an hour and/or after being used to encrypt a determined number of imported datasets 148A, whereas the DEK 119 used to encrypt dataset 148B-N may expire after a week and/or after being used to encrypt a larger number of imported datasets 148B-N).

The content service 170 may implement DAQV operations pertaining to the imported datasets 148 (e.g., datasets 148A-N), as disclosed herein. The content engine 172 may be configured to generate interface(s) 174 by which authorized users of the entity 101 may access data analytic and/or visualization functionality of the content service 170. Authorized users of the entity 101 may, for example, access an interface 174 generated by the content engine 172 to create, modify, and/or implement DAV operations pertaining to specified datasets 148 pertaining to the entity 101A, such as datasets 148A-N. In the FIG. 8 embodiment, information pertaining to a DAV operation may be represented as a DAV object 176. As used herein, a DAV object 176 refers to a collection of information that defines a data analytic and/or visualization operation. A DAV object 176 may define one or more DAV operations pertaining to a specified dataset 148, define processing operations to perform on data of the specified dataset 148 (e.g., calculations, aggregations, filter operations, sorting operations, series operations, and/or the like), define visualizations pertaining to the dataset 148, and so on. A DAV object 176 may further comprise state information pertaining to the dataset 148 and/or DAV operation(s), such as intermediate processing results (e.g., processed data of the specified dataset 148), visualization data, data models, and/or the like. DAV objects 176 may be created, accessed, implemented, and/or visualized by authorized users through, inter alia, interface(s) 174 of the content engine 172. The content engine 172 may be further configured to persist DAV configuration data 177 corresponding to DAV objects 176, such that the DAV objects 176 can be saved, shared with other users, and/or the like. The DAV configuration data 177 may comprise information pertaining to DAV operations (and/or specify the dataset(s) 148 to which the operations pertain), but may not comprise unencrypted data of the specified datasets 148. DAV configuration data 177 may be maintained in one or more of the configuration store 135 and/or persistent storage resources 145 of the DAV platform 120. In the FIG. 8 embodiment, DAV configuration data 177 may be maintained within, inter alia, entity configuration(s) 133 of respective entities 101 (e.g., in association with respective dataset configurations 143A-N of the entities 101).

Figure 9A:
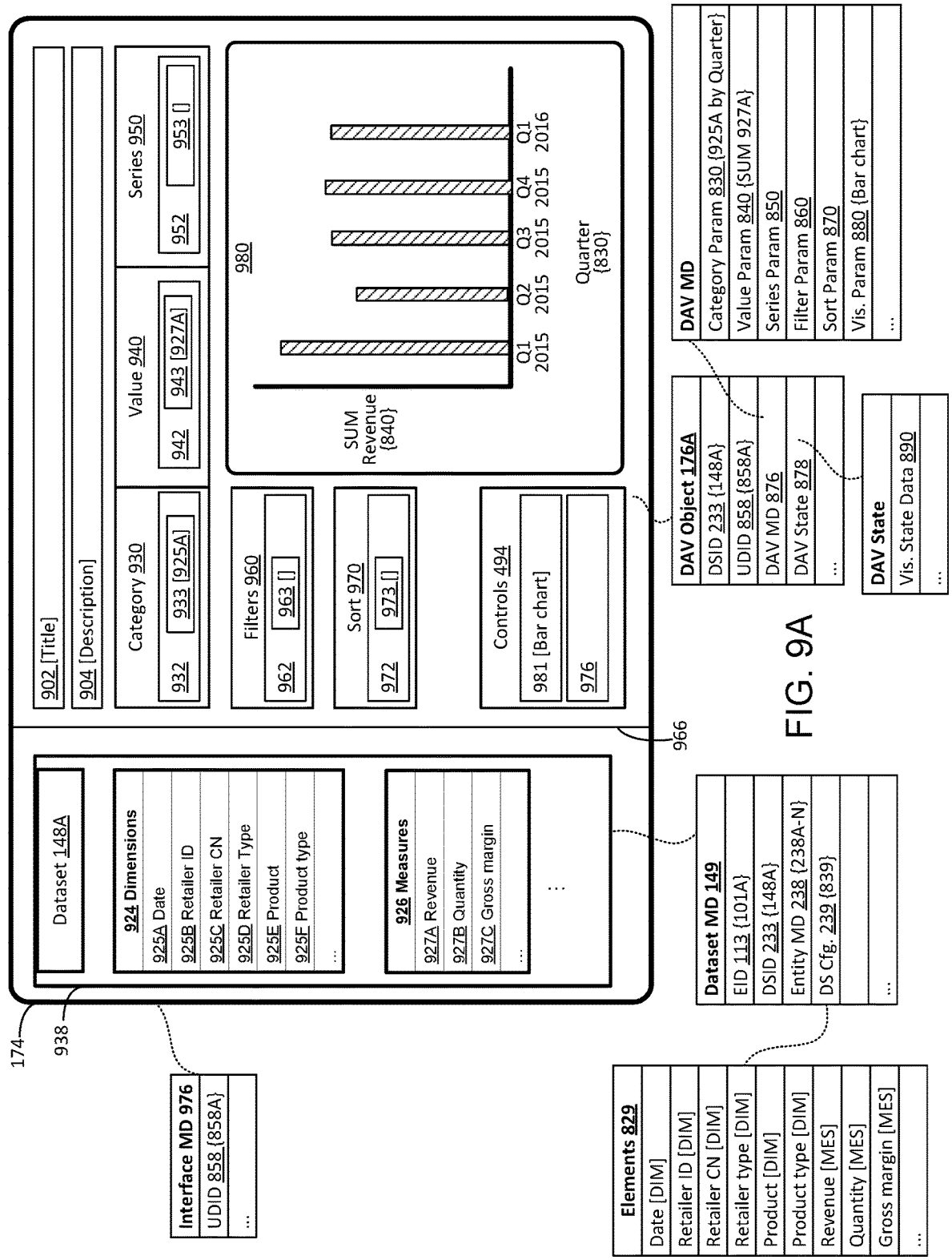
FIG. 9A depicts one embodiment of an interface utilizing imported data of an entity.

FIG. 9A depicts one embodiment of an interface 174 generated by the content engine 172. In the FIG. 9A embodiment, the interface 174 may correspond to a DAV object 176 for a data visualization. The DAV object 176 may specify a dataset pertaining to the visualization (by DSID 233), comprise DAV metadata 976 comprising configuration information pertaining to the visualization, a DAV state 978, and so on. The interface 174 may enable an authorized user to create, modify, manipulate, save, and/or implement the visualization corresponding to the DAV object 176. The interface 174 may comprise a title 902 component and a description component 924, which may be used to specify information pertaining to the data visualization. The interface 174 may further comprise a dataset component 938 which may be used to, inter alia, select a particular dataset 148 and/or display information pertaining to the selected dataset 148.

The dataset component 938 may be configured to display information pertaining to a selected dataset 148, such as information pertaining the schema of the selected dataset 148 (e.g., the column(s) of the selected dataset 148). The schema of a dataset 148 may be defined by, inter alia, dataset configuration 239 of the dataset 148 (as defined in the corresponding dataset metadata 149), as disclosed above. The dataset configuration 239 may comprise information 839 pertaining to the columns comprising the dataset 148.

In the FIG. 9A embodiment, the DAV object 176 pertains to dataset 148A and, as such, the component 938 comprises information pertaining to dataset 148A. The dataset component 938 may identify the dataset 148A by DSID 233, or some other name, label, alias, and/or identifier (and/or may provide for selecting the dataset 148A from a plurality of datasets 148 associated with the entity 101A). The dataset 148A may comprise revenue data pertaining to orders processed by various retail sales channels of the entity 101A. As indicated by the dataset configuration 239 (column metadata 839), the dataset 148A may comprise: a "Date" element indicating the date of each order, a "Retailer ID" element comprising an identifier of the retailer that processed the order, a "Retailer CN" element indicating the country in which the retailer is located, a "Retailer type" indicating a type of the retail channel (e.g., "Outdoors shop," "Furniture shop," etc.), a "Product" element identifying the product associated with the order, a "Product type" element, a "Quantity" element, a "Gross margin" element," a "Revenue" element, and so on. The dataset component 938 may comprise a dimensions component 924 and a measures component 926.

The dimensions component 924 may be configured to display information pertaining to dimension columns of a selected dataset 148 by use of respective dimension entries 925A-N. The dimension entries 925A-N may identify columns using respective column labels, which may correspond to names, labels, and/or aliases of the respective columns. As used herein, a "dimension" column of a dataset 148 refers to a column that comprises qualitative data determined to be suitable for categorizing, sequencing and/or aggregating one or more datasets 148 (e.g., the X-axis or series of a conventional data visualization). Dimension columns may be automatically identified based on the dataset configuration 239 (e.g., columns having a type "string"," "date" and/or the like may be identified as dimension columns). Alternatively, or in addition, a user may specify columns that should be treated as dimension columns (e.g., specify that a column comprising numeric identifiers be used as a dimension rather than a numeric measure).

The measures component 926 may be configured to display information pertaining to one or more "measure" columns of the selected dataset 148 by use of respective measure entries 927A-N. As used herein, a "measure" column refers to a column of a dataset 148 that comprises quantitative data on which one or more calculations may be performed (e.g., the Y-axis of a conventional data visualization). Measure columns may be automatically identified based on the schema of the selected dataset (e.g., columns having a type of "number," "float," "decimal," and/or the like may be identified as measure columns). Alternatively, or in addition, a user may specify columns of a selected dataset that should be treated as measure columns.

In the FIG. 9A embodiment, the dataset configuration 239 of dataset 148A indicates that the "Date," "Retailer ID," "Retailer CN," "Retailer type," "Product," and "Product Type" columns comprise dimension columns and, as such, corresponding dimension elements 925A-F are displayed within the dimensions component 924. The dataset configuration 239 of dataset 148A indicates that the "Revenue," "Quantity," and "Gross margin" columns are measure columns and, as such, corresponding measure elements 927A-C are displayed within the measures component 926.

The interface 174 may further comprise DAV components 966 for specifying, inter alia, a configuration of and/or parameters of the data visualization. The DAV component 966 may correspond to respective parameters of the DAV metadata 876 of the DAV object 176. In the FIG. 9A embodiment, the DAV components 966 may include, but are not limited to: a category component 930, a value component 940, a series component 950, a filter component 960, a sort component 970, and so on. The category component 930 may enable creation and/or editing of the category parameter 830 of the DAV object 176. The category parameter 830 may correspond to a column of the selected dataset 148A, and may be used as a dimension of the visualization defined by the DAV object 176 (e.g., qualitative data for use as a dimension parameter of the visualization). The category parameter 840 may be created by dragging a column entry 925A-N from the dimensions component 924 to the category component 930 to thereby create a category entry 932 (and corresponding category parameter 840 in the DAV configuration 176). The category entry 932 may comprise a category edit component 933, which may be used to edit properties of the category parameter 840, remove the category parameter 840, and so on. The properties of a category parameter 840 may include, but are not limited to: a label, a format, a granularity, and/or the like. In the FIG. 9A embodiment, the category component 930 species the "Date" column entry 925A as the category parameter 840 for the DAV object 176, and the category edit component 933 specifies that the granularity of the "Date" column entry 925A is fiscal quarter.

The value component 940 may enable creation and/or editing of a value parameter 840 of the DAV object 176. The value parameter 840 may correspond to a dataset column (e.g., a measure column). The value parameter 840 may be defined by use of the interface 174 by, inter alia, dragging a column entry 427A-N from the measures component 926 to the value component 940 to thereby create a value entry 942 (and a corresponding value parameter 840 in the DAV object 176). The value entry 942 may comprise a value edit component 943, which may provide for editing properties of the value parameter 840, removing the value parameter 840, and/or the like. The properties of a value parameter 840 may include, but are not limited to: an aggregation, label, goal, display format, and/or the like. An aggregation may define a aggregation operation to perform on the specified column, such as a sum, minimum, maximum, average, count, custom calculation, no aggregation, and/or the like. The label may comprise a human-readable label to identify the value parameter in data visualizations and/or table displays. The goal may define one or more thresholds pertaining to the value. The display format may specify formatting of the value in one or more data visualizations and/or tables (e.g., as currency, decimal, units, and/or the like). In the FIG. 9A embodiment, the value component 940 defines a SUM of the "Revenue" column entry 927A as the value parameter 850 of the DAV object 176.

The series component 950 may enable creation and/or editing of one or more series parameters 850 of the DAV object 176. A series parameter 850 may correspond to a column. A series parameter 344 may be created by, inter alia, dragging a column entry 425A-N and/or 427A-N from one or more of the dimensions component 924 and measures component 926 to the series component 950 to thereby create a series entry 952 (and corresponding series parameter 850 in the DAV object 176). The series entry 952 may comprise a series edit component 953, which may enable editing of the properties of the series parameter 850, removal of the series parameter 850, and/or the like. The properties of a series parameter 850 may include, but are not limited to: an aggregation, a label, and so on, as disclosed herein. The series component 950 may be used to create a plurality of series entries 952, each series entry 952 defining a different respective series parameter 850 of the DAV object 176.

The filter component 960 may provide for defining one or more filter parameters 860 of the DAV object 176. A filter parameter 860 may be created by, inter alia, dragging a column entry 425A-N and/or 427A-N to the filter component 960 to thereby create a filter entry 962 (and corresponding filter parameter 860 in the DAV object 176). The filter entry 962 may comprise a filter edit component 963, which may provide for editing properties of the filter parameter 860, removing the filter parameter 860, and/or the like. The properties of a filter parameter 860 may include, but are not limited to: a filter condition, a label, and/or the like. As disclosed herein. The filter component 960 may be used to create a plurality of filter entries 962, each filter entry 962 defining a different respective filter parameter 860 of the DAV object 176. In the FIG. 9A embodiment, no filter parameter 860 is defined.

The sort component 970 may provide for defining one or more sort parameters 870 of the DAV object 176. A sort parameter 870 may be created by, inter alia, dragging a column entry 925A-N and/or 927A-N to the sort component 960 to thereby create a sort component 962 (and corresponding sort parameter 870 in the DAV object 176). The sort component 962 may comprise a sort edit component 963 for editing properties of the sort parameter 870, removing the sort parameter 870, and/or the like. The properties of the sort parameter 870 may include a sort criterion, which may define, inter alia, a sort condition, a sort direction (e.g., ascending, descending), and/or the like. In the FIG. 9A embodiment, no sort parameter 870 is defined.

The interface 174 may further comprise controls 994, including a visualization type control 981 and management control 976. The visualization control component 981 may be used to define visualization parameters 880 of the DAV object 176, such as visualization type (e.g., bar chart, grouped bar chart, stacked bar chart, line chart, area chart, pie chart, table, and/or the like), display size, coloration, and/or the like. In the FIG. 9A embodiment, the visualization control component 981 specifies the visualization parameter 880 as bar chart. The management control 976 may comprise controls for saving, loading, and/or sharing the DAV object 176. Saving a DAV object 176 may comprise storing corresponding DAV configuration data 177 in persistent storage of the DAV platform 120. The DAV configuration 177 may not include unencrypted data of the dataset 148 (e.g., dataset 148A). The DAV object 176A may further comprise a DAV state 878, which may comprise information pertaining to a state of the DAV object 176A (visualization state 890). The visualization state 890 may comprise information pertaining to the visualization 980 illustrated in FIG. 9A. The visualization state 890 may comprise and/or correspond to visualization data and/or a visualization object used to produce the visualization 980. The visualization data of the visualization state 890 may be derived from the specified dataset 148A, in accordance with the DAV metadata 876 (e.g., parameters 830, 840, 850, 860, 870, 880, and so on). In the FIG. 9A embodiment, the visualization data may comprise a SUM of the "Revenue" column of the dataset 148A aggregated by the "Date" column (at a granularity of quarter).

Referring back to FIG. 8, the content engine 172 may be configured to implement the DAV object 176A of FIG. 9A, which may comprise, inter alia, accessing the unencrypted dataset 148A, as disclosed herein. In some embodiments, the content service 170 comprises a query manager 182, which may be configured to provide high-performance data access and/or query services to the content engine 172 (and/or other components of the content service 170 and/or DAV platform 170). The query manager 182 may be configured to obtain unencrypted dataset(s) 148 from the data manager 140 in response to requests from the content engine 172. Alternatively, the content engine 172 may obtain unencrypted dataset(s) 148 from the data manager 140 and load the unencrypted dataset(s) 148 into the query manager 182. The unencrypted dataset(s) 148 may be transferred to the content service 170, as disclosed herein (e.g., by issuing access and/or decryption requests 203 to the data manager 140). The query manager 182 may maintain and/or persist the dataset(s) within a query store 183. The query store 183 may comprise a data store, database, in-memory database, SQL database, NoSQL database, and/or the like.

In some embodiments, the query manager 182 may comprise a persistence service 180 and, as disclosed above, may be configured to encrypt data maintained within the query store 183 (by use of the security interface 157). In the FIG. 8 embodiment, however, the query manager 182 may be configured to maintain unencrypted datasets 148 (and/or portions thereof) within tquery store 183. The query manager 182 (and/or query store 183 thereof) may, therefore, comprise unencrypted data 186 pertaining to one or more entities 101 (e.g., unencrypted data 186A-N pertaining to entities 101A-N, respectively). As illustrated in FIG. 8, the query manager 182 may comprise unencrypted data 186A pertaining to entity 101A, including dataset 148A pertaining to DAV object 176A.

The content engine 172 may implement the DAV operations and/or generate the DAV visualization corresponding to the DAV object 176A by, inter alia, accessing and/or querying the dataset 148A by use of the query store 183. The content engine 172 may be further configured to implement the DAV operations of the DAV object 176A. In accordance with the FIG. 9A embodiment, the operations may comprise calculating visualization data in accordance with parameters of the DAV object 176A, by: a) aggregating the "Revenue" column of the unencrypted dataset 148A by the "Date" column at a granularity of quarter (in accordance with the category parameter 830 of the DAV object 176A), and b) calculating a sum of the aggregated "Revenue" column (in accordance with the value parameter 840 of the DAV object 176A). The content engine 172 may be further configured to produce the visualization 980 of the FIG. 9A embodiment, which may comprise generating a visualization object using the visualization data in accordance with the visualization parameter(s) 880 of the DAV object 176A. The visualization data and/or corresponding visualization object may comprise the DAV state 878 of the DAV object 176A, as disclosed above (e.g., visualization state data 890 of the DAV object 176A).

The content engine 172 may be further configured to display the visualization 980 within the interface 174, which may comprise producing an electronic document comprising the visualization 980 and/or providing the electronic document to a client computing device 107 via the network 106. The electronic document may be communicated to the client computing device 107 by the content server 171. The electronic document may be configured for rendering and/or display by a browser application operating on the client computing device 107. The electronic document may comprise a web page and/or web application. Accordingly, in some embodiments, the content server 171 comprises and/or is communicatively coupled to a web server and/or web server application.

Figure 9B:
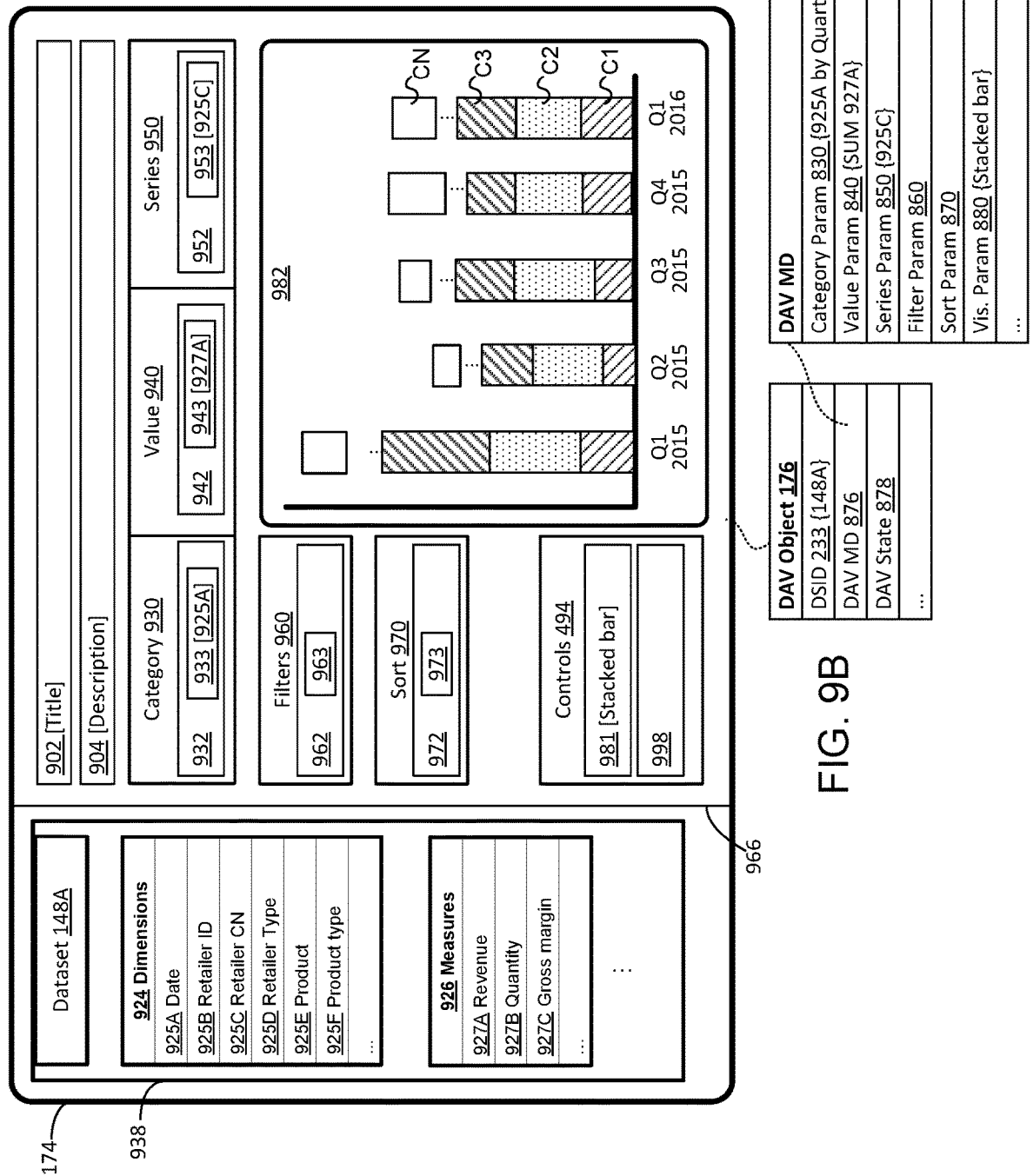
FIG. 9B depicts another embodiment of an interface utilizing imported data of an entity.

The interface 174 may provide for manipulating the DAV object 176A. As illustrated in FIG. 9B, the DAV object 176A may be modified to designate a series parameter 850 (e.g., "Retailer CN" column entry 925C), and to change the visualization parameters 880 to specify a "stacked bar" visualization 982. In response to the modifications, the content engine 172 may issue updated query request(s) to the query manager 182 to, inter alia, calculate updated visualization data using the unencrypted dataset 148A (in accordance with the updated DAV metadata 876 of the DAV object 176A). The updated visualization data may comprise a SUM of the "Revenue" column by date (at a granularity of quarter), as disclosed above. The updated visualization data may further comprise series information in accordance with the series parameter 850 (e.g., SUM of the "Revenue" column by quarter and "Retailer CN"). As illustrated in FIG. 9B, the content engine 172 may be further configured to update the interface 174 to display a stacked bar visualization 982 corresponding to the updated visualization data (the labels C1-CN may correspond to respective values of the "Retailer CN" column of the dataset 148A).

Referring back to FIG. 8, portions of the interface 174 and/or corresponding DAV object 176 (e.g., visualization state data 890) may be maintained in content storage 192. The content storage 192 may comprise a memory, cache, and/or storage resources associated with the interface 174 and/or content engine 172. The content storage 192 may comprise memory, cache, and/or storage resources of the content engine 172 and/or content server 171 (e.g., memory, cache, and/or storage resources of the web server and/or web application used to communicate the interface 174 to the client computing device 107). The content storage 192 may comprise portions of the visualization state data 890 of the DAV object 176, which may comprise unencrypted data of the dataset 148A.

As disclosed above, the DAV platform 120 may be configured to purge data pertaining to an entity 101 in response to a purge request 204. In response to a purge request pertaining to an entity 101, the purge engine 153 of the security manager 150 may be configured to purge the DEK cache 155 of DEK cache entries 158 pertaining to the entity 101, verify that access to master key(s) associated with the entity 101 have been revoked, purge KMS configuration data 210 pertaining to the entity 101 from the configuration storage 135, and so on, as disclosed herein. In some embodiments, the purge engine 153 is further configured to purge data pertaining to the entity 101 from the content server 170. Purging data pertaining to the entity 101 from the content server 170 may comprise, inter alia, purging unencrypted data 186 pertaining to the entity 101 from the query manager 182, purging interfaces 174 comprising data pertaining to the entity 101 from the content engine 172, purging DAV object(s) 176 pertaining to the entity 101, purging data pertaining to the entity 101 from the content storage 192, and/or the like. In response to a purge operation pertaining to the entity 101A, the purge engine 153 may be configured to: a) purge unencrypted data 186A pertaining to the entity 101A, including the dataset 148A, from the query manager 182 and/or query store 183; b) purge the DAV object 176A and/or corresponding interface 174, c) purge the content storage 192 of data pertaining to the entity 101A, including DAV state data (e.g., visualization data and/or visualizations 980,982).

In some embodiments, the query manager 182 may be configured to maintain unencrypted dataset(s) 148 pertaining to respective entities 101 with corresponding dataset metadata 149. Purging data pertaining to the entity 101A from the query manager 182 may, therefore, comprise identifying unencrypted datasets 148 maintained within the query manager 182 that pertain to the entity 101A (e.g., based on EID 113 of the respective unencrypted datasets 148), and purging the identified datasets 148 from the DAV platform. Purging the identified datasets 148 may comprise erasing the identified datasets 148 (from memory, cache, storage, and/or the like), securely erasing the identified datasets 148, and/or the like, as disclosed herein. Unencrypted data 186 and/or unencrypted datasets 148 pertaining to other entities 101B-N may be unaffected (e.g., may continue to be maintained within the query manager 182).

In some embodiments, the DAV objects 176 and corresponding DAV configuration data 177 managed by the content service 170 may comprise information pertaining to the dataset(s) 148 to which the DAV object(s) 176 and/or corresponding DAV configuration data 177 pertain (e.g., may comprise and/or reference dataset metadata 149 of the specified dataset(s) 148). Purging DAV object(s) 176 pertaining to the entity 101A may, therefore, comprise identifying DAV object(s) 176 associated with the entity 101A (based on the dataset(s) 148 to which the DAV object(s) 176 pertain), and purging the identified DAV object(s) 176 from the DAV platform 120. Purging a DAV object 176 may comprise erasing the DAV object 176 (from memory, cache, storage, and/or the like), securely erasing the DAV object, and/or the like, as disclosed herein.

As disclosed above, interface(s) 174 of the content engine 172 may correspond to respective DAV objects 176. Purging interface(s) 174 pertaining to the entity 101A may comprise identifying interface(s) 174 pertaining to DAV objects 176 associated with the entity 101A, and purging the identified interface(s) 174. Purging an interface 174 may comprise erasing the interface 174 (e.g., erasing data pertaining to the interface 174, such as the electronic document comprising the interface 174 from memory, cache, and/or storage), securely erasing the interface 174, and/or the like. Purging an interface 174 may further comprise removing the interface 174 from one or more client computing device 107. In some embodiments, the interfaces 174 generated by the content server 171 may be configured to periodically perform refresh operations (e.g., "pull" updated interface data from the content server 171). An interface 174 may be purged in response to such a refresh operation (e.g., the electronic document returned from the content server 171 may not comprise and/or correspond to the purged DAV object 176). Alternatively, or in addition, the content server 171 may be configured to transmit updated interface data to client computing devices 107 (e.g., "push" updated interface data from the content server 171 to client computing devices 107). Purging an interface 174 may, therefore, comprise pushing an updated electronic document to one or more client computing devices 107 that does not include information pertaining to the purged DAV object(s) 176.

As disclosed above, unencrypted data pertaining to the entity 101A may be maintained within content storage 192. The unencrypted data may correspond to one or more interface(s) 174, DAV object(s) 174, DAV state 878, and/or the like. Purging data pertaining to the entity 101A from the content storage 192 may comprise identifying data pertaining to the entity 101A within the content storage 192 (based on the dataset(s) 148 and/or dataset metadata 149 associated with such data), and purging the identified data, as disclosed herein.

In some embodiments, the security manager 150 may be further configured to track utilizations of unencrypted data within the DAV platform. As used herein, a utilization of unencrypted data pertaining to an entity 101 (e.g., a unencrypted, decrypted, and/or clear-text dataset 148 and/or portion thereof), refers to processing, storing, caching, persisting, displaying, modeling, and/or otherwise maintaining data pertaining to the entity 101. As illustrated above, unencrypted data of an entity 101 may be utilized within the content service 170 (e.g., may be utilized by and/or within one or more of the content engine 172, interface(s) 174, DAV object(s) 176, query manager 182, content storage 192, and/or the like).

It may be difficult to track utilizations of unencrypted data since, inter alia, one or more of the utilizations may not comprise the "full" set of metadata associated with the corresponding dataset 148 (e.g., the full set of dataset metadata 149). It may be inefficient to retain all of the dataset metadata 149 associated with a decrypted dataset 148 as the dataset 148 and/or portions thereof are utilized within the DAV platform 120 (e.g., as dataset(s) are processed, filtered, sorted, displayed within interface(s), utilized in DAV object(s) 176, and so on). Moreover, it may be advantageous to associate dataset(s) 148 with different purge domains, such that purge operations may be performed on selected portions of the data pertaining to the entity 101 (e.g., different purge domains). As used herein, a "purge domain" of a purge operation, or the "scope" of a purge operation, refers to information that defines the amount or extent of data to be purged from the DAV platform 120 in the purge operation. The purge operations disclosed above comprise purging substantially all of the data pertaining to a respective entity 101. Such purge operations may be referred to as having an "entity" scope and/or "entity purge domain." The security manager 150 may be configured to implement purge operations of different scope and/or different purge domains. The scope of a purge operation may be defined to encompass data associated with a particular entity 101, specified security policy(s) 137, designated master key(s) 111, particular KMS 110, specific DEK(s) 119, and/or the like. For example, a master key 111 of an entity 101 may be compromised and, in response, the entity 101 may instruct the DAV platform 120 to purge all data encrypted using DEK 119 associated with the master key 111 (data of the entity 101 encrypted using DEK(s) 119 associated with other master key(s) 111 may not be purged from the DAV platform 120). In another example, a KMS 110 associated with an entity 101 may be compromised and, in response, the entity 101 may request that the DAV platform 120 purge all data pertaining to the entity 101 encrypted using DEK 119 obtained from the KMS 110.

In some embodiments, the security manager 150 may be configured to track decrypted datasets 148 pertaining to respective entities 101 and/or other information pertaining to the entities 101 using purge domain identifiers 858. As used herein, an purge domain identifier (PDID) 858 refers to an identifier that corresponds to a purge domain of the DAV platform 120. A PDID 858 may be represented as a relatively small amount of data (e.g., a 16 or 32 bit integer), such that PDUD 858 can be communicated and/or maintained with unencrypted datasets 148 (and/or data derived therefrom) with minimal overhead.

A purge domain may be defined at any suitable granularity and/or may correspond to any suitable information pertaining to a DEK 119 used to encrypt dataset(s) 148 associated with an entity. A purge domain may comprise and/or correspond to one or more of: an EID 113, SPID 217, MKID 217, and/or DKID 213. The purge domains may be defined by respective entities 101 (e.g., in respective entity configuration(s) 133) and/or by the security manager 150. A purge domain corresponding to a EID 113 may encompass dataset(s) 148 and/or DEK 119 associated with a particular entity 101 (per the "entity" purge operations disclosed above). A purge domain defined with respect to an SPID 217 may encompass dataset(s) 148 to which the corresponding security policy 147 applies (and/or master key(s) 111 and/or DEK 119 associated with the security policy 147). A purge domain associated with a specific MKID 217 may encompass DEK 119 associated with the corresponding master key 111 and/or data encrypted using such DEK 119, and so on. In some embodiments, each PDID may be derived from one or more of a corresponding EID 113, SPID 217, MKID 217, and/or DKID 213 (in accordance with the granularity of the purge domain(s) utilized within the DAV platform 120). Alternatively, or in addition, the security manager 150 may comprise a data structure 857 to associate PDID 858 with respective purge scope data 859. The purge scope data 859 associated with a PDID 858 may define and/or correspond to one or more of an EID 113, SPID 217, MKID 217, and/or DKID 213, as disclosed herein. Datasets 148 associated with a same purge scope may be assigned a same PDID 858. For example, the purge domain(s) implemented by the security manager 150 may correspond to EID 113 and MKID 217. The PDID 858 maintained by the security manager 150 may correspond to each unique combination of EID 113 and MKID 217 of the encrypted dataset(s) 148 imported thereby. In some embodiments, the PDID 858 of a dataset 148 may be determined at the time the dataset 148 is imported and/or may be included in the dataset metadata 149 thereof. The PDID 858 of a dataset 148 may be included in the dataset metadata 149 thereof. In addition, the PDID 858 associated with respective DEK 119 may be included in DEK cache entries 158. As illustrated in FIG. 8, each DEK cache entry 158 may comprise a respective DEK 119 and a corresponding PDID 858, which may be determined at the time the DEK 119 is obtained (other information of the DEK cache entries 158 are omitted to avoid obscuring details of the illustrated embodiments).

The security manager 150 may be configured to service requests 203 to access and/or decrypt datasets 148, as disclosed herein. The security manager 150 may be further configured to provide the PDID 858 associated with decrypted datasets 148 in response to such requests 203. The PDID 858 may be included in the decrypted dataset 148 and/or communicated separately. Components utilizing the decrypted dataset(s) 148, portions of the decrypted dataset(s) 148, and/or data derived from the decrypted dataset(s) 148 may be configured to retain the PDID 858 in association therewith. The query manager 182 may be configured to maintain decrypted dataset(s) 148 with corresponding PDID 858 within the query store 183. The query manager 182 may be further configured to provide corresponding PDID 858 in response to access and/or query requests pertaining to the decrypted datasets 148. The content engine 172 may be configured to include the PDID 858 corresponding to datasets 148 referenced and/or utilized within respective interfaces 174, DAV objects 176, and/or the like. The PDID 858 may be included in corresponding data maintained within the content store 192.

The dataset 148A associated with the DAV object 176A may be assigned PDID 858A. Accordingly, the decrypted dataset 148A obtained from the data manager 140 may comprise and/or be associated with the PDID 858A. Similarly, the decrypted dataset 148A maintained within the query manager 182 may comprise and/or be associated with the PDID 858A. Referring to FIG. 9A, the DAV object 176A may comprise the PDID 858A associated with the decrypted dataset 148A. The interface 174 may comprise and/or be associated with interface metadata 976, which may comprise the PDID 858 associated with data being displayed therein (e.g., PDID 858A of dataset 148A). Referring back to FIG. 8, the content store 192 may comprise content 196 pertaining to one or more interface(s) 174 and/or DAV object(s) 176. Content 196A pertaining to the DAV object 176A and/or corresponding interface 174 may indicate that the content 196A is associated with PDID 858A.

Implementing a purge operation having a designated scope and/or associated with a specified purge domain may comprise: a) determining a PDID 858 corresponding to the purge request, b) purging data associated with the determined PDID 858 from the DAV platform 120. The purge scope and/or purge domain of a purge operation may be specified by the purge operation and/or information included in the purge request. A purge request may comprise one or more of an EID 113, SPID 217, MKID 211, KMS 110, DKID 213, and/or the like, which may determine the scope of the purge request, as disclosed above. Determining the PDID 858 corresponding to a purge request may comprise a) deriving the PDID 858 from one or more of an EID 113, SPID 217, MKID 211, KMS 110, DKID 213, and/or the like, b) accessing corresponding purge scope data 859, and/or the like, as disclosed herein. Implementing the purge operation may comprise purging the DEK cache 155 and/or purging utilizations of corresponding decrypted data. Purging the DEK cache 155 may comprise identifying DEK cache entries 158 associated with the determined PDID 858, and purging the identified DEK cache entries 158, as disclosed herein. Purging utilizations of corresponding decrypted data may comprise identifying utilizations of decrypted data associated with the PDID 858 and purging the identified utilizations. Purging the utilizations may comprise purging unencrypted dataset(s) 148 associated with the PDID 858 from the query manager 182 (and/or within the query store 183). Purging the utilizations may further comprise purging DAV object(s) 176 and/or interface(s) 174 associated with the PDID 858 from the content engine 172, as disclosed herein. Purging the utilizations may comprise purging content 196 associated the PDID 858 from the content store.

Figure 10A:
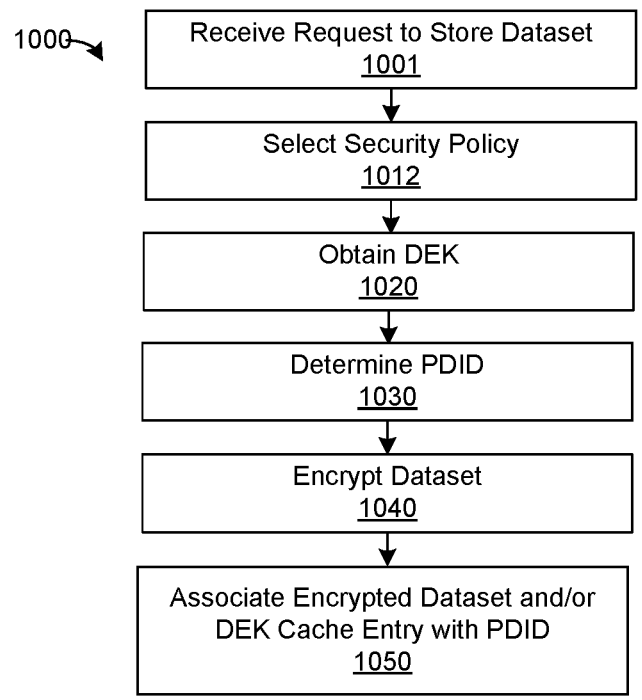
FIG. 10A is a flow diagram of one embodiment of a method for securely managing imported data in accordance with one or more purge domains.

FIG. 10A is a flow diagram of one embodiment of a method 1000 for securely managing imported data in accordance with one or more purge domains. Step 1001 may comprise receiving a request to store a dataset 148 associated with an entity 101, and step 1012 may comprise selecting an applicable security policy 147, as disclosed herein. Step 1020 may comprise obtaining a DEK 119 for use in encrypting the dataset 148. Step 1020 may comprise retrieving a suitable DEK 119 from the DEK cache 155 (per the selected security policy 137), as disclosed herein. If a suitable DEK 119 is not available within the DEK cache 155, step 1020 may comprise obtaining a new DEK 119 from a KMS 110, as disclosed herein.

Step 1030 may comprise determining a PDID 858 for the dataset 148. The PDID 858 may correspond to one or more of an EID 113, SPID 217, MKID 211, KMS 110, and/or DKID 213 associated with the selected dataset 148, selected security policy 137, and/or DEK 119. The PDID 858 may be determined in accordance with a granularity of purge domains associated with the entity 101 and/or supported by the security manager 110. The PDID 858 may correspond to a combination of PDID 858 and MKID 211. Step 1040 may comprise encrypting the dataset 148, as disclosed herein. Step 1050 may comprise storing the encrypted dataset 148 and/or associating the encrypted dataset 148 with the determined PDID 858. Step 1050 may comprise including the PDID 858 in dataset metadata 149 of the dataset 148. Step 1050 may comprise updating a data structure mapping PDID 858 to respective purge scope data 859, as disclosed herein. Step 1050 may further comprise associating a DEK cache entry 158 of the DEK 119 with the PDID 858.

Figure 10B:
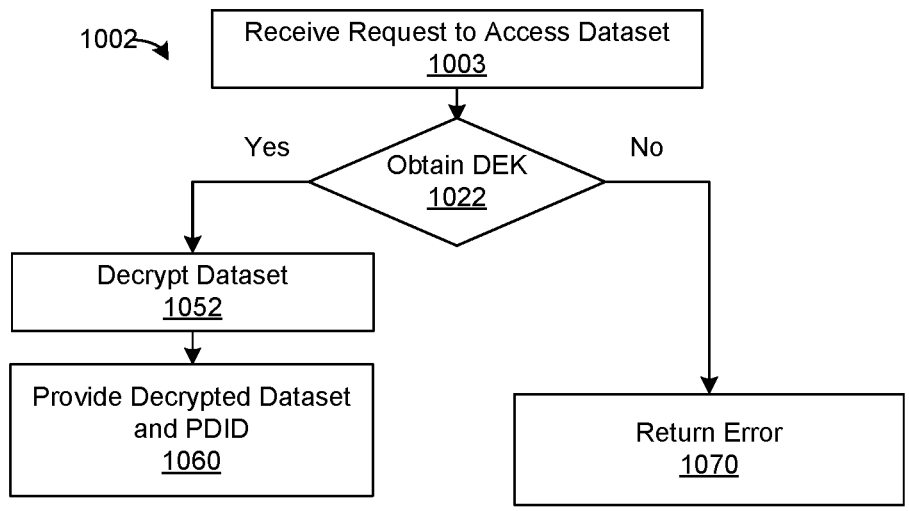
FIG. 10B is a flow diagram of one embodiment of a method for encrypting imported in accordance with one or more purge domains.

FIG. 10B is a flow diagram of one embodiment of a method 1002 for providing access to imported data in accordance with one or more purge domains. Step 1003 may comprise receiving a request to access and/or decrypt an encrypted dataset 148. Step 1022 may comprise obtaining the DEK 119 required to decrypt the dataset 148 as disclosed herein. Step 1022 may comprise retrieving the DEK 119 from the DEK cache 119 and/or requesting the DEK 119 from a KMS 110. If the DEK 119 cannot be obtained, the flow may continue at step 1070. Step 1070 may comprise returning an error indication in response to the request.

Step 1052 may comprise decrypting the encrypted dataset 148 by use of the DEK 119 obtained at step 1022. Step 10552 may further comprise obtaining a PDID 858 associated with the dataset 148 (stored with the dataset 148). Step 1062 may comprise returning the decrypted dataset 148 and corresponding PDID 858 in response to the request. Step 1062 may comprise requiring the requester to retain the PDID 858 with the decrypted dataset 148 as data pertaining to the decrypted dataset 148 is utilized within the DAV platform 120, as disclosed herein.

Figure 10C:
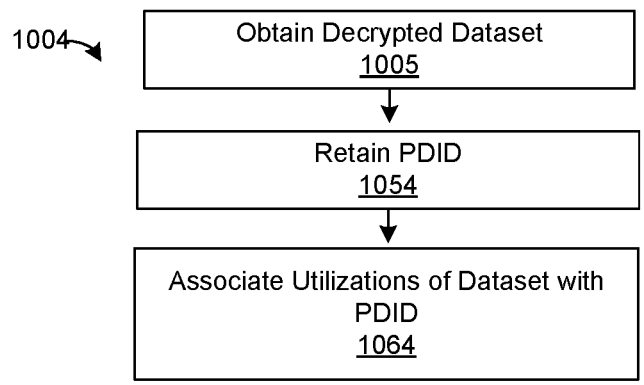
FIG. 10C is a flow diagram of one embodiment of a method for managing utilizations of decrypted data in accordance with one or more purge domains.

FIG. 10C is a flow diagram of one embodiment of a method 1004 for utilizing imported data in accordance with one or more purge domains. Step 1005 may comprise obtaining a decrypted dataset 148. Obtaining the decrypted dataset 148 may comprise obtaining a PID 858 associated with the decrypted dataset 148, as disclosed herein. Step 1054 may comprise retaining the PDID 858 associated with the decrypted dataset 148 (e.g., maintaining the PID 858 with the corresponding decrypted dataset 148 in a query store 183). Step 1064 may comprise associating utilizations of the decrypted dataset 148 with the PDID 858, as disclosed herein. Step 1064 may comprise associating interface(s) used to display information pertaining to the dataset 148 with the PDID 858, associating DAV objects 176 pertaining to the dataset 148 with the PDID 858, associating content 196 pertaining to the dataset 148 with the PDID 858, and so on.

Figure 10D:
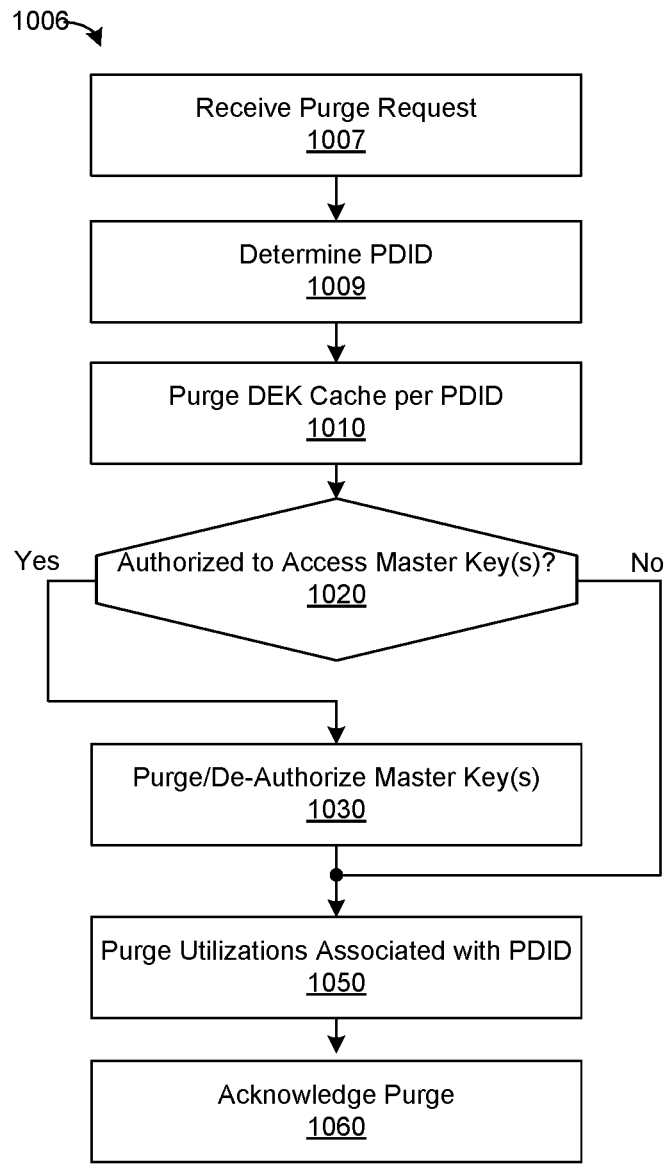
FIG. 10D is a flow diagram of one embodiment of a method for implementing a purge operation corresponding to a particular purge domain.

FIG. 10D is a flow diagram of one embodiment of a method 1006 for purging imported data in accordance with one or more purge domains. Step 1007 may comprise receiving a purge request. The purge request may correspond to a particular purge domain and/or purge scope, as disclosed herein. Step 1009 may comprise determining a PDID 858 corresponding to the particular purge domain and/or purge scope. Step 1009 may comprise determining the PDID 858 from one or more of an EID 113, SPID 217, MKID 211, KMS 110, DKID 213, the data structure 857 and/or the like. Alternatively, or in addition, the PDID 858 may be included in the purge request. Step 1010 may comprise purging the DEK cache 155 in accordance with the determined PDID 858.

Step 1010 may comprise purging DEK cache entries 158 associated with the PDID 858 from the DEK cache 155, as disclosed herein. Step 1010 may comprise retaining DEK cache entries 158 that do not correspond to the PDID 858 within the DEK cache 155.

Step 1020 may comprise verifying that access to master key(s) 111 associated with the PDID 858 have been revoked. If step 1020 indicates that access to the master key(s) 111 have been revoked, the flow may continue at step 1050; otherwise the flow may continue at step 1030. Step 1030 may comprise purging information pertaining to the master key(s) 111, and/or informing the KMS 110 that access to the master key(s) 111 should be revoked, as disclosed herein. Step 1050 may comprise purging utilizations of decrypted data associated with the PDID 858 within the DAV platform 120. Step 1050 may comprise purging utilizations of associated with the PDID 858 within the content service 170, content engine 172, query manager 182, query store 183, content store 192, and/or the like.

Step 1050 may comprise one or more of: purging unencrypted data 186 associated with the PDID 858 from the query manager 182 and/or query store 183 (e.g., decrypted datasets 143 associated with the PDID 858); purging interface(s) 174 generated by the content engine 172 and/or served by the content server 171 associated with the PDID 858; purging decrypted data 196 associated with the PDID 858 from the content store 192; and so on, as disclosed herein. Step 1050 may comprise retaining decrypted dataset(s) 148 and/or utilizations of decrypted dataset(s) 148 that do not correspond to the PDID 858. Step 1060 may comprise acknowledging completion of the purge request.

Aspects of this disclosure may be embodied as an apparatus, system, method, logic, programmable logic, circuit, and/or computer program product (e.g., instructions and/or code stored and/or embodied on a non-transitory computer-readable storage medium). Accordingly, aspects of this disclosure may take the form of hardware, software (including firmware, resident software, firmware micro-code, or the like), combinations of hardware and software, and/or the like. As such, aspects of this disclosure may be referred to herein as a "circuit," "module," "element," "apparatus," "system," and/or the like.

Many of the functional units described in this disclosure have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented at least partially in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may include a single instruction, or many instructions, and may even be distributed over several different code segments, among different programs, across several memory devices, or the like. Where a module or portions of a module are implemented in software, the software portions may be stored on one or more computer readable and/or executable storage media. Any combination of one or more computer readable storage media may be utilized. A computer readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations, steps, and/or implementing aspects of this disclosure may be written in any combination of one or more programming languages, including an object oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain embodiments, may be embodied by or implemented as a circuit.

Reference throughout this disclosure to "one embodiment," "an embodiment," or similar language means that a particular feature, structure, or characteristic described in connection with the embodiment is included in at least one embodiment of the disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

We claim:
1. A method for managing imported data pertaining to an organization within a cloud-based platform, comprising:
   encrypting data pertaining to the organization using a first data encryption key obtained from a key management service, wherein access to the first data encryption key through the key management service is controlled by the organization;

storing an encrypted dataset comprising the encrypted data pertaining to the organization within persistent storage of the platform;

caching data encryption keys within cache storage of the platform, each cached data encryption key associated with a respective identifier, wherein accessing data pertaining to the organization within the platform comprises:

retrieving an identifier of the first data encryption key, using the retrieved identifier to determine whether the first data encryption key is available within the cache storage of the platform, and requesting access to the first data encryption key from the key management service in response to determining that the first data encryption key is not available within the cache storage, the key management service to provide the requested access in response to determining that the requested access is authorized by the organization; and in response to a request to purge data pertaining to the organization from the platform:

purging the first data encryption key from the cache storage of the platform, and removing decrypted data pertaining to the organization from the platform.

2. The method of claim 1, further comprising:
storing secure key data pertaining to the first data encryption key within the persistent storage of the platform, wherein requesting access to the data encryption key comprises:
retrieving the stored secure key data, and
transmitting at least a portion of the secure key data to the key management service.

3. The method of claim 2, further comprising obtaining at least a portion of the secure key data from the key management service.

4. The method of claim 2, wherein the secure key data comprises the data encryption key wrapped in one of a master key and a key encryption key associated with the master key.

5. The method of claim 4, wherein the master key is maintained within a hardware security module of the key management service.

6. The method of claim 4, wherein access to the master key at the key management service is controlled by the organization, and wherein the key management service is configured to provide the requested access to the first data encryption key in response to determining that the organization has authorized the platform to access the master key.

7. The method of claim 4, wherein the key management service is configured to refuse access to the data encryption key in response to determining that the organization has revoked access to the master key.

8. The method of claim 1, further comprising:
assigning purge identifiers to decrypted data within the platform; and
in response to the request to purge data pertaining to the organization from the platform:
using the purge identifiers to identify decrypted data pertaining to the organization within the platform, and
removing the identified decrypted data from the platform.

9. The method of claim 8, further comprising:
associating the purge identifiers with purge scope data, the purge scope data of a purge identifier indicating one or more of an organization, a master key, a key encryption key, a security policy, and a data encryption key associated with the purge identifier.

10. A system for distributed data analytics, comprising:
a computing device comprising a processing unit;
an import engine configured to acquire data pertaining to respective entities of a plurality of entities from one or more data management systems;
a data manager operable on the processing unit of the computing device, the data manager configured to:
obtain data keys for use in encrypting the acquired data for storage within persistent storage of the system from a key manager,
retain encryption metadata associated with the encrypted datasets within the persistent storage, and
service access requests for data pertaining to the respective entities, wherein servicing a first access request for data pertaining to a particular entity comprises decrypting a first encrypted dataset by use of a first data key retrieved by use of encryption metadata associated with the first encrypted dataset; and
a purge engine configured to:
assign identifiers to decrypted datasets within the system, and
utilize the identifiers to select decrypted datasets to purge from the system in response to a purge request.

11. The system of claim 10, wherein the data manager is further configured to retain one or more data keys within a cache, and wherein, in response to a second access request for data pertaining to the particular entity, the data manager is further configured to decrypt the second encrypted dataset by use of a second data key retained within the cache.

12. The system of claim 10, wherein the data manager is further configured to:
retain one or more data keys used to encrypt datasets comprising imported data pertaining to the particular entity within a cache, and
purge the one or more data keys from the cache in response to the purge request.

13. The system of claim 10, wherein in response to the first access request, the data manager is further configured to:
retrieve first secure key data corresponding to the first data key required to decrypt the first encrypted dataset, the first secure key data corresponding to a first master key, and
access the first data key from the key manager by use of the first secure key data, the key manager to provide access to the first data key in response to determining that the particular entity has authorized the system to access the first master key.

14. The system of claim 13, wherein the purge engine is further configured to associate the identifiers with respective purge scope data, the respective purge scope data of a first identifier indicating one or more of the entity, master key, key wrapping key, security policy, and data key associated with the first identifier.

15. A non-transitory computer-readable storage medium comprising instructions configured to cause a computing device to perform operations for securely managing data pertaining to a plurality of entities within a distributed platform, the operations comprising:
importing datasets pertaining to respective entities of the plurality of entities;

generating encrypted datasets from the imported datasets using data encryption keys acquired from a key management service, the data encryption keys corresponding to master keys having access rights controlled by respective entities of the plurality of entities;

retaining the encrypted datasets and corresponding secure key data within persistent storage of the distributed platform;

caching data encryption keys within a secure key cache, each cached data encryption key associated with a respective identifier; and in response to a request to access a first dataset pertaining to a first entity of the plurality of entities:
retrieving a first encrypted dataset from the persistent storage,
utilizing an identifier associated with the first encrypted dataset to determine whether a first data encryption key is available within the secure key cache,
fetching the first data encryption key from the secure key cache in response to determining that the first data encryption key is available within the secure key cache,
acquiring the first data encryption key from the key management service in response to determining that the first data encryption key is not available within the secure key cache, and
decrypting the first encrypted dataset using the first data encryption key to generate a first decrypted dataset within the distributed platform.

16. The non-transitory computer-readable storage medium of claim 15, the operations further comprising:
receiving an imported dataset pertaining to the first entity for persistent storage within the distributed platform;
determining whether the first data encryption key is expired;
in response to determining that the first data encryption key is not expired, using the first data encryption key to encrypt the imported dataset; and
in response to determining that the first data encryption key is expired,
requesting a second data encryption key from the key management service, and
using the second data encryption key to encrypt the imported dataset.

17. The non-transitory computer-readable storage medium of claim 16, the operations further comprising:
retaining the first data encryption key in the secure key cache of the distributed platform; and
in response to determining that the first data encryption key is expired, purging the first data encryption key from the secure key cache, and admitting the second data encryption key into the secure key cache.

18. The non-transitory computer-readable storage medium of claim 16, the operations further comprising:
maintaining key metadata pertaining to the first data encryption key, the key metadata indicating one or more of: a time since the first data encryption key was generated by the key management service, a number of imported datasets encrypted by use of the first data encryption key, a number of datasets decrypted by use of the first data encryption key, an amount of data encrypted by use of the first data encryption key, an amount of data decrypted by use of the first data encryption key, and a number of time the first data encryption has been requested from the key management service; and
determining whether the first data encryption key is expired by comparing the key metadata pertaining to the first data encryption key to one or more key expiration criteria.

19. The non-transitory computer-readable storage medium of claim 15, the operations further comprising:
associating a first imported dataset pertaining to the first entity with a first security policy, the first security policy selected from a plurality of security policies of the first entity and corresponding to a first master key of a plurality of master keys associated with the first entity at the key management service;
obtaining a first data encryption key corresponding to the first master key from the key management service;
encrypting the first imported dataset for storage within the platform by use of the first data encryption key;
associating a second imported dataset pertaining to the first entity with a second security policy of the plurality of security policies, the second security policy corresponding to a second master key of the plurality of master keys;
obtaining a second data encryption key corresponding to the second master key from the key management service; and
encrypting the second imported dataset for storage within the platform by use of the second data encryption key.

20. The non-transitory computer-readable storage medium of claim 19, wherein encrypting the first imported dataset for storage within the platform further comprises:
determining whether the first data encryption key is expired based on key expiration criteria of the first security policy; and
determining whether the second data encryption key is expired based on key expiration criteria of the second security policy.

\* \* \* \* \*